United States Patent
Kim et al.

(10) Patent No.: US 12,498,764 B2
(45) Date of Patent: Dec. 16, 2025

(54) DISPLAY DEVICE

(71) Applicant: Samsung Display Co., LTD., Yongin-si (KR)

(72) Inventors: Sungwon Kim, Yongin-si (KR); Hanbum Kwon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 134 days.

(21) Appl. No.: 18/498,720

(22) Filed: Oct. 31, 2023

(65) Prior Publication Data

US 2024/0272679 A1  Aug. 15, 2024

(30) Foreign Application Priority Data

Feb. 15, 2023 (KR) .................. 10-2023-0019848

(51) Int. Cl.
*G06F 1/16* (2006.01)

(52) U.S. Cl.
CPC .......... *G06F 1/1656* (2013.01); *G06F 1/1616* (2013.01); *G06F 1/1624* (2013.01); *G06F 1/1652* (2013.01)

(58) Field of Classification Search
CPC .................................................. G06F 1/1624
See application file for complete search history.

(56) References Cited

U.S. PATENT DOCUMENTS

| | | | | |
|---|---|---|---|---|
| 10,321,583 B2 * | 6/2019 | Seo | ......................... | H04N 5/64 |
| 10,627,867 B2 | 4/2020 | Cheng et al. | | |
| 11,343,361 B2 * | 5/2022 | He | ....................... | H04M 1/0237 |
| 11,366,496 B2 | 6/2022 | Feng et al. | | |
| 11,581,500 B2 * | 2/2023 | Song | .................... | H04M 1/0268 |
| 11,768,519 B2 * | 9/2023 | Feng | ...................... | G06F 1/1637 361/679.27 |
| 11,860,694 B2 * | 1/2024 | Shin | ....................... | G06F 1/1637 |
| 11,862,048 B2 * | 1/2024 | Li | ........................... | G09F 9/301 |
| 12,069,822 B2 * | 8/2024 | Ahn | ..................... | H05K 5/0018 |
| 12,143,524 B2 * | 11/2024 | Kim | .................... | H04M 1/0262 |
| 12,360,554 B2 * | 7/2025 | Park | ...................... | G06F 1/1624 |
| 2020/0272271 A1 * | 8/2020 | Seo | ........................ | G06F 1/1656 |
| 2021/0326569 A1 * | 10/2021 | Song | .................... | G06F 1/1681 |
| 2022/0209145 A1 | 6/2022 | Kim et al. | | |
| 2022/0240400 A1 * | 7/2022 | Zhou | ................... | H05K 5/0217 |
| 2022/0294886 A1 | 9/2022 | Seo et al. | | |

(Continued)

FOREIGN PATENT DOCUMENTS

| | | | |
|---|---|---|---|
| KR | 1020190013992 A | | 2/2019 |
| KR | 1020220013766 A | | 2/2022 |

(Continued)

*Primary Examiner* — Lisa Lea-Edmonds

(74) *Attorney, Agent, or Firm* — CANTOR COLBURN LLP

(57) ABSTRACT

A display device includes a display module, a first support plate that is disposed under the display module and that includes a first part and a second part that extends from the first part, a plurality of protrusions that protrude from a lower surface of the second part, and a second support plate that is disposed under the first support plate and that includes a flat part and a flexible part that extends from the flat part, the flexible part being inserted into a plurality of grooves defined between the plurality of protrusions.

21 Claims, 42 Drawing Sheets

(56) References Cited

U.S. PATENT DOCUMENTS

| | | | |
|---|---|---|---|
| 2023/0089831 A1* | 3/2023 | Li ......................... | G06F 1/1601 |
| | | | 361/679.01 |
| 2023/0095247 A1* | 3/2023 | Feng ..................... | G06F 1/1624 |
| | | | 361/679.27 |
| 2023/0180403 A1* | 6/2023 | Ahn ....................... | G09F 9/301 |
| | | | 361/807 |
| 2024/0063528 A1* | 2/2024 | Seol ..................... | H04M 1/0237 |
| 2024/0107692 A1* | 3/2024 | Jin ........................ | G06F 1/1624 |
| 2024/0176392 A1* | 5/2024 | Choi ..................... | G06F 1/1681 |
| 2024/0176396 A1* | 5/2024 | Kim ..................... | G06F 1/1616 |
| 2024/0272679 A1* | 8/2024 | Kim ..................... | G06F 1/1652 |
| 2024/0324123 A1* | 9/2024 | Kim ..................... | H05K 5/0217 |
| 2024/0357028 A1* | 10/2024 | Lee ..................... | H05K 5/0217 |
| 2024/0365494 A1* | 10/2024 | Kim ..................... | H05K 5/0217 |
| 2024/0373571 A1* | 11/2024 | Ahn ..................... | G06F 1/1652 |

FOREIGN PATENT DOCUMENTS

| | | |
|---|---|---|
| KR | 1020220076145 A | 6/2022 |
| KR | 1020220095572 A | 7/2022 |

* cited by examiner

DISPLAY DEVICE

This application claims priority to Korean Patent Application No. 10-2023-0019848, filed on Feb. 15, 2023, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

In general, an electronic device, such as a smart phone, a digital camera, a notebook computer, a car navigation unit, a smart television, or the like, which provides an image to a user includes a display device for displaying an image. The display device generates an image and provides the generated image to the user through a display screen.

With a development of display device technology, various types of display devices are being developed. For example, a flexible display device that may be slid or wound to extend outside a case is being developed. The flexible display device that may be deformed in various ways may be easy to carry and may improve user convenience.

The flexible display device includes a flexible display module. The display module is accommodated in the case and is extended by being withdrawn from the case to the outside as desired. A support part for supporting the display module is disposed under the display module. A support part that easily supports the display module and has flexible characteristics together with the display module is desired to be developed.

SUMMARY

Embodiments of the disclosure provide a display device that includes first and second support plates easily supporting a display module and that is capable of preventing visibility of a pattern of the second support plate and improving impact resistance.

In an embodiment, a display device includes a display module, a first support plate that is disposed under the display module and that includes a first part and a second part that extends from the first part, a plurality of protrusions that protrude from a lower surface of the second part, and a second support plate that is disposed under the first support plate and that includes a flat part and a flexible part that extends from the flat part, the flexible part being inserted into a plurality of grooves defined between the plurality of protrusions.

In an embodiment, a display device includes a display module, a first support plate that is disposed on a lower surface of the display module and that includes a first part and a second part that extends from the first part and folded, a plurality of protrusions that protrude from a lower surface of the second part, a second support plate including a flat part disposed on a lower surface of the first part and a flexible part inserted into a plurality of grooves defined between the plurality of protrusions, the flexible part being folded together with the second part, and a first case and a second case that are coupled with each other and accommodate the display module and the first and second support plates and that are movable away from or toward each other. In an case that the first case and the second case move away from each other, an exposed area of the display module exposed outside the first and second cases is increased, and a flat portion of the flexible part disposed flat together with the flat part is extended.

BRIEF DESCRIPTION OF THE DRAWINGS

The above and other embodiments, advantages and features of the disclosure will become apparent by describing in detail embodiments thereof with reference to the accompanying drawings.

FIG. 24 illustrates a default mode of the display device illustrated in FIG. 1.

FIG. 25 illustrates the extended mode of the display device illustrated in FIG. 2.

DETAILED DESCRIPTION

Figure 1:
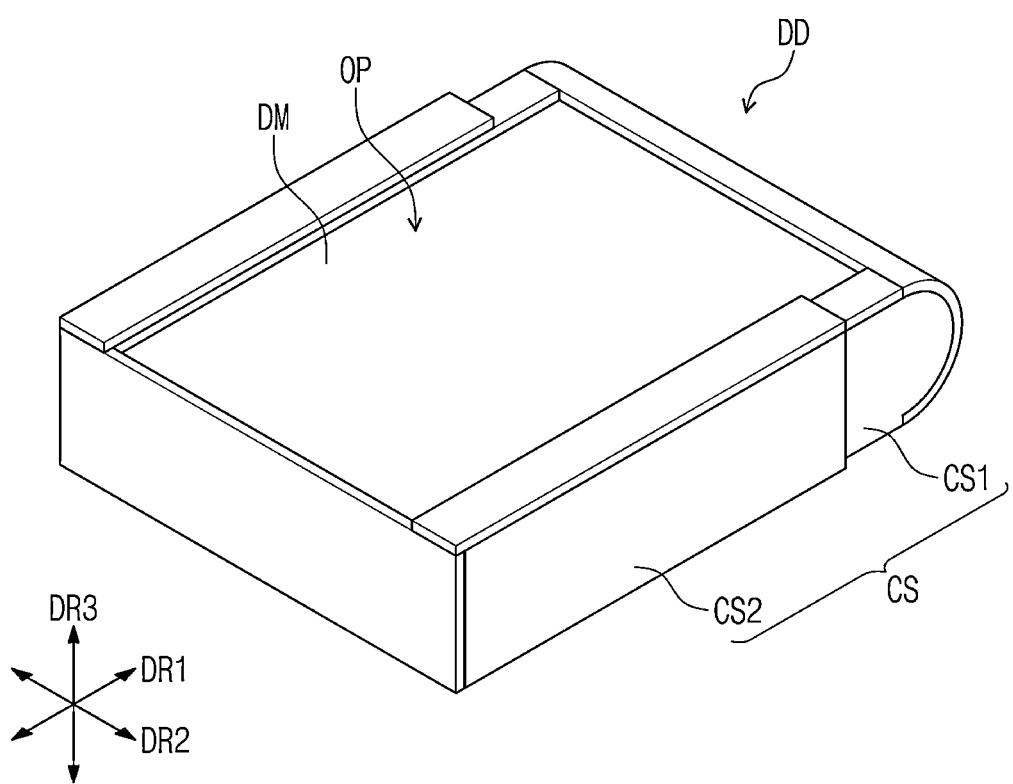
FIG. 1 is a perspective view of an embodiment of a display device according to the disclosure.

In this specification, when it is mentioned that a component (or, a region, a layer, a part, etc.) is referred to as being "on", "connected to" or "coupled to" another component, this means that the component may be directly on, connected to, or coupled to the other component or a third component may be therebetween.

Identical reference numerals refer to identical components. Additionally, in the drawings, the thicknesses, proportions, and dimensions of components are exaggerated for effective description.

As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the disclosure, a first component may be also referred to as a second component, and similarly, the second component may also be also referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the disclosure will be described with reference to the accompanying drawings.

Figure 2:
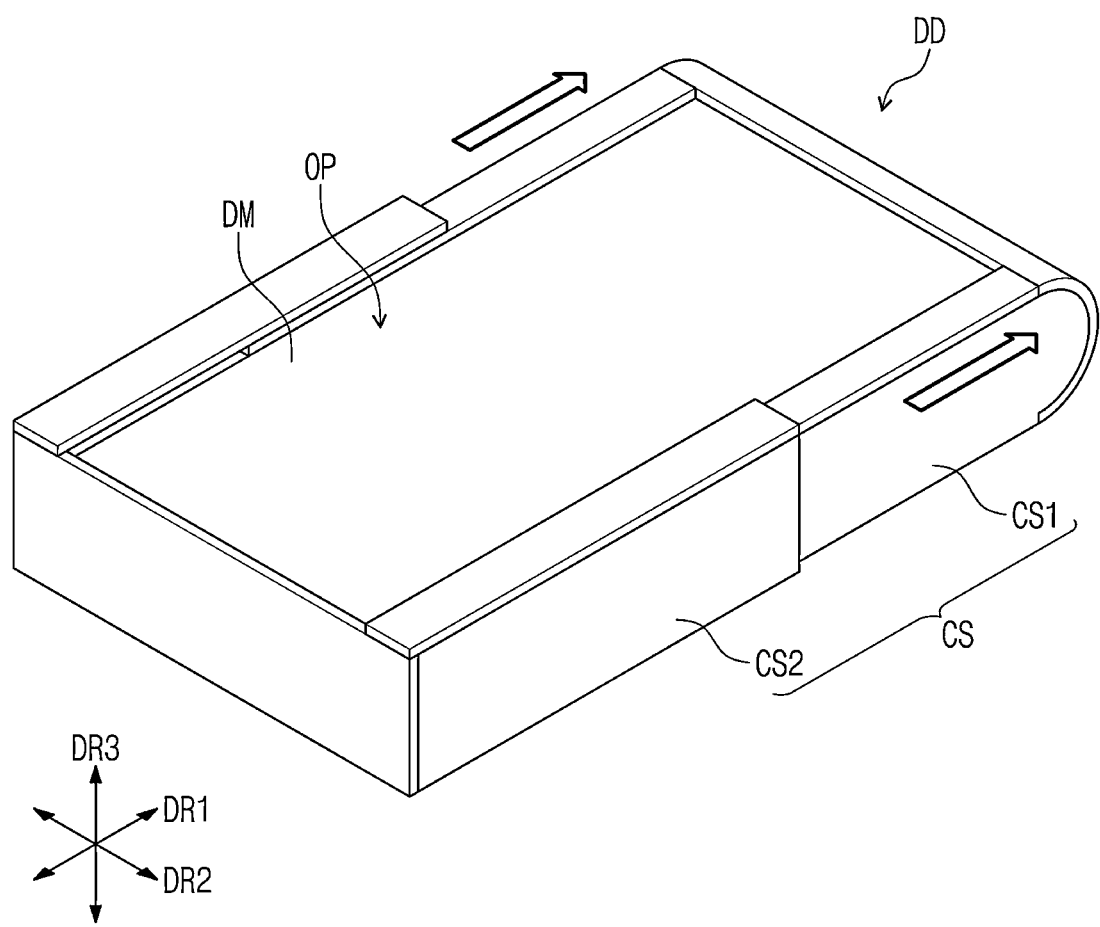
FIG. 2 is a view for explaining an extended mode of the display device illustrated in FIG. 1.

FIG. 1 is a perspective view of an embodiment of a display device according to the disclosure. FIG. 2 is a view for explaining an extended mode of the display device illustrated in FIG. 1.

Referring to FIG. 1, the display device DD in an embodiment of the disclosure may include a display module DM and a case CS accommodating the display module DM. The display module DM may be exposed to the outside through an opening OP defined in an upper portion of the case CS.

The case CS may include a first case CS1 and a second case CS2 that are coupled with each other and that accommodate the display module DM. The first case CS1 may be coupled to the second case CS2 so as to move in a first direction DR1.

Hereinafter, a direction crossing the first direction DR1 is defined as a second direction DR2. A direction substantially vertically crossing a plane defined by the first and second directions DR1 and DR2 is defined as a third direction DR3. As used herein, the expression "a plan view" may mean a view in the third direction DR3.

More detailed configurations of the first and second cases CS1 and CS2 will be described below in detail with reference to an exploded perspective view of the case CS illustrated in FIG. 17.

Referring to FIGS. 1 and 2, the first case CS1 may move away from or toward the second case CS2 in the first direction DR1. When the first case CS1 moves in the first direction DR1, the area of an exposed surface of the display module DM may be adjusted depending on the movement of the first case CS1.

The display module DM may be a flexible display module and may be supported by a support plate (illustrated in FIG. 9) that is disposed under the display module DM. A detailed structure of the support part will be described below in detail with reference to FIG. 9.

The display module DM and the support part may be accommodated in the first case CS1 and the second case CS2. The display module DM and the support part may be connected to the second case CS2, and when the first case CS1 moves away from the second case CS2 in the first direction DR1, the display module DM and the support part may also move in the first direction DR1.

Although not illustrated, a portion of the display module DM not exposed to the outside in addition to the portion of the display module DM exposed through the opening OP may be defined in the first case CS1.

Referring to FIG. 2, the first case CS1 may move away from the second case CS2 in the first direction DR1. The display module DM may move in the first direction DR1 depending on the movement of the first case CS1, and thus the exposed surface of the display module DM may be extended. As the exposed surface of the display module DM is extended, a user may visually recognize an image through a larger screen. The state of the display device DD in which the exposed surface of the display module DM is extended may be defined as the extended mode.

Referring to FIG. 1, the first case CS1 may toward the second case CS2 in the first direction DR1. When the first case CS1 moves toward the second case CS2 to the maximum, the exposed surface of the display module DM may be set to a minimum. The state of the display device DD may be defined as a default mode. The default mode and the extended mode of the display device DD may be implemented depending on the movement of the first case CS1.

Figure 3:
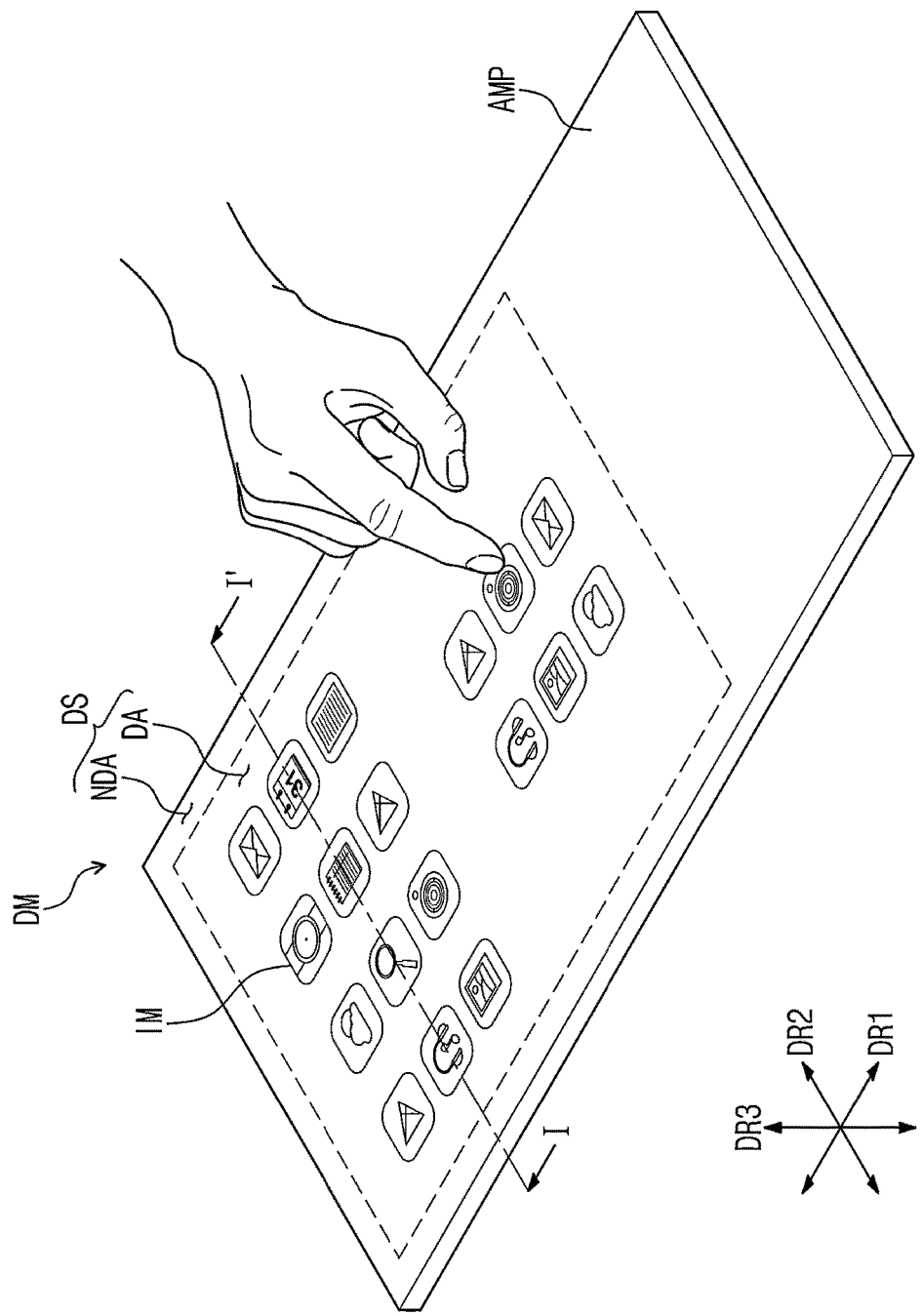
FIG. 3 is a plan view of a display module accommodated in a case illustrated in FIG. 1.
Figure 4:
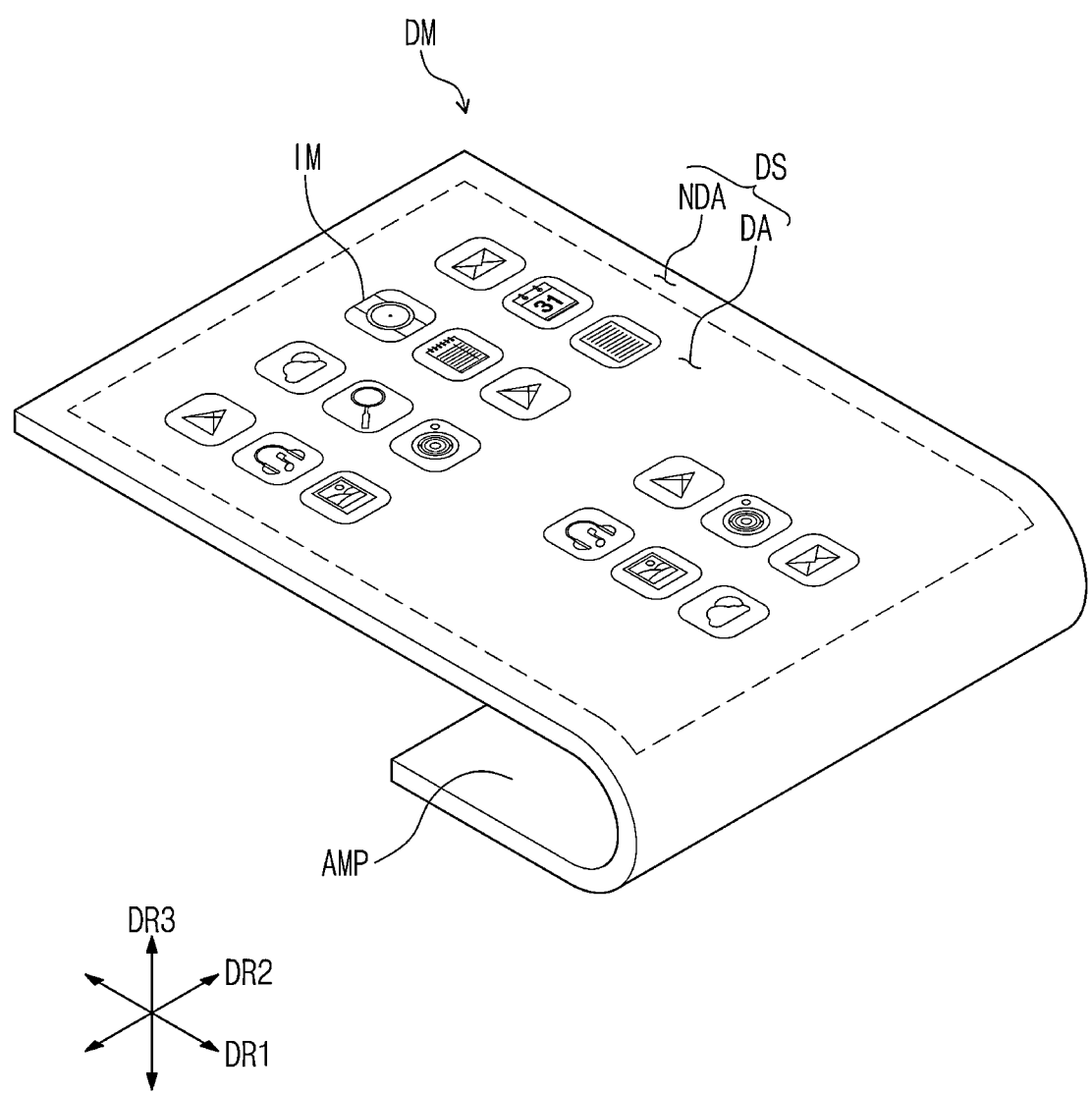
FIG. 4 is a view illustrating a folded state of the display module illustrated in FIG. 3.

FIG. 3 is a plan view of the display module accommodated in the case illustrated in FIG. 1. FIG. 4 is a view illustrating a folded state of the display module illustrated in FIG. 3.

Referring to FIG. 3, the display module DM may have a quadrangular shape, e.g., a rectangular shape with long sides extending in the first direction DR1 and short sides extending in the second direction DR2. However, without being limited thereto, the display module DM may have various shapes such as a circular shape, a polygonal shape, or the like.

An upper surface of the display module DM may be defined as a display surface DS and may have a plane defined by the first direction DR1 and the second direction DR2. Images IM generated by the display module DM may be provided to the user through the display surface DS.

The display surface DS may include a display region DA and a non-display region NDA around the display region DA. The display region DA may display an image, and the non-display region NDA may not display an image. The non-display region NDA may surround the display region DA and may define the border of the display module DM that is printed in a predetermined color.

The display module DM may sense an input applied from the outside. In an embodiment, the display module DM may sense a touch of the user as an external input and may display an image corresponding to a sensed signal, for example.

The display module DM may include an accommodated portion AMP adjacent to the display region DA. The accommodated portion AMP may be adjacent to one side of the display module DM in the first direction DR1. The accommodated portion AMP may be substantially the non-display region NDA. The accommodated portion AMP may be defined as the non-display region NDA adjacent to the one side of the display module DM.

The accommodated portion AMP may have a larger area than that of the non-display regions NDA adjacent to opposite sides of the display module DM that face away from each other in the second direction DR2 and the non-display region NDA adjacent to an opposite side of the display module DM that faces in the first direction DR1.

Referring to FIGS. 1 and 4, the display module DM may be a flexible display module. The display module DM may be folded and accommodated in the case CS. The display region DA of the display module DM may be exposed to the outside. The area of the display region DA exposed to the outside may be adjusted depending on the movement of the first case CS1.

When the display module DM is folded, the accommodated portion AMP may be disposed under the display region DA. The accommodated portion AMP may be accommodated in the case CS and may not be exposed to the outside. A driver for driving elements of the display module DM may be disposed in the accommodated portion AMP.

Figure 5:
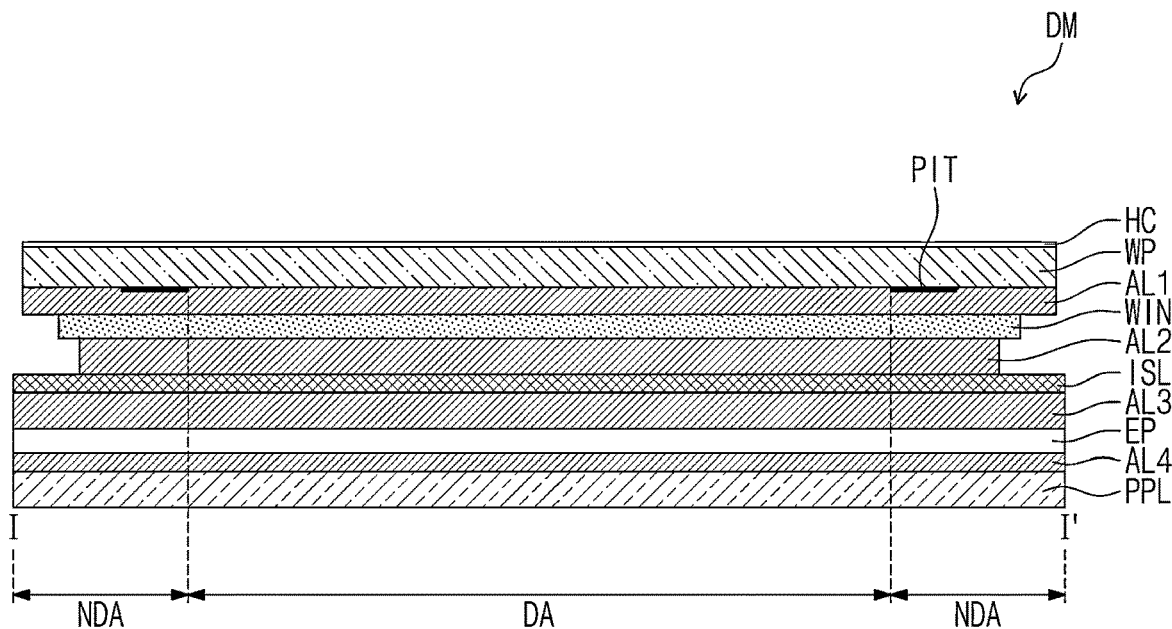
FIG. 5 is a cross-sectional view taken along line I-I' illustrated in FIG. 3.
Figure 5:
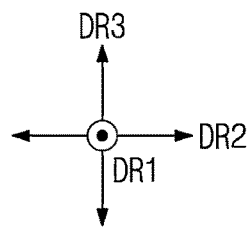

FIG. 5 is a cross-sectional view taken along line I-I' illustrated in FIG. 3.

Referring to FIG. 5, the display module DM may include an electronic panel EP, an impact absorbing layer ISL, a panel protection layer PPL, a window WIN, a window protection layer WP, a hard coating layer HC, and first to fourth adhesive layers AL1 to AL4.

The electronic panel EP may display an image. The electronic panel EP may include a display panel, an input sensing unit, and an anti-reflection layer, and the configuration of the electronic panel EP will be described below with reference to FIG. 6.

The impact absorbing layer ISL may be disposed on the electronic panel EP. The impact absorbing layer ISL may protect the electronic panel EP by absorbing an external impact applied from above the display device DD toward the electronic panel EP. The impact absorbing layer ISL may be manufactured in the form of a stretchable film.

The impact absorbing layer ISL may include a flexible plastic material. The flexible plastic material may be defined as a synthetic resin film. In an embodiment, the impact absorbing layer ISL may include a flexible plastic material such as polyimide ("PI") or polyethylene terephthalate ("PET"), for example.

The window WIN may be disposed on the impact absorbing layer ISL. The window WIN may protect the electronic panel EP from external scratches. The window WIN may have a property of being optically clear. The window WIN may include glass. However, without being limited thereto, the window WIN may include a synthetic resin film.

The window protection layer WP may be disposed on the window WIN. The window protection layer WP may include a flexible plastic material such as polyimide or polyethylene terephthalate. The hard coating layer HC may be disposed on an upper surface of the window protection layer WP.

A printed layer PIT may be disposed on a lower surface of the window protection layer WP. The printed layer PIT may be black in color. However, the color of the printed layer PIT is not limited thereto. The printed layer PIT may be adjacent to the periphery of the window protection layer WP. The printed layer PIT may overlap the non-display region NDA.

The panel protection layer PPL may be disposed under the electronic panel EP. The panel protection layer PPL may protect a lower portion of the electronic panel EP. The panel protection layer PPL may include a flexible plastic material. In an embodiment, the panel protection layer PPL may include polyimide or polyethylene terephthalate, for example.

The first adhesive layer AL1 may be disposed between the window protection layer WP and the window WIN. The window protection layer WP and the window WIN may be bonded to each other by the first adhesive layer AL1. The first adhesive layer AL1 may cover the printed layer PIT.

The second adhesive layer AL2 may be disposed between the window WIN and the impact absorbing layer ISL. The window WIN and the impact absorbing layer ISL may be bonded to each other by the second adhesive layer AL2.

The third adhesive layer AL3 may be disposed between the impact absorbing layer ISL and the electronic panel EP. The impact absorbing layer ISL and the electronic panel EP may be bonded to each other by the third adhesive layer AL3.

The fourth adhesive layer AL4 may be disposed between the electronic panel EP and the panel protection layer PPL. The electronic panel EP and the panel protection layer PPL may be bonded to each other by the fourth adhesive layer AL4.

The first to fourth adhesive layers AL1 to AL4 may include a pressure sensitive adhesive ("PSA") or an optically clear adhesive ("OCA"). However, the type of adhesive is not limited thereto.

Figure 6:
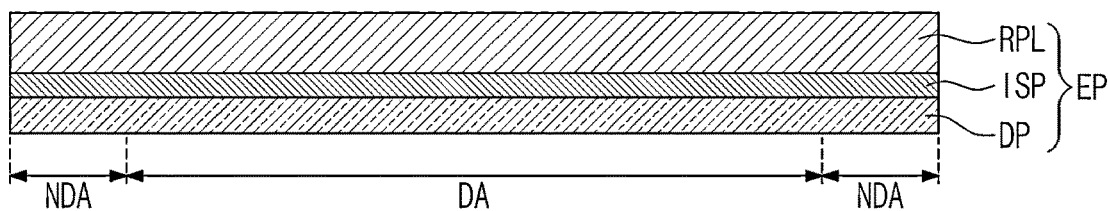
FIG. 6 is a cross-sectional view illustrating a configuration of an electronic panel illustrated in FIG. 5.
Figure 6:
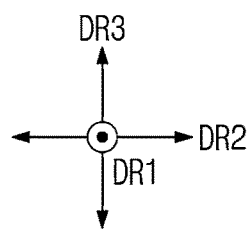

FIG. 6 is a cross-sectional view illustrating a configuration of the electronic panel illustrated in FIG. 5.

In FIG. 6, a section of the electronic panel EP viewed in the first direction DR1 is illustrated.

Referring to FIG. 6, the electronic panel EP may include the display panel DP, the input sensing unit ISP disposed on the display panel DP, and the anti-reflection layer RPL disposed on the input sensing unit ISP. The display panel DP may be a flexible display panel. In an embodiment, the display panel DP may include a flexible substrate and a plurality of elements disposed on the flexible substrate, for example.

The display panel DP in an embodiment of the disclosure may be an emissive display panel, but is not particularly limited. In an embodiment, the display panel DP may be an organic light-emitting display panel or an inorganic light-emitting display panel, for example. An emissive layer of the organic light-emitting display panel may include an organic light-emitting material. An emissive layer of the inorganic light-emitting display panel may include quantum dots, quantum rods, or the like. Hereinafter, it will be exemplified that the display panel DP is an organic light-emitting display panel.

The input sensing unit ISP may include a plurality of sensing parts (not illustrated) for sensing an external input. In an embodiment, the input sensing unit ISP may sense an external input in a capacitive manner, for example. However, a sensing method of the input sensing unit ISP is not limited thereto. The input sensing unit ISP may be directly formed on the display panel DP when the electronic panel EP is manufactured.

The anti-reflection layer RPL may be disposed on the input sensing unit ISP. The anti-reflection layer RPL may be directly formed on the input sensing unit ISP when the electronic panel EP is manufactured. The anti-reflection layer RPL may be defined as a film for preventing reflection of external light. The anti-reflection layer RPL may decrease the reflectance of external light incident toward the display panel DP from above the display device DD.

When external light travelling toward the display panel DP is reflected from the display panel DP and provided back to the user, the user may visually recognize the external light as in a mirror. To prevent such a phenomenon, the anti-reflection layer RPL may include a plurality of color filters that display the same colors as those of pixels of the display panel DP.

The color filters may filter external light into the same colors as those of the pixels. In this case, the external light may not be visible to the user. However, without being limited thereto, the anti-reflection layer RPL may include a phase retarder and/or a polarizer to decrease the reflectance of the external light.

In an embodiment, the input sensing unit ISP may be directly formed on the display panel DP, and the anti-reflection layer RPL may be directly formed on the input sensing unit ISP, for example. However, the disclosure is not limited thereto. In an embodiment, the input sensing unit ISP may be separately manufactured and may be attached to the display panel DP by an adhesive layer, and the anti-reflection layer RPL may be separately manufactured and may be attached to the input sensing unit ISP by an adhesive layer.

Figure 7:
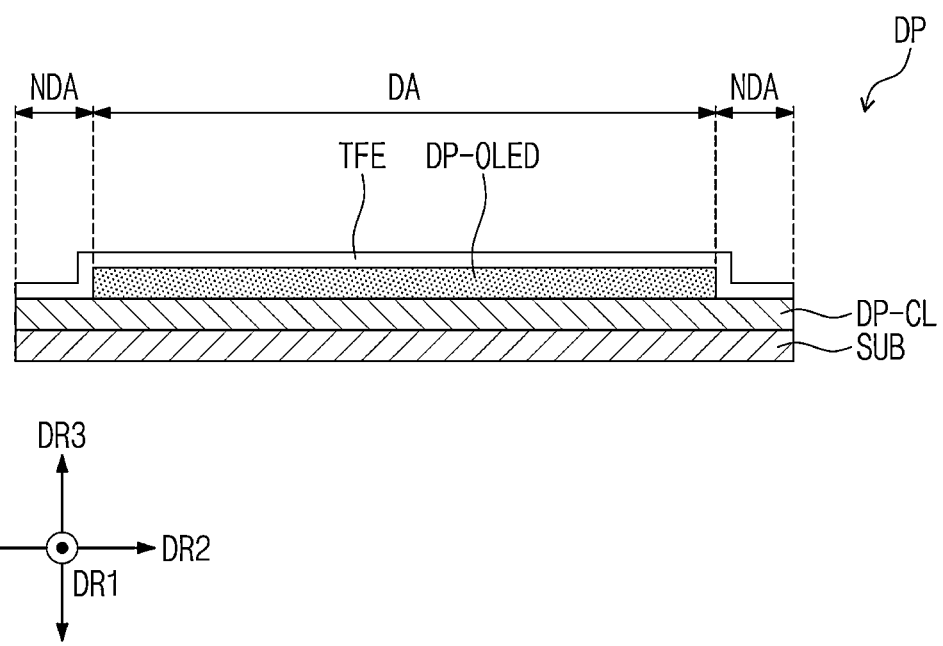
FIG. 7 is a cross-sectional view illustrating a configuration of a display panel illustrated in FIG. 6.

FIG. 7 is a cross-sectional view illustrating a configuration of the display panel illustrated in FIG. 6.

In FIG. 7, a section of the display panel DP viewed in the first direction DR1 is illustrated.

Referring to FIG. 7, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display region DA and a non-display region NDA around the display region DA. The substrate SUB may include a flexible plastic material such as polyimide. The display element layer DP-OLED may be disposed on the display region DA.

A plurality of pixels may be disposed in the display region DA. Each of the pixels may include a light-emitting element that is connected to a transistor disposed in the circuit element layer DP-CL and is disposed in the display element layer DP-OLED.

The thin film encapsulation layer TFE may be disposed on the circuit element layer DP-CL to cover the display element layer DP-OLED. The thin film encapsulation layer TFE may include inorganic layers and an organic layer between the inorganic layers. The inorganic layers may protect the pixels from moisture/oxygen. The organic layer may protect the pixels from foreign matter such as dust particles.

Figure 8:
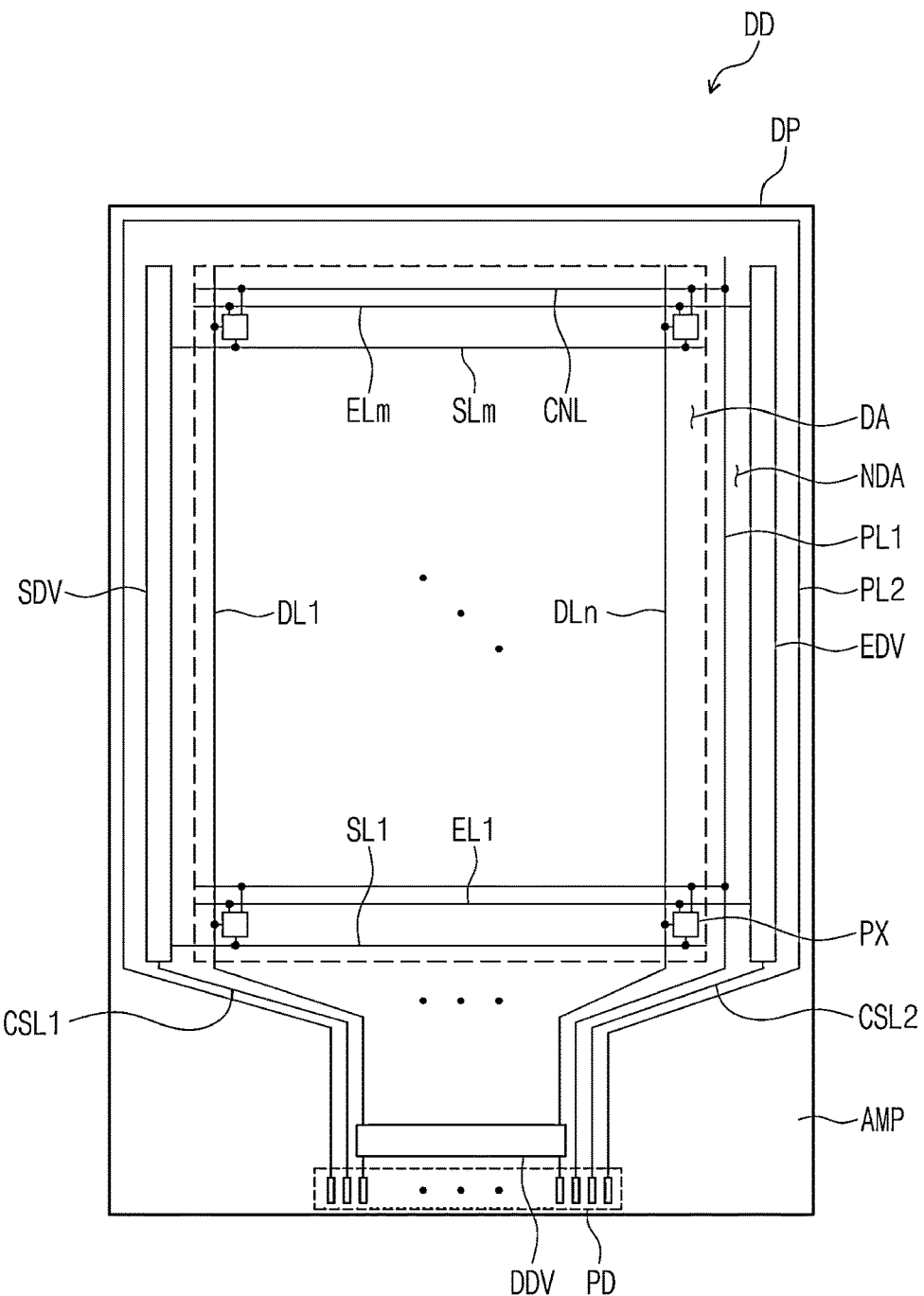
FIG. 8 is a plan view of the display panel illustrated in FIG. 7.

FIG. 8 is a plan view of the display panel illustrated in FIG. 7.

Referring to FIG. 8, the display device DD may include the display panel DP, a scan driver SDV, a data driver DDV, a light emission driver EDV, and a plurality of pads PD.

The display panel DP may have a quadrangular shape, e.g., a rectangular shape with long sides extending in the first direction DR1 and short sides extending in the second direction DR2. However, the shape of the display panel DP is not limited thereto. The display panel DP may include a display region DA and a non-display region NDA surrounding the display region DA.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, first and second power lines PL1 and PL2, and a plurality of connecting lines CNL. "m" and "n" are natural numbers.

The pixels PX may be disposed in the display region DA. The scan driver SDV and the light emission driver EDV may be disposed in the non-display regions NDA adjacent to the long sides of the display panel DP, respectively. The data driver DDV may be disposed in the non-display region NDA adjacent to one of the short sides of the display panel DP. The data driver DDV may be adjacent to a lower end of the display panel DP in a plan view.

In FIG. 8, the accommodated portion AMP may be defined as the non-display region NDA adjacent to the lower end of the display panel DP. The data driver DDV may be disposed on the accommodated portion AMP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The light emission lines EL1 to ELm may extend in the second direction DR2 and may be connected to the pixels PX and the light emission driver EDV.

The first power line PL1 may extend in the first direction DR1 and may be disposed in the non-display region NDA. The first power line PL1 may be disposed between the display region DA and the light emission driver EDV.

The connecting lines CNL may extend in the second direction DR2 and may be arranged in the first direction DR1 and connected to the first power line PL1 and the pixels PX. A first voltage may be applied to the pixels PX through the first power line PL1 and the connecting lines CNL connected with each other.

The second power line PL2 may be disposed in the non-display region NDA and may extend along the long sides of the display panel DP and the other short side of the display panel DP where the data driver DDV is not disposed. The second power line PL2 may be disposed outward of the scan driver SDV and the light emission driver EDV.

Although not illustrated, the second power line PL2 may extend toward the display region DA and may be connected to the pixels PX. A second voltage having a lower level than that of the first voltage may be applied to the pixels PX through the second power line PL2.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be disposed between the first control line CSL1 and the second control line CSL2.

The pads PD may be disposed in the non-display region NDA adjacent to the lower end of the display panel DP and may be closer to the lower end of the display panel DP than the data driver DDV. The data driver DDV, the first power line PL1, the second power line PL2, the first control line CSL1, and the second control line CSL2 may be connected to the pads PD. The data lines DL1 to DLn may be connected to the data driver DDV, and the data driver DDV may be connected to the pads PD corresponding to the data lines DL1 to DLn.

Although not illustrated, the display device DD may further include a timing controller for controlling operations of the scan driver SDV, the data driver DDV, and the light emission driver EDV and a voltage generator for generating the first and second voltages. The timing controller and the voltage generator may be connected to the pads PD through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of light emission signals, and the light emission signals may be applied to the pixels PX through the light emission lines EL1 to ELm.

The pixels PX may receive the data voltages in response to the scan signals. The pixels PX may display an image by emitting light having luminance corresponding to the data voltages in response to the light emission signals.

Figure 9:
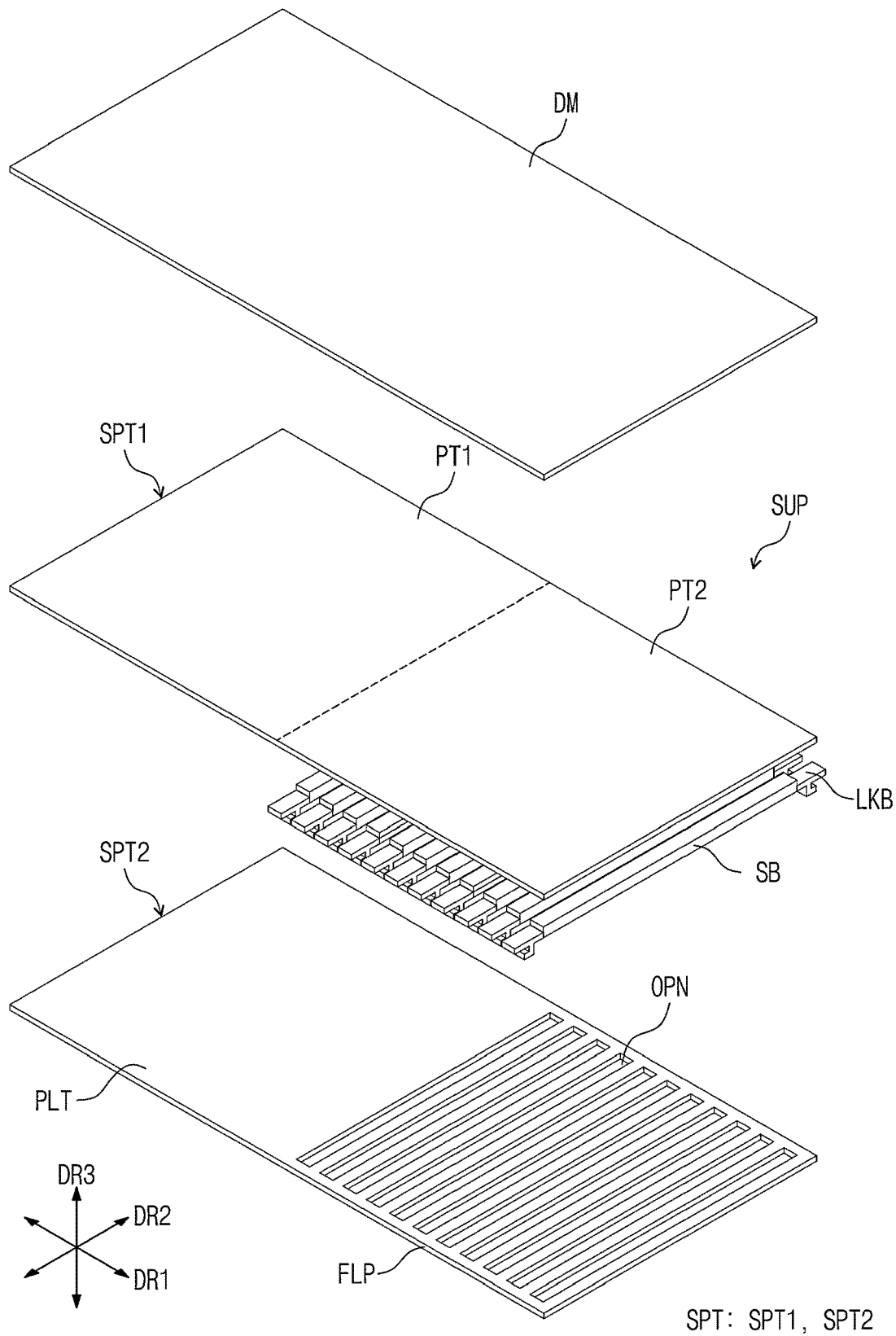
FIG. 9 is a perspective view of the display module illustrated in FIG. 3 and a support part supporting the display module.

FIG. 9 is a perspective view of the display module illustrated in FIG. 3 and the support part supporting the display module.

Referring to FIG. 9, the support plate SPT may be disposed under the display module DM and may support the display module DM. The support part SUP may include a first support plate SPT1, a second support plate SPT2, a plurality of support bars SB, and a plurality of link bars LKB.

The first and second support plates SPT1 and SPT2 may include metal. In an embodiment, the first and second support plates SPT1 and SPT2 may include a titanium alloy including or consisting of titanium (Ti), niobium (Nb), and zirconium (Zr), for example. However, without being limited thereto, the first and second support plates SPT1 and SPT2 may include stainless steel.

The titanium alloy may have a predetermined gravity of about 4.4 grams per square centimeter (g/cm$^2$), a yield strength of about 380 gigapascals (GPa) to about 420 GPa, and a thermal conductivity of about 19.9 watts per meter-kelvin (W/m*k).

The support bars SB and the link bars LKB may also include a metallic material such as a titanium alloy or stainless steel.

The first support plate SPT1 may be disposed on a lower surface of the display module DM. The first support plate SPT1 may have a plane defined by the first and second directions DR1 and DR2. The first support plate SPT1 may have a quadrangular shape, e.g., a rectangular shape extending longer in the first direction DR1 than in the second direction DR2. The first support plate SPT1 may include a first part PT1 and a second part PT2 extending from the first part PT1 in the first direction DR1.

The support bars SB and the link bars LKB may be disposed under the second part PT2. The support bars SB may extend in the second direction DR2 and may be arranged in the first direction DR1. The link bars LKB may be arranged in the first direction DR1. The link bars LKB may be coupled to opposite sides of the support bars SB that face away from each other in the second direction DR2. In an embodiment, the link bars LKB may be coupled to the support bars SB by a welding process, for example. Detailed configurations of the link bars LKB will be described below in detail.

The second support plate SPT2 may be disposed under the first support plate SPT1. The second support plate SPT2 may have a plane defined by the first and second directions DR1 and DR2. The second support plate SPT2 may have a quadrangular shape, e.g., a rectangular shape extending longer in the first direction DR1 than in the second direction DR2.

The second support plate SPT2 may include a flat part PLT and a flexible part FLP extending from the flat part PLT in the first direction DR1. The flat part PLT may be disposed under the first part PTT, and the flexible part FLP may be disposed under the second part PT2. In a plan view, the flat part PLT may overlap the first part PT1, and the flexible part FLP may overlap the second part PT2.

The flat part PLT may have a plane defined by the first and second directions DR1 and DR2. The flat part PLT may remain flat. A predetermined pattern may be formed in the flexible part FLP. In an embodiment, a plurality of openings OPN defining an opening pattern may be defined in the flexible part FLP, for example. The openings OPN may extend in the second direction DR2 and may be arranged in the first direction DR1. The openings OPN may be defined to be spaced apart from opposite sides of the flexible part FLP in the second direction DR2.

Since the openings OPN are defined in the flexible part FLP, the flexible part FLP may have a lower elastic modulus than that of the flat part PLT. That is, the flexible part FLP may be more bendable than that of the flat part PLT.

When the second support plate SPT2 includes a titanium alloy, the elastic modulus of the second support plate SPT2 may be as follows.

The flat part PLT may have an elastic modulus of about 150 GPa to about 180 GPa. The flexible part FLP may have an elastic modulus of about 320 megapascals (MPa) to about 800 MPa.

When the second support plate SPT2 includes stainless steel, the elastic modulus of the second support plate SPT2 may be as follows.

The flat part PLT may have an elastic modulus of about 150 GPa to about 200 GPa. The flexible part FLP may have an elastic modulus of about 350 MPa to about 900 MPa.

The support bars SB may be disposed to correspond to the openings OPN, respectively. In a plan view, the support bars SB may be disposed to overlap the openings OPN, respectively.

Figure 10:
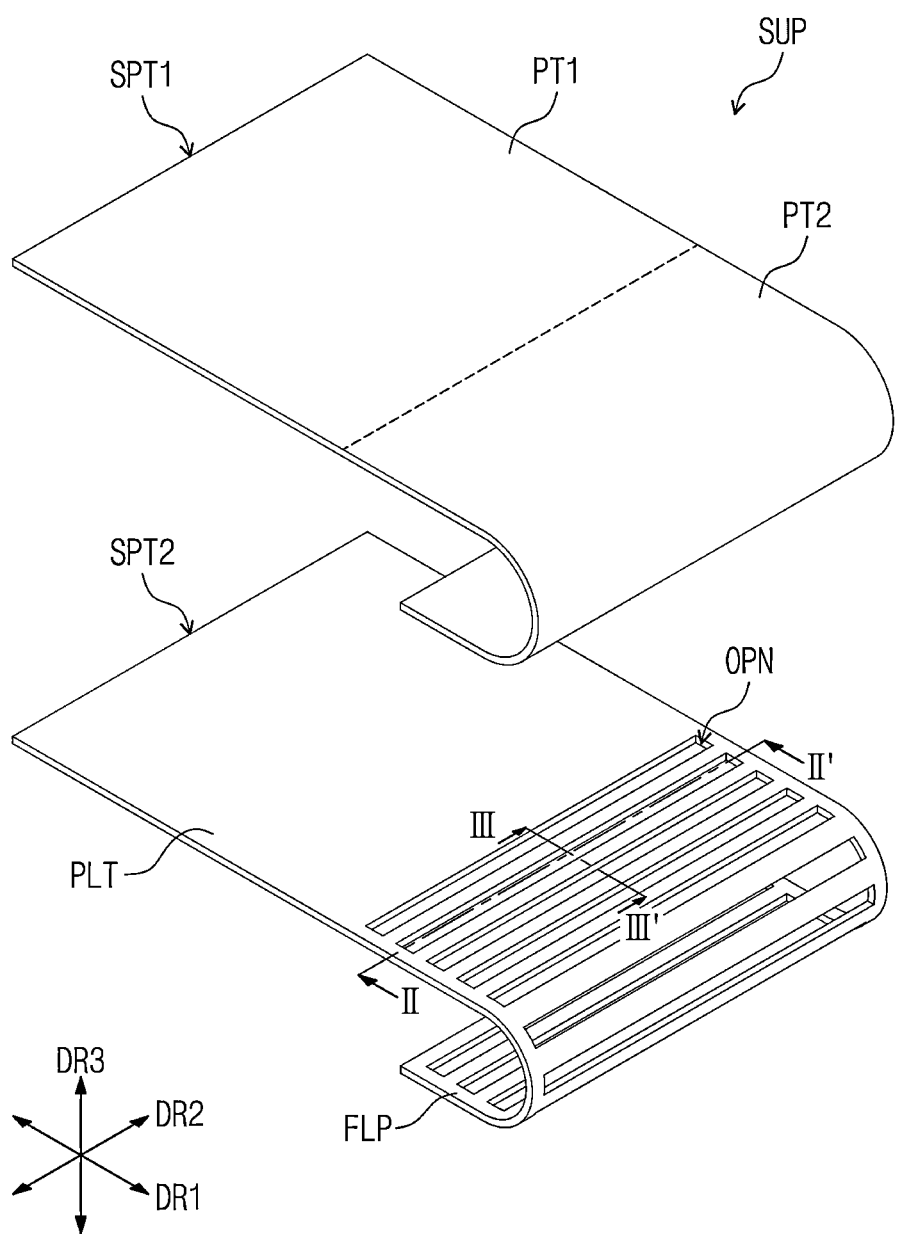
FIG. 10 is a view illustrating a bent state of first and second support plates illustrated in FIG. 9.

FIG. 10 is a view illustrating a bent state of the first and second support plates illustrated in FIG. 9.

Referring to FIG. 10, the first support plate SPT1 may be folded. In an embodiment, the second part PT2 may be folded such that a portion of the second part PT2 is disposed under the first part PT1, for example. When the second part PT2 is folded, one portion of the second part PT2 may be in a bent state, and another portion of the second part PT2 may be disposed in a flat state under the first part PT1.

The second support plate SPT2 may be folded. In an embodiment, the flexible part FLP may be folded such that a portion of the flexible part FLP is disposed under the flat part PLT, for example. When the flexible part FLP is folded, one portion of the flexible part FLP may be in a bent state, and another portion of the flexible part FLP may be disposed in a flat state under the flat part PLT.

Figure 12:
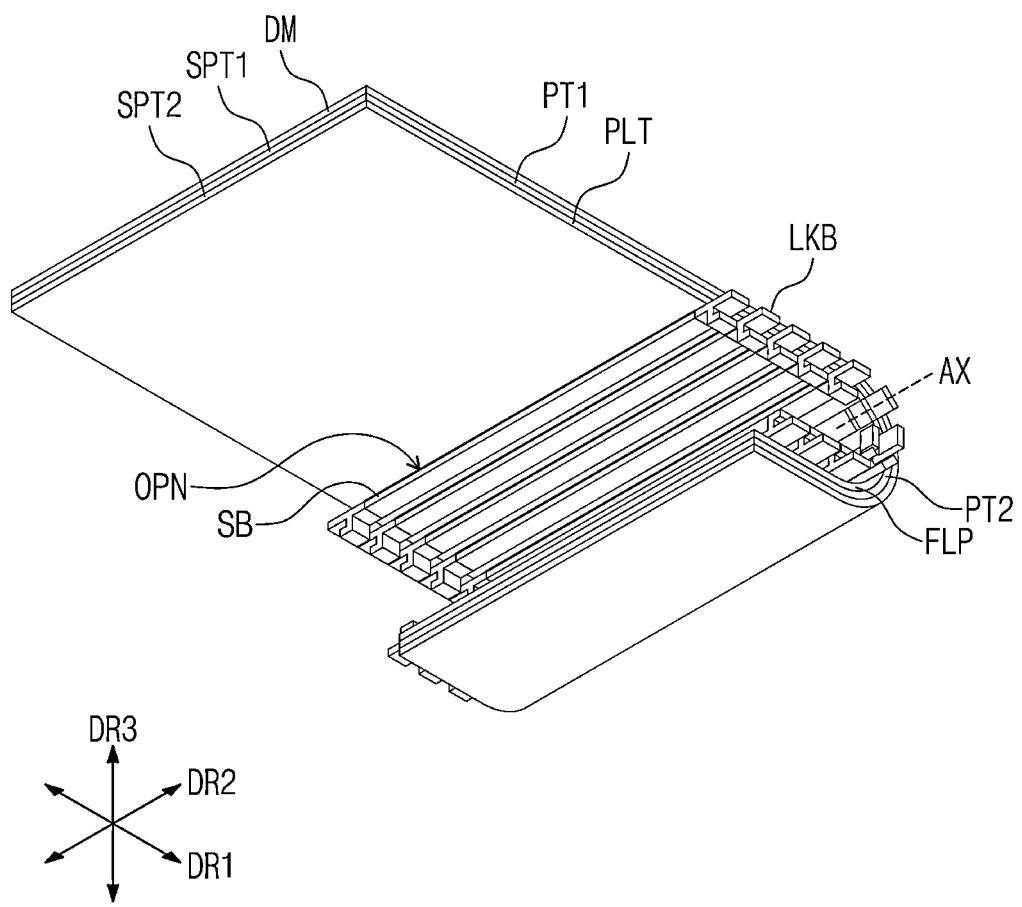
FIG. 12 is a view illustrating a coupled state of the display module, the first support plate, the second support plate, the support bars, and link bars illustrated in FIG. 9.

The second part PT2 and the flexible part FLP may be folded about an axis extending in the second direction DR2. The axis is illustrated in FIG. 12.

Although not illustrated, the display module DM may be attached to an upper surface of the first support plate SPT1 and may be folded as illustrated in FIG. 4. The display module DM may be attached to an upper surface of the first support plate SPT1 through a pressure sensitive adhesive (not illustrated).

Figure 11:
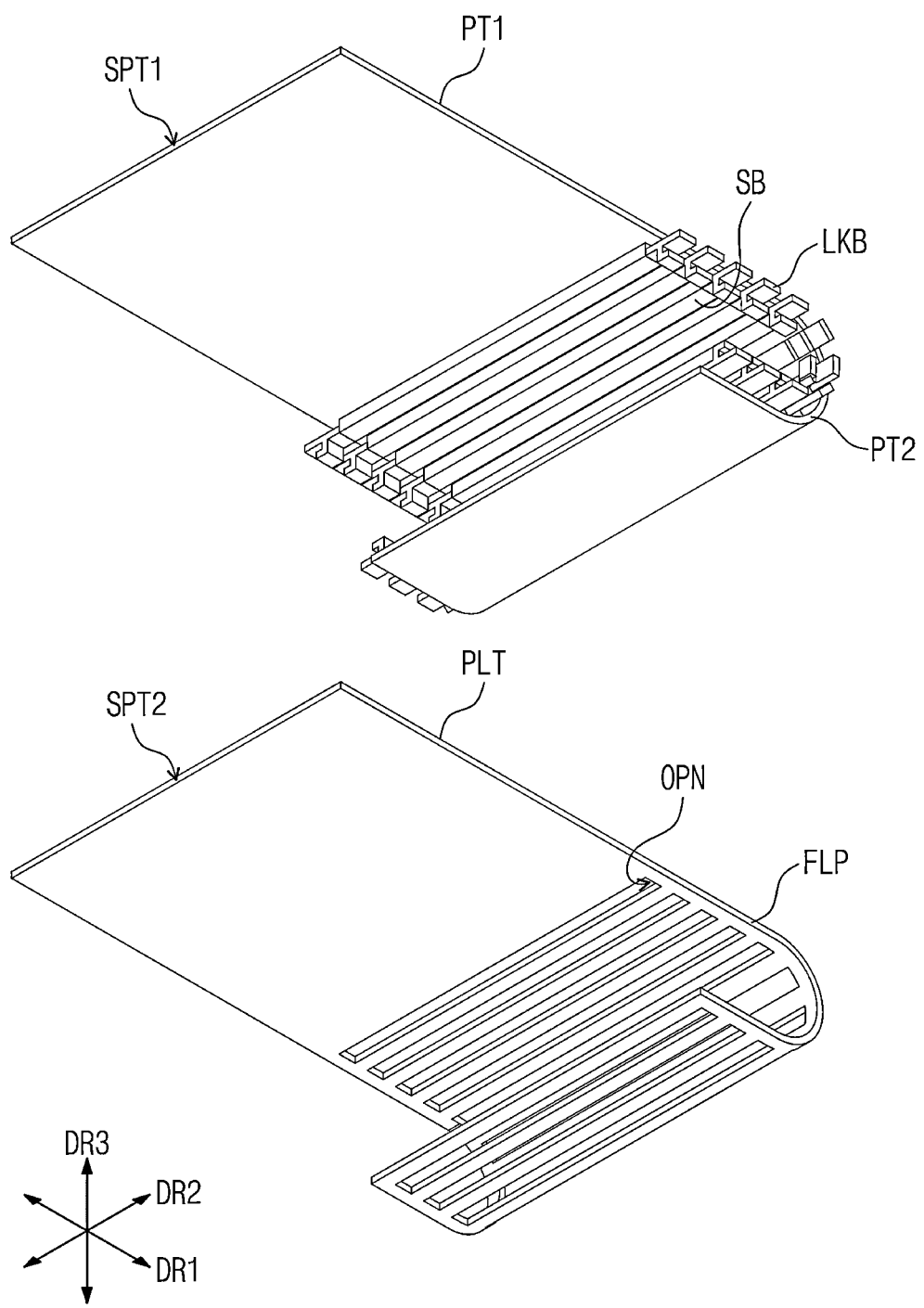
FIG. 11 is a view illustrating a state in which support bars illustrated in FIG. 9 are coupled to the first support plate.

FIG. 11 is a view illustrating a state in which the support bars illustrated in FIG. 9 are coupled to the first support plate.

In FIG. 11, lower surfaces of the first and second support plates SPT1 and SPT2 are illustrated.

Referring to FIGS. 9 and 11, the support bars SB may be coupled to the second part PT2. In an embodiment, the support bars SB may be attached to a lower surface of the second part PT2 by an adhesive, for example.

The adhesive that couples the support bars SB to the second part PT2 may include an acrylate-based resin. The adhesive force of the adhesive including the acrylate-based resin may be improved at relatively high temperature. In an embodiment, the adhesive force of the adhesive may be improved at a temperature of 70 degrees Celsius to 80 degrees Celsius, for example. Accordingly, the support bars SB may be attached to the second part PT2 by the adhesive at the temperature of 70 degrees Celsius to 80 degrees Celsius.

The support bars SB may be coupled to the lower surface of the second part PT2 and may have a shape protruding from the second part PT2. The support bars SB may be defined as a plurality of protrusions PRT protruding from the lower surface of the second part PT2. That is, the protrusions PRT may be defined as a structure including the support bars SB coupled to the lower surface of the second part PT2. Spaces between the protrusions PRT may be defined as a plurality of grooves.

Since the support bars SB are coupled to the folded second part PT2, the support bars SB may be arranged along the folded shape of the second part PT2. The support bars SB may have a bar shape. In the second direction DR2, the support bars SB may have a length smaller than the width of the flexible part FLP. The opposite sides of the support bars SB that face away from each other in the second direction DR2 may be disposed inward of the opposite sides of the flexible part FLP that face away from each other in the second direction DR2.

The link bars LKB may be coupled to the opposite sides of the support bars SB and may be arranged along the folded shape of the second part PT2. The link bars LKB may protrude outward from the opposite sides of the flexible part FLP.

Figure 13:
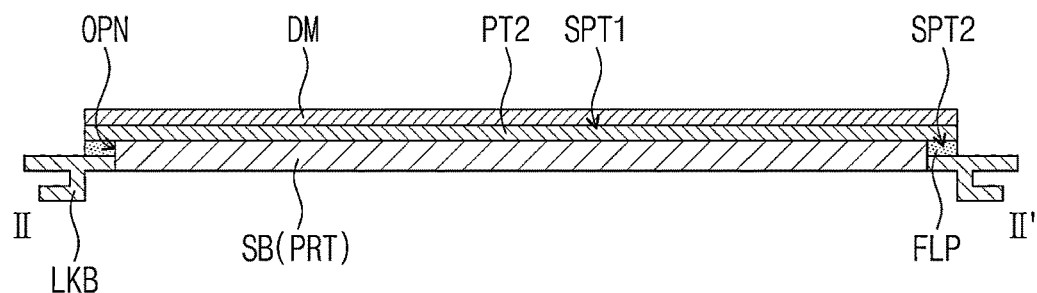
FIG. 13 is a cross-sectional view taken along line II-II' illustrated in FIG. 10.
Figure 13:
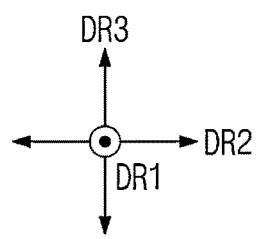

FIG. 12 is a view illustrating a coupled state of the display module, the first support plate, the second support plate, the support bars, and the link bars illustrated in FIG. 9. FIG. 13 is a cross-sectional view taken along line II-II' illustrated in FIG. 10.

In FIG. 12, a lower surface of the support part SUP is illustrated. In addition, in FIG. 13, sections of the display module DM, the first support plate SPT1, the support bars SB, and the link bars LKB are illustrated together with a section of the second support plate SPT2.

Referring to FIGS. 9, 12, and 13, the first support plate SPT1 may be disposed under the display module DM, and the second support plate SPT2 may be disposed under the first support plate SPT1. As described above, the display module DM may be coupled to the first support plate SPT1 by a pressure sensitive adhesive.

The second support plate SPT2 may be disposed on the lower surface of the first support plate SPT1 and may be coupled to the lower surface of the first support plate SPT1. In an embodiment, the second support plate SPT2 may be attached to the lower surface of the first support plate SPT1 through a pressure sensitive adhesive, for example.

The flat part PLT may be disposed on a lower surface of the first part PT1. The flexible part FLP may be disposed on the lower surface of the second part PT2. The support bars SB may be coupled to the lower surface of the second part PT2 and may be disposed in the openings OPN. The support bars SB may protrude outward from the openings OPN. Accordingly, the support bars SB may protrude downward from the flexible part FLP.

The second part PT2 may extend from the first part PT1 in the first direction DR1 and thereafter may be folded about an axis AX extending in the second direction DR2. The flexible part FLP may also extend from the flat part PLT in the first direction DR1 and thereafter may be folded about the axis AX. The second part PT2 and the flexible part FLP may be folded about the axis AX together. The axis AX may be a rotational axis of a gear to be described below, and this configuration will be described below in detail.

The link bars LKB may be connected to the opposite sides of the support bars SB and may extend to the outside. The link bars LKB may be connected to lower portions of the opposite sides of the support bars SB. The link bars LKB may protrude outward from opposite sides of the first and second support plates SPT1 and SPT2. Portions of the link bars LKB adjacent to the support bars SB may be disposed under the flexible part FLP.

Substantially, after the second support plate SPT2 is attached to the first support plate SPT1, the support bars SB may be inserted into the openings and may be attached to the first support plate SPT1.

Figure 14:
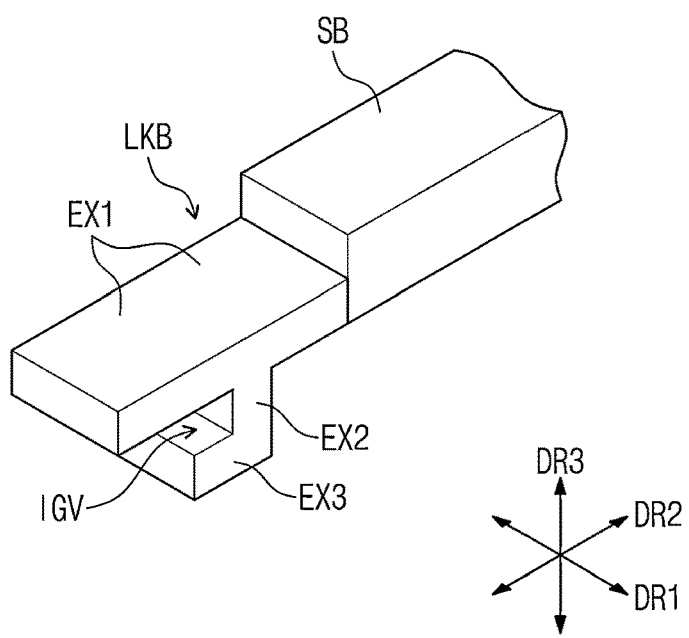
FIG. 14 is a perspective view of one of the link bars illustrated in FIG. 12.

FIG. 14 is a perspective view of one of the link bars illustrated in FIG. 12.

In FIG. 14, a portion of a support bar SB adjacent to the link bar LKB is illustrated together with the link bar LKB.

Referring to FIG. 14, the link bar LKB may include a first extension EX1, a second extension EX2, and a third extension EX3. The first extension EXT may extend in the second direction DR2. The second extension EX2 may extend downward from a portion of the first extension EX1. The third extension EX3 may extend from a lower end of the second extension EX2 in the second direction DR2 and may face the first extension EXT in the third direction DR3.

A space between the first, second, and third extensions EX1, EX2, and EX3 may be defined as an insertion groove IGV. According to this structure, the insertion groove IGV may be defined on one side of the link bar LKB that does not face the support bar SB. A function of the insertion groove IGV will be described below in detail.

Figure 15:
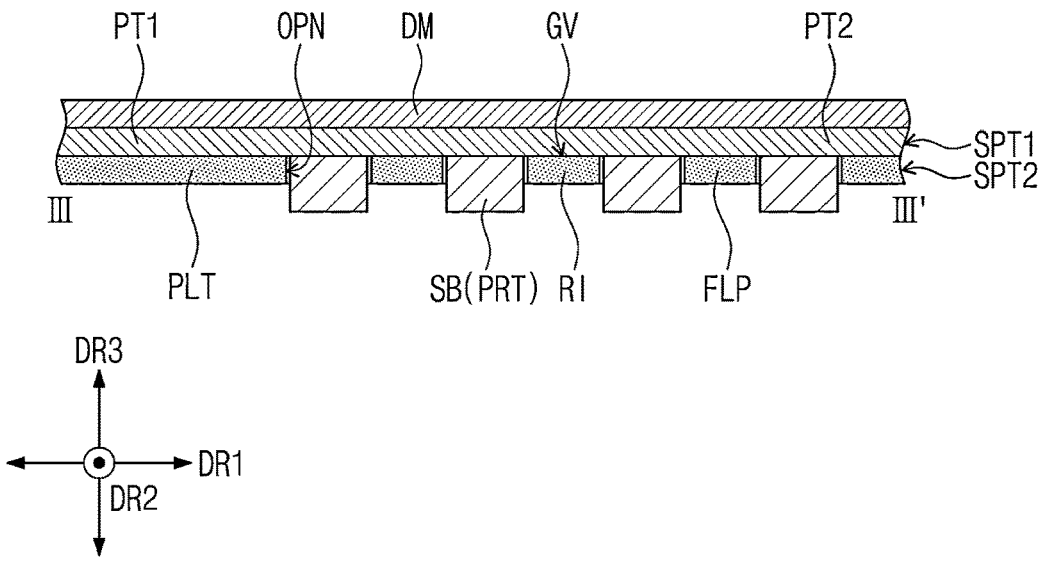
FIG. 15 is a cross-sectional view taken along line III-III' illustrated in FIG. 10.

FIG. 15 is a cross-sectional view taken along line III-III' illustrated in FIG. 10.

In FIG. 15, sections of the display module DM, the first support plate SPT1, and the support bars SB are illustrated together with a section of the second support plate SPT2, and the link bars LKB are omitted.

Referring to FIGS. 12 and 15, the flexible part FLP may be inserted into the grooves GV defined between the support bars SB. The support bars SB may be defined as the protrusions PRT, and the flexible part FLP may be inserted into the grooves GV defined between the protrusions PRT.

Specifically, portions of the flexible part FLP between the openings OPN may be defined as ribs RI. The ribs RI may be disposed in the grooves GV when the protrusions PRT protrude from the second part PT2 and are disposed in the openings OPN. Since the protrusions PRT are disposed in the openings OPN and the ribs RI are disposed in the grooves GV, the flexible part FLP and the protrusions PRT may be more firmly fixed to each other.

Figure 16:
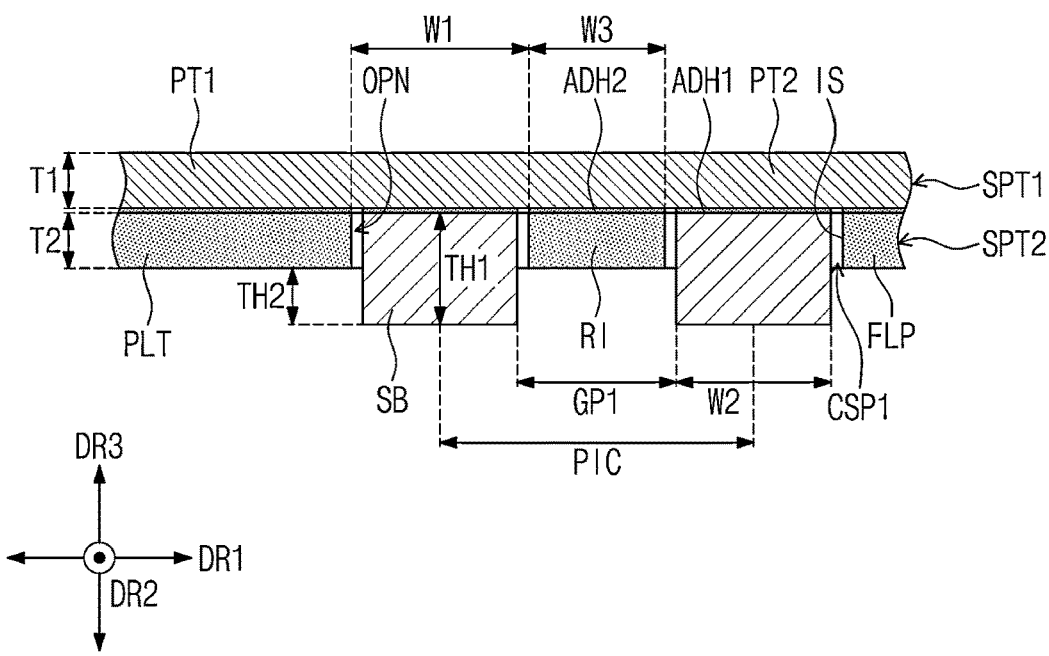
FIG. 16 is an enlarged view of some of the support bars illustrated in FIG. 15.

FIG. 16 is an enlarged view of some of the support bars illustrated in FIG. 15.

In FIG. 16, support bars SB adjacent to the flat part PLT and portions of the first and second support plates SPT1 and SPT2 adjacent to the support bars SB are enlarged and illustrated, and the display module DM is omitted.

Referring to FIG. 16, a first adhesive layer ADH1 may be disposed between the second part PT2 and the support bars SB. The second part PT2 and the support bars SB may be bonded and coupled to each other by the first adhesive layer ADH1. The first adhesive layer ADH1 may be an adhesive including the above-described acrylate-based resin.

A second adhesive layer ADH2 may be disposed between the first support plate SPT1 and the second support plate SPT2. The first support plate SPT1 and the second support plate SPT2 may be bonded and coupled to each other by the second adhesive layer ADH2. The second adhesive layer ADH2 may include the above-described pressure sensitive adhesive. In the drawings below, the first and second adhesive layers ADH1 and ADH2 are omitted.

In the first direction DR1, the openings OPN may have a first width W1, the support bars SB may have a second width W2, and the ribs of the flexible part FLP may have a third width W3. The first width W1 may be greater than the second width W2. The third width W3 may be smaller than the first width W1. A first gap GP1 between two support bars SB adjacent to each other in the first direction DR1 may be greater than the third width W3.

In an embodiment, under the condition that the first width W1 is greater than the second width W2, the first width W1 may have a value in the range of about 1.3 millimeter (mm) to about 1.8 mm, and the second width W2 may have a value in the range of about 0.9 mm to about 1.3 mm, for example.

In an embodiment, under the condition that the third width W3 is smaller than the first width W1, the third width W3 may have a value in the range of about 0.7 mm to about 0.9 mm, for example. In an embodiment, under the condition that the first gap GP1 is greater than the third width W3, the first gap GP1 may have a value in the range of about 1.0 mm to about 1.4 mm, for example.

The gap between the centers of the two support bars SB adjacent to each other in the first direction DR1 may be defined as a pitch PIC. In an embodiment, the pitch PIC may range from about 1.9 mm to about 2.7 mm, for example.

The first support plate SPT1 and the second support plate SPT2 may have the same thickness in the third direction DR3. However, without being limited thereto, the first support plate SPT1 and the second support plate SPT2 may have different thicknesses.

In an embodiment, the first support plate SPT1 may have a first thickness T1 of about 30 micrometers (m) to about 40 m, for example. The second support plate SPT2 may have a second thickness T2 of about 30 m to about 40 m.

The support bars SB may have a first thickness TH1 of about 1.1 mm to about 1.5 mm in the third direction DR3. Portions of the support bars SB that protrude downward from the flexible part FLP may have a second thickness TH2 of about 0.7 mm to about 0.9 mm.

Since the second width W2 of the support bars SB is smaller than the first width W1 of the openings OPN, the support bars SB may be sufficiently disposed in the spaces of the openings OPN. Furthermore, in the first direction DR1, the opposite sides of the support bars SB may be spaced part from opposite sides of the openings OPN.

Side surfaces of the flexible part FLP that define the openings OPN may be defined as inner surfaces IS. According to the above-described structure, spaces CSP1 may be formed between the support bars SB and the inner surfaces IS. Hereinafter, the spaces CSP1 may be defined as first compression spaces CSP1. A function of the first compression spaces CSP1 will be described below in detail.

Figure 17:
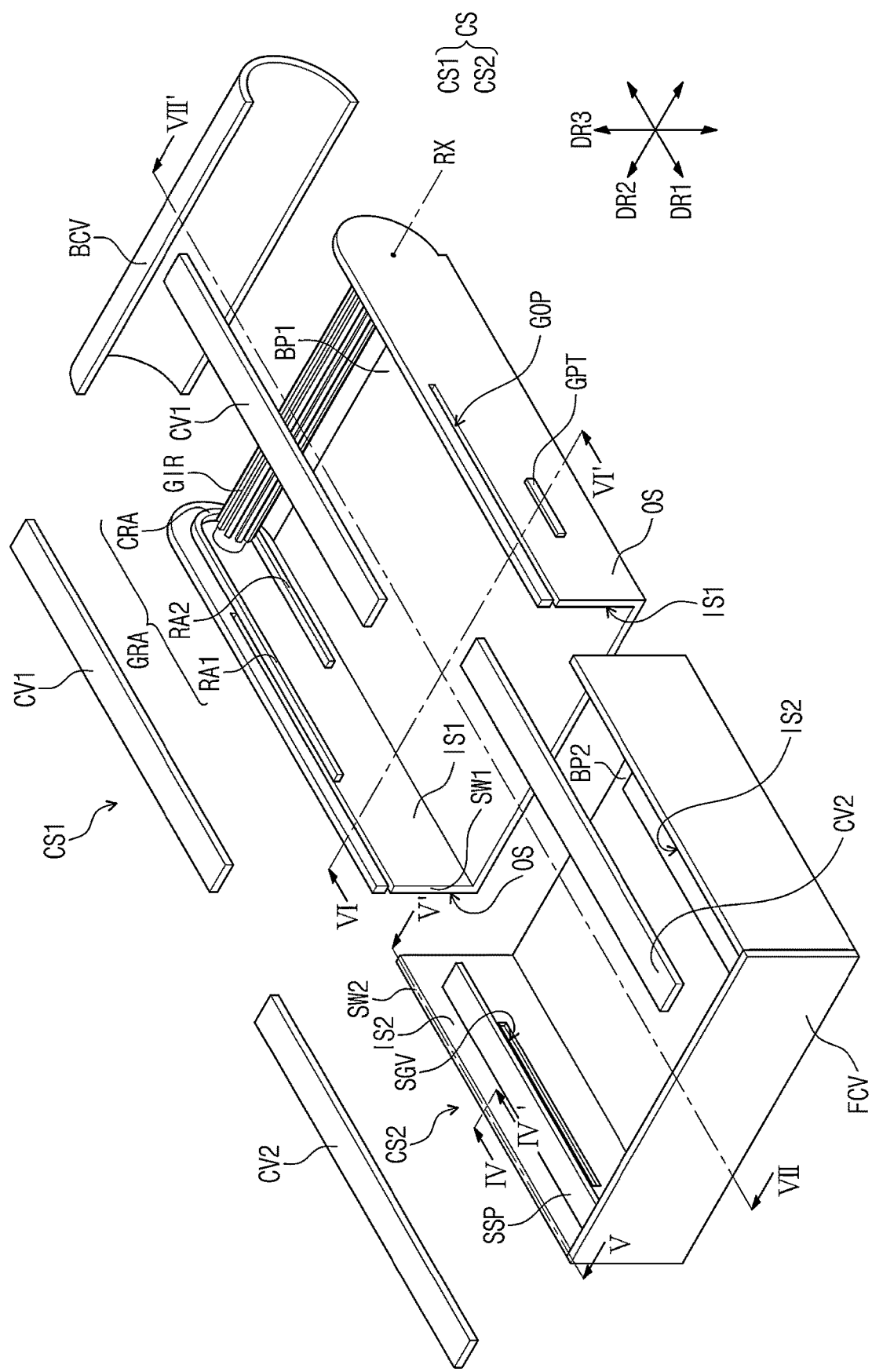
FIG. 17 is an exploded perspective view of the case illustrated in FIG. 1.

FIG. 17 is an exploded perspective view of the case illustrated in FIG. 1.

Referring to FIG. 17, the case CS may include the first case CS1 and the second case CS2 that are disposed in the first direction DR1. The first case CS1 and the second case CS2 may be coupled with each other in the first direction DR1.

The first case CS1 may include a first bottom part BP1, a plurality of first sidewalls SW1, a plurality of first covers CV1, a rear part BCV, a plurality of guide protrusions GPT, and a plurality of guide rails GRA. The display device DD may further include a gear GIR disposed in the first case CS1.

The first bottom part BP1 may have a plane defined by the first and second directions DR1 and DR2. The first sidewalls SW1 may extend upward (e.g., in an upper direction based on the third direction DR3) from opposite sides of the first bottom part BP1 that face away from each other in the second direction DR2. The first sidewalls SW1 may have a plane defined by the first and third directions DR1 and DR3. The first sidewalls SW1 may extend longer in the first direction DR1 than in the third direction DR3.

One side of each of the first sidewalls SW1 in the first direction DR1 may have a curved shape convex toward the outside. An opposite side of the first sidewall SW1 in the first direction DR1 may have a straight-line shape extending in the third direction DR3.

The first covers CV1 may be disposed on the first sidewalls SW1. The first covers CV1 may be connected to upper surfaces of the first sidewalls SW1. The first covers CV1 may have a plane defined by the first and second directions DR1 and DR2. The first covers CV1 may extend longer in the first direction DR1 than in the second direction DR2.

The rear part BCV may be disposed on one side of the first bottom part BP1 in the first direction DR1 and the one side of each of the first sidewalls SW1 in the first direction DR1. The rear part BCV may be connected to the one side of the first bottom part BP1 and the one side of each of the first sidewalls SW1. The one side of each of the first sidewalls SW1 may be adjacent to the one side of the first bottom part BP1.

The rear part BCV may have a shape convex toward the outside to correspond to the curved shape on the one side of each of the first sidewalls SW1. In an embodiment, when viewed in the second direction DR2, an outer surface of the rear part BCV that faces toward the outside may have a curved shape convex toward the outside, for example.

Surfaces of the first sidewalls SW1 that face each other in the second direction DR2 may be defined as first inner surfaces IS1. Surfaces of the first sidewalls SW1 that face away from the first inner surfaces IS1 may be defined as outer surfaces OS. The first inner surfaces IS1 may define inner surfaces of the case CS that face each other in the second direction DR2. Specifically, the first inner surfaces IS1 may define inner surfaces of the first case CS1 that face each other in the second direction DR2.

The guide protrusions GPT may be disposed on the outer surfaces OS, respectively. The guide protrusions GPT may extend in the first direction DR1. The guide protrusions GPT may protrude from the outer surfaces OS.

The guide rails GRA may be disposed on the first inner surfaces IST. The guide rails GRA may be adjacent to the rear part BCV. The guide rails GRA may be connected to the first inner surfaces IST.

Each of the guide rails GRA may include a first rail RA1, a second rail RA2, and a curved rail CRA. The first rail RA1 may extend in the first direction DR1. The second rail RA2 may be disposed under the first rail RA1 and may extend in the first direction DR1. The first rail RA1 may be longer than the second rail RA2.

The curved rail CRA may extend from one side of the first rail RAT to one side of the second rail RA2. The one side of the first rail RAT and the one side of the second rail RA2 may be adjacent to the rear part BCV. The curved rail CRA may be adjacent to the rear part BCV and may have a curved shape convexly extending toward the rear part BCV.

The second case CS2 may include a second bottom part BP2, a front part FCV, a plurality of second sidewalls SW2, a plurality of second covers CV2, and a plurality of sub-support parts SSP. The second bottom part BP2 may have a plane defined by the first and second directions DR1 and DR2.

The second sidewalls SW2 may extend upward from opposite sides of the second bottom part BP2 that face away from each other in the second direction DR2. The second sidewalls SW2 may have a plane defined by the first and third directions DR1 and DR3. The second sidewalls SW2 may extend longer in the first direction DR1 than in the third direction DR3.

The second bottom part BP2 may be disposed under the first bottom part BP1. The second sidewalls SW2 may be disposed outward of the first sidewalls SW1. That is, the second sidewalls SW2 may be disposed on the outer surfaces OS of the first sidewalls SW1.

The front part FCV may be disposed to face the rear part BCV. The front part FCV may be disposed on one side of the second bottom part BP2 in the first direction DR1. The one side of the second bottom part BP2 may be defined as a portion of the second bottom part BP2 that is furthest from the rear part BCV. The front part FCV may be connected to the one side of the second bottom part BP2 and may extend upward.

The front part FCV may have a plane defined by the second and third directions DR2 and DR3. The front part FCV may extend longer in the second direction DR2 than in the third direction DR3.

Surfaces of the second sidewalls SW2 that face each other in the second direction DR2 may be defined as second inner surfaces IS2. Sliding grooves SGV may be defined on the second inner surfaces IS2. The sliding grooves SGV may extend in the first direction DR1. When the second case CS2 is coupled to the first case CS1 and the second sidewalls SW2 are disposed on the outer surfaces OS of the first sidewalls SW1, the guide protrusions GPT may be inserted into the sliding grooves SGV. This configuration will be described below in detail.

The gear GIR may have a cylindrical shape extending in the second direction DR2. A plurality of protrusions that extend in the second direction DR2 and that are arranged in a circular shape on an outer circumferential surface of the gear GIR may be disposed on the outer circumferential surface of the gear GIR. The protrusions of the gear GIR may be spaced apart from the first sidewalls SW1.

The gear GIR may be connected to the first sidewalls SW1. Opposite sides of the gear GIR that face away from each other in the second direction DR2 may be connected to the first sidewalls SW1. The gear GIR may rotate about a rotational axis RX extending in the second direction DR2. The rotational axis RX may be the axis AX (refer to FIG. 12) described above. The gear GIR may be disposed between the first rail RA1 and the second rail RA2. The gear GIR may be adjacent to the curved rail CRA.

The second covers CV2 may be disposed on the second sidewalls SW2. The second covers CV2 may be connected to upper surfaces of the second sidewalls SW2. The second covers CV2 may have a plane defined by the first and second directions DR1 and DR2. The second covers CV2 may extend longer in the first direction DR1 than in the second direction DR2. When the first case CS1 and the second case CS2 are coupled with each other, the second covers CV2 may be disposed on the first covers CV1, respectively.

The sub-support parts SSP may be disposed on the second inner surfaces IS2. The sub-support parts SSP may have a plane defined by the first and second directions DR1 and DR2. The sub-support parts SSP may extend longer in the first direction DR1 than in the second direction DR2. The sub-support parts SSP may be adjacent to the front part FCV. The sub-support parts SSP may be connected to the second inner surfaces IS2. The sub-support parts SSP may be disposed above the sliding grooves SGV.

A guide opening GOP may be defined in each of the first sidewalls SW1. The guide opening GOP may be defined in the first sidewall SW1 by extending in the first direction DR1 from the opposite side of the first sidewall SW1. The guide openings GOP may be defined above the guide rails GRA. In an embodiment, the guide openings GOP may be defined above the first rails RA1, for example.

The guide openings GOP may overlap the first rails RA1. The guide openings GOP may extend so as to be adjacent to the curved rails CRA. The first rails RA1 may extend so as to be closer to the first sidewalls SW1 than the second rails RA2.

The first rails RA1 may extend below the guide openings GOP. When the first case CS1 and the second case CS2 are coupled with each other, the sub-support parts SSP may be disposed in the guide openings GOP.

Figure 18:
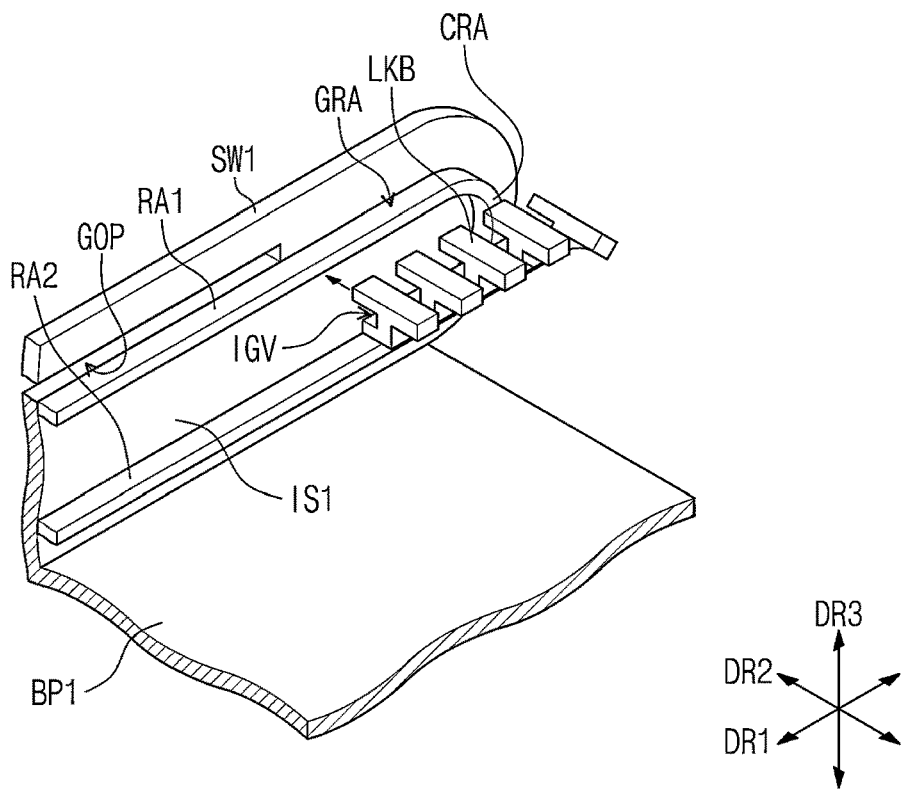
FIG. 18 is a view for explaining a configuration in which the link bars illustrated in FIGS. 12 to 14 are coupled to a guide rail.
Figure 19:
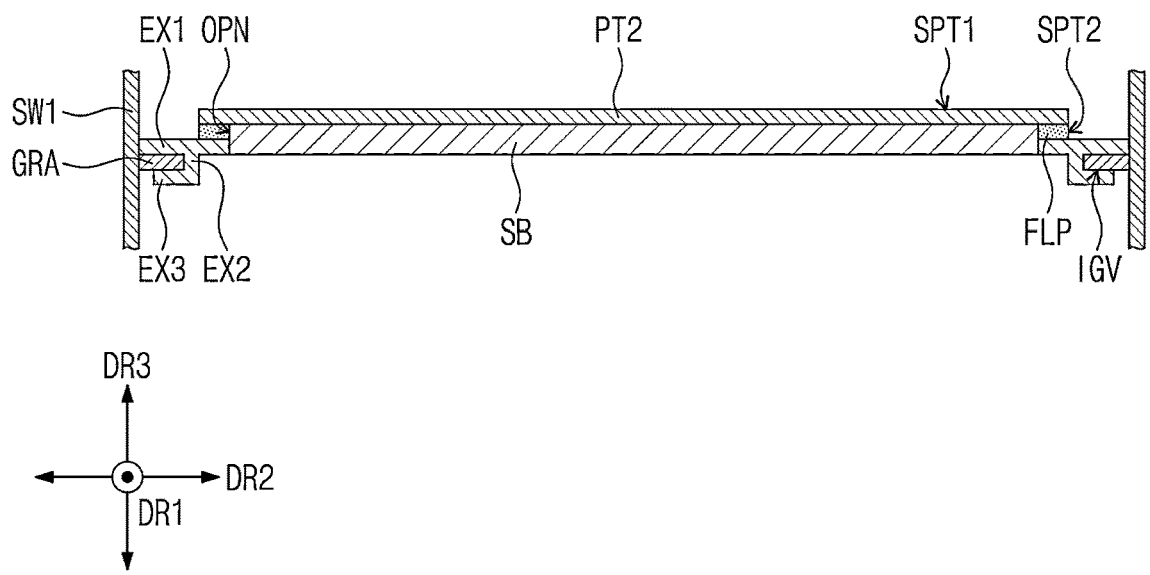
FIG. 19 is a cross-sectional view illustrating a state in which the link bars illustrated in FIG. 18 are coupled to the support bars and the first and second support plates.

FIG. 18 is a view for explaining a configuration in which the link bars illustrated in FIGS. 12 to 14 are coupled to the guide rail. FIG. 19 is a cross-sectional view illustrating a state in which the link bars illustrated in FIG. 18 are coupled to the support bars and the first and second support plates.

In FIG. 18, link bars LKB coupled to a guide rail GRA connected to one first inner surface IS1 are illustrated. FIG. 19 is a cross-sectional view corresponding to FIG. 13, and sections of the link bars LKB coupled to the guide rails GRA connected to the first inner surfaces IS1 are illustrated in FIG. 19.

Referring to FIGS. 18 and 19, the guide rails GRA may be connected to the first sidewalls SW1. The link bars LKB may be coupled to the guide rails GRA. In an embodiment, the guide rails GRA may be disposed in the insertion grooves IGV defined on sides of the link bars LKB, for example. The guide rails GRA may be inserted into the insertion grooves IGV and may be disposed in the insertion grooves IGV.

The link bars LKB may move along the guide rails GRA. The link bars LKB may move in the extension direction of the guide rails GRA through the insertion grooves IGV. The support bars SB may be coupled to the guide rails GRA through the link bars LKB and may move together with the link bars LKB.

The first and second support plates SPT1 and SPT2 may be coupled to the guide rails GRA by the link bars LKB and the support bars SB. That is, the flexible part FLP and the second part PT2 may be coupled to the guide rails GRA by the link bars LKB and the support bars SB. The first and second support plates SPT1 and SPT2 may move as the link bars LKB and the support bars SB move.

Figure 20:
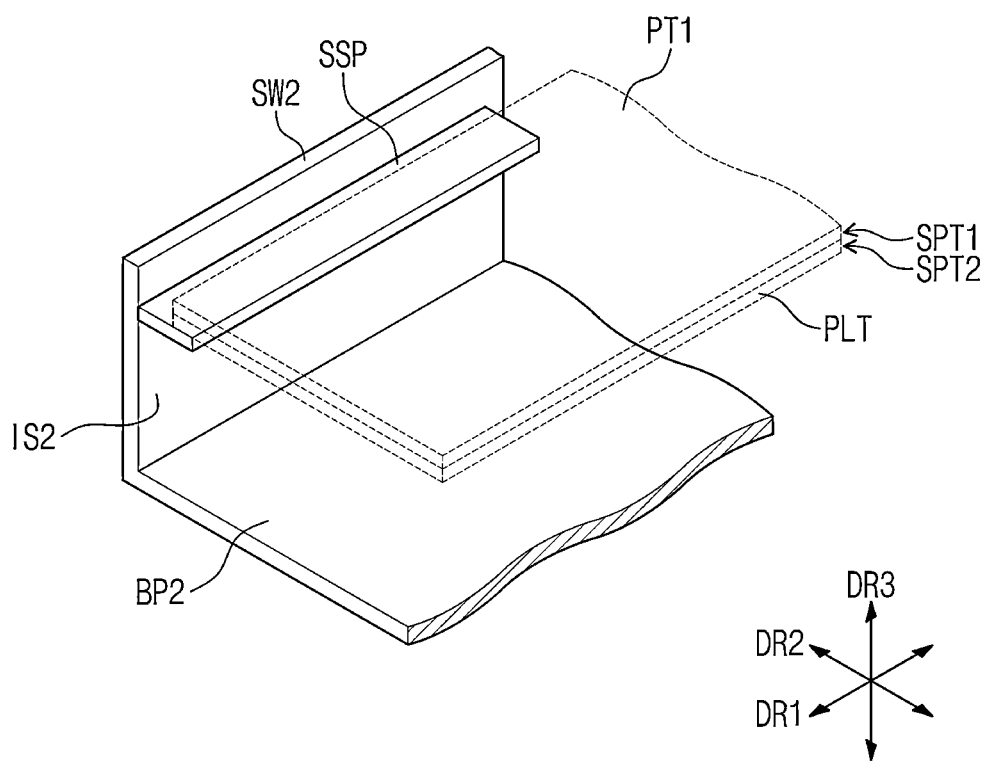
FIG. 20 is a view illustrating a state in which a flat part illustrated in FIG. 10 is disposed on a sub-support part illustrated in FIG. 17.

FIG. 20 is a view illustrating a state in which the flat part illustrated in FIG. 10 is disposed on the sub-support part illustrated in FIG. 17.

In FIG. 20, a portion of the second sidewall SW2, a portion of the second bottom part BP2, a portion of the flat part PLT, and the sub-support part SSP are illustrated, and the first and second support plates SPT1 and SPT2 are illustrated by dotted lines.

Referring to FIG. 20, the flexible part FLP of the second support plate SPT2 may be coupled to the guide rails GRA through the link bars LKB. However, the flat part PLT may not be coupled to the guide rails GRA. Accordingly, a structure for supporting the flat part PLT is desired.

In an embodiment of the disclosure, the sub-support part SSP may be disposed under the flat part PLT and may support the flat part PLT. Accordingly, the sub-support part SSP may support the flat part PLT and the first part PT1.

Figure 21:
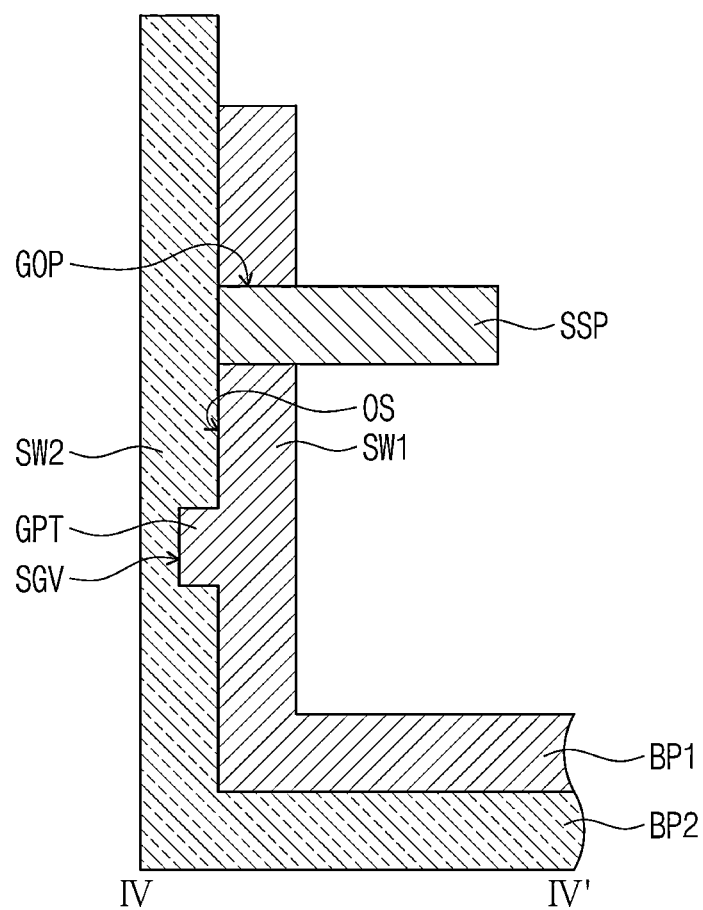
FIG. 21 is a cross-sectional view taken along line IV-IV' illustrated in FIG. 17.

FIG. 21 is a cross-sectional view taken along line IV-IV' illustrated in FIG. 17.

Assuming that the first and second cases CS1 and CS2 are coupled with each other, the first sidewall SW1 and the second sidewall SW2 are illustrated together in FIG. 21.

Referring to FIGS. 17 and 21, the second bottom part BP2 may be disposed under the first bottom part BP1 when the first and second cases CS1 and CS2 are coupled with each other. The second bottom part BP2 may contact a lower surface of the first bottom part BP1. The second sidewall SW2 may be disposed outward of the first sidewall SW1. The second sidewall SW2 may be disposed to contact the outer surface OS of the first sidewall SW1.

The protrusion GPT may protrude from the first sidewall SW1. When the first and second cases CS1 and CS2 are coupled with each other, the protrusion GPT may be disposed in the sliding groove SGV defined on the second sidewall SW2.

The sub-support part SSP may be connected to the second sidewall SW2. The sub-support part SSP may be disposed in the guide opening GOP defined in the first sidewall SW1. When the first and second cases CS1 and CS2 move relative to each other in the first direction DR1, the sub-support part SSP may move along the guide opening GOP in the first direction DR1.

Figure 22A:
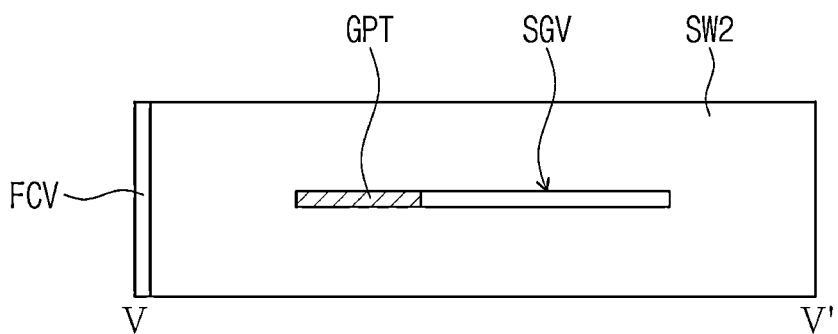
FIGS. 22A and 22B are cross-sectional views taken along line V-V' illustrated in FIG. 17.
Figure 22A:
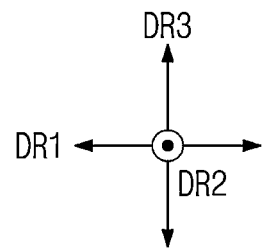
Figure 22B:
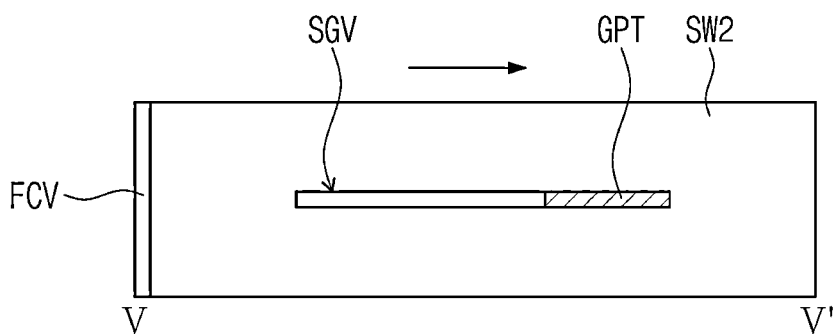
Figure 22B:
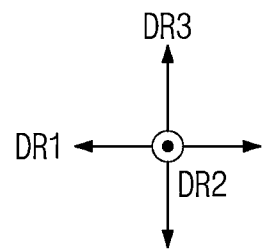

FIGS. 22A and 22B are cross-sectional views taken along line V-V' illustrated in FIG. 17.

FIGS. 22A and 22B illustrate a state in which the protrusion GPT is disposed in the sliding groove SGV.

Referring to FIGS. 1, 17, 21, and 22A, in the default mode, the protrusion GPT may be disposed on one side of the sliding groove SGV. The one side of the sliding groove SGV may be adjacent to the front part FCV in the first direction DR1. When the first case CS1 moves toward the second case CS2 to the maximum, the protrusion GPT may be disposed on the one side of the sliding groove SGV.

Referring to FIGS. 2, 17, 21, and 22B, in the extended mode, the first case CS1 may move away from the second case CS2 in the first direction DR1. In an embodiment, when the first case CS1 moves in the first direction DR1, the protrusion GPT may move along the sliding groove SGV in the first direction DR1, for example. When the protrusion GPT moves along the sliding groove SGV and is disposed on an opposite side of the sliding groove SGV, the protrusion GPT may stop.

The opposite side of the sliding groove SGV may be a portion of the sliding groove SGV that is furthest from the front part FCV. The one side and the opposite side of the sliding groove SGV may face away from each other in the first direction DR1.

When the first case CS1 continues to move away from the second case CS2, the first case CS1 may be separated from the second case CS2. However, in an embodiment of the disclosure, the first case CS1 may stop since the protrusion GPT moving in the first direction DR1 is disposed on the opposite side of the sliding groove SGV. The amount of movement of the first case CS1 may be controlled depending on the lengths of the protrusion GPT and the sliding groove SGV in the first direction DR1.

In the default mode illustrated in FIG. 1 and the extended mode illustrated in FIG. 2, the amount of movement of the first case CS1 relative to the second case CS2 may be determined depending on the protrusion GPT moving along the sliding groove SGV in the first direction DR1.

Figure 23:
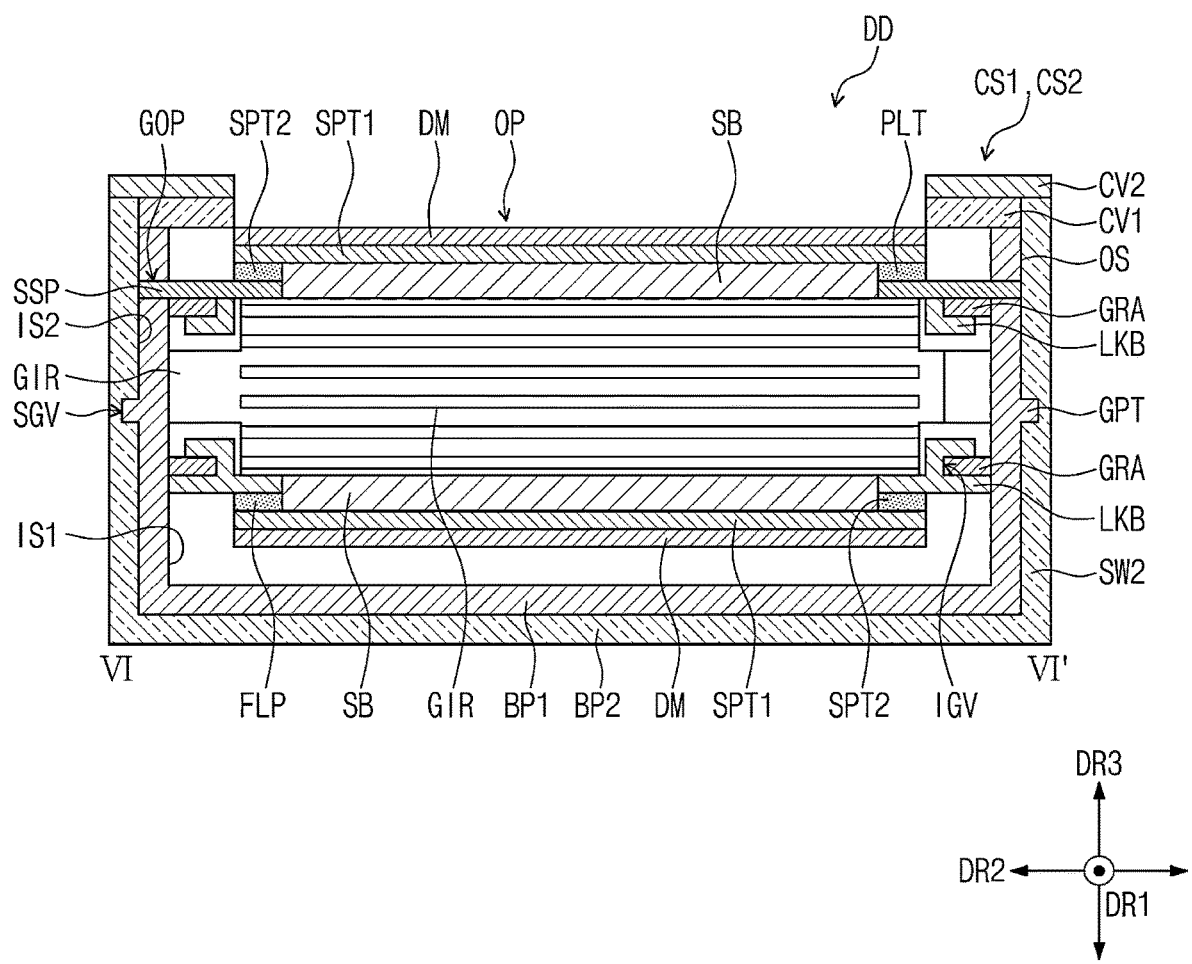
FIG. 23 is a cross-sectional view taken along line VI-VI' illustrated in FIG. 17.

FIG. 23 is a cross-sectional view taken along line VI-VI' illustrated in FIG. 17.

In FIG. 23, the first and second support plates SPT1 and SPT2 and the display module DM accommodated in the first case CS1 are illustrated together with the first case CS1, and the first case CS1 and the second case CS2 are illustrated in a coupled state.

Referring to FIGS. 13, 17, and 23, the guide rails GRA disposed on the first inner surfaces IS1 may face each other in the second direction DR2. The sub-support parts SSP connected to the second inner surfaces IS2 may face each other in the second direction DR2. The link bars LKB may be coupled to the guide rails GRA. The flat part PLT may be disposed on the sub-support parts SSP.

The first and second support plates SPT1 and SPT2 supporting the display module DM may be coupled to the guide rails GRA by the support bars SB and the link bars LKB. Furthermore, the flat part PLT may be supported by the sub-support parts SSP. Accordingly, the first and second support plates SPT1 and SPT2 may easily support the display module DM.

The first covers CV1 may be disposed on the first sidewalls SW1. The first covers CV1 may extend on the first sidewalls SW1 in the second direction DR2. In a plan view, the first covers CV1 may be disposed to overlap the link bars LKB protruding outward from the first and second support plates SPT1 and SPT2. Since the first covers CV1 cover the link bars LKB, the link bars LKB may not be visible from the outside.

The second covers CV2 may be disposed on the second sidewalls SW2 and the first covers CV1. In a plan view, the second covers CV2 may be disposed to overlap the link bars LKB. Since the second covers CV2 cover the link bars LKB, the link bars LKB may not be visible from the outside.

The display module DM may be exposed to the outside through the opening OP defined between the first covers CV1 and between the second covers CV2.

Figure 24:
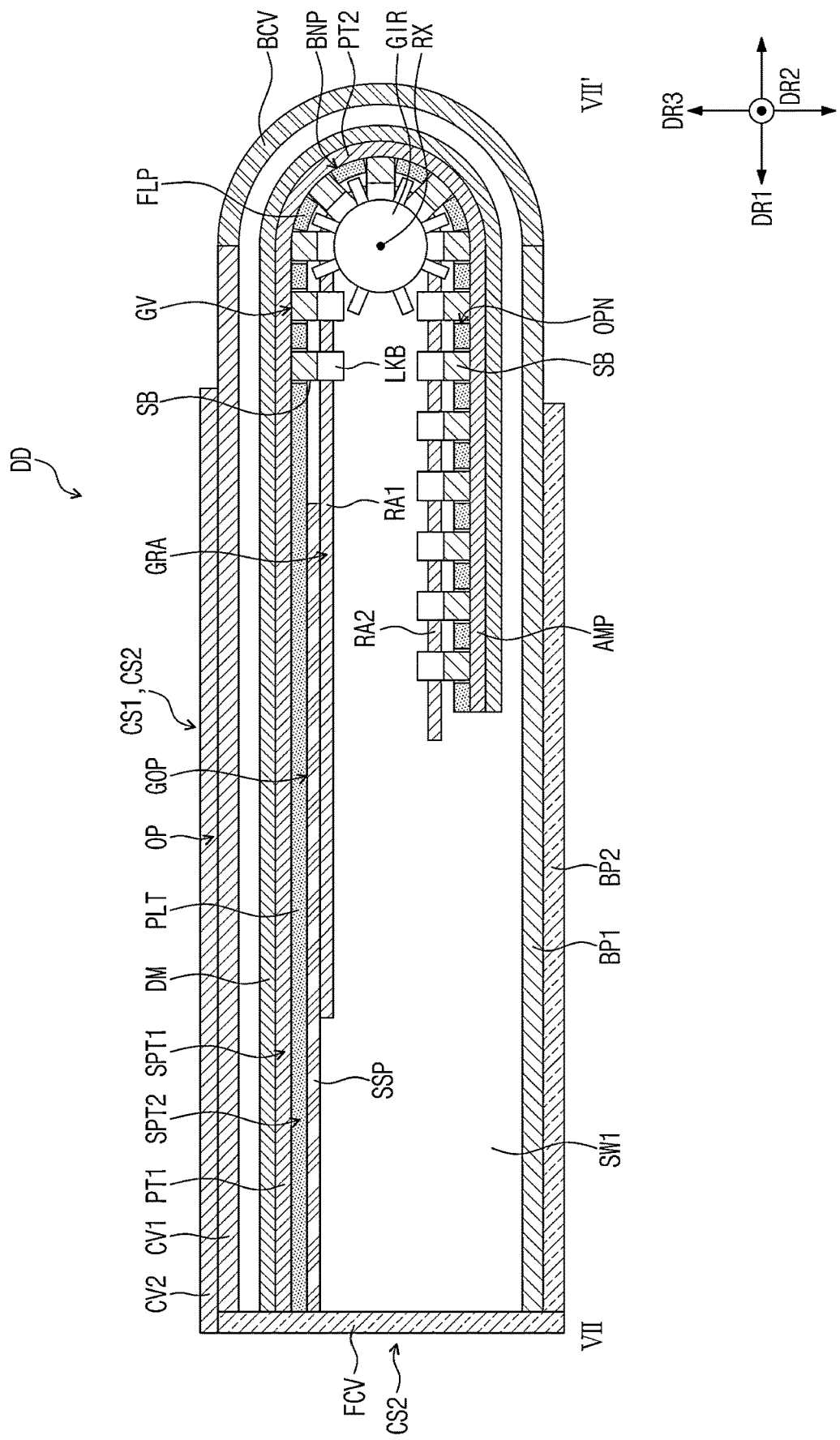
FIG. 24 is a cross-sectional view taken along line VII-VII' illustrated in FIG. 17, where
Figure 25:
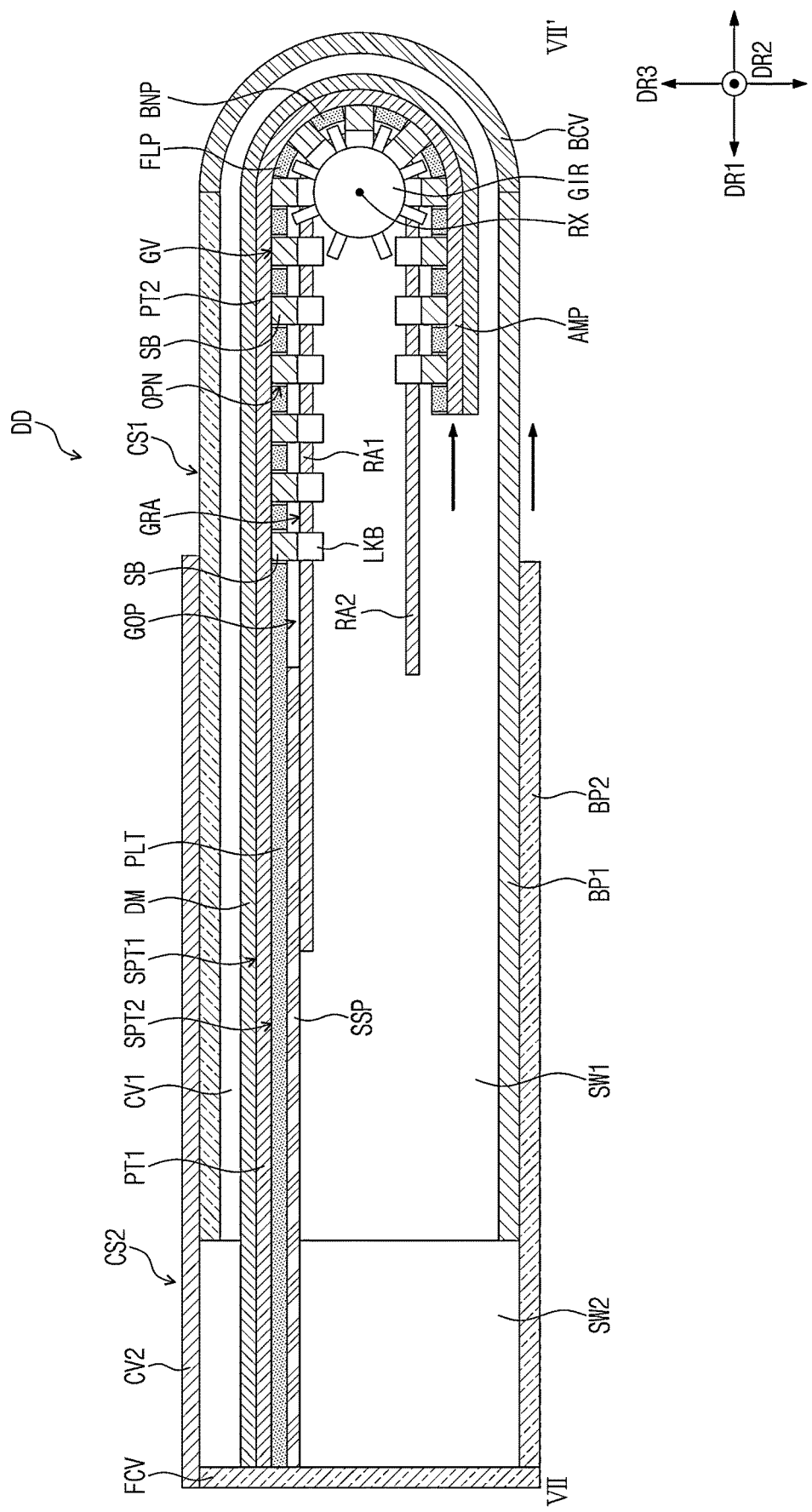
FIG. 25 is a cross-sectional view taken along line VII-VII' illustrated in FIG. 17, where

FIG. 24 is a cross-sectional view taken along line VII-VII' illustrated in FIG. 17, where FIG. 24 illustrates the default mode of the display device illustrated in FIG. 1. FIG. 25 is a cross-sectional view taken along line VII-VII' illustrated in FIG. 17, where FIG. 25 illustrates the extended mode of the display device illustrated in FIG. 2.

In FIGS. 24 and 25, the display module DM and the first and second support plates SPT1 and SPT2 accommodated in the case CS are illustrated together with the case CS.

Referring to FIGS. 1 and 24, the display module DM and the first and second support plates SPT1 and SPT2 may be accommodated in the first case CS1 and the second case CS2 coupled with each other. The display module DM may be disposed on the first support plate SPT1, and the display module DM and the first and second support plates SPT1 and SPT2 may be folded and accommodated in the case CS. The second part PT2 and the flexible part FLP may be easily bent together with the display module DM.

The first part PT1 and the flat part PLT may be disposed on the sub-support parts SSP. Since the link bars LKB are arranged in the shape of the guide rail GRA and coupled to the guide rail GRA, the second part PT2 and the flexible part FLP may also be disposed in the shape of the guide rail GRA.

The flexible part FLP more flexible than the flat part PLT may be easily bent and may be disposed along the guide rail GRA. Since the openings OPN are defined in the flexible part FLP as described above, the flexible part FLP may be easily bent. A folded portion of the flexible part FLP may be defined as a bending portion BNP.

The gear GIR may be adjacent to the bending portion BNP. The gear GIR may be engaged with the support bars SB protruding from the bending portion BNP. In an embodiment, the protrusions of the gear GIR may be disposed between the support bars SB, for example. The gear GIR may rotate about the rotational axis RX and may move the support bars SB. Although not illustrated, an actuator for rotating the gear GIR may be disposed in the case CS.

The display module DM and the first and second support plates SPT1 and SPT2 may be accommodated in the first case CS1 and may be connected to the second case CS2. One side of the display module DM and one side of each of the first and second support plates SPT1 and SPT2 may be connected to the front part FCV.

The display module DM and the first and second support plates SPT1 and SPT2 may be connected and fixed to the front part FCV. The display module DM and the first and second support plates SPT1 and SPT2, which are connected to the front part FCV, may move as the front part FCV moves.

However, this configuration is illustrative, and the disclosure is not limited thereto. In an embodiment, at least one of the display module DM, the first support plate SPT1, and the second support plate SPT2 may be connected to the front part FCV of the second case CS2, for example.

As described above, the display module DM, the first support plate SPT1, and the second support plate SPT2 may be bonded to each other through pressure sensitive adhesives. Accordingly, even though at least one of the display module DM, the first support plate SPT1, and the second support plate SPT2 is connected to the front part FCV of the second case CS2, the display module DM and the first and second support plates SPT1 and SPT2 may move together as the front part FCV moves.

The above-described accommodated portion AMP of the display module DM may be disposed adjacent to an opposite side of the first support plate SPT1 that faces away from one side of the first support plate SPT1. Accordingly, the accommodated portion AMP may be disposed in the first case CS1 and may not be exposed to the outside.

In the default mode, the sub-support part SSP may be disposed in the guide opening GOP. An end of the first rail RA1 may be disposed under the sub-support part SSP. One end of the sub-support part SSP may be adjacent to the support bar SB and the link bar LKB that are firstly disposed in the first rail RA1.

Referring to FIGS. 2 and 25, in the extended mode, the first case CS1 may move away from the second case CS2 in the first direction DR1. Accordingly, the display module DM and the first and second support plates SPT1 and SPT2 may be extended to the outside. When the display device DD is changed from the default mode to the extended mode, the gear GIR may rotate about the rotational axis RX in the counterclockwise direction.

The link bars LKB may move along the guide rail GRA. The second part PT2 and the flexible part FLP may move along the guide rail GRA depending on the movement of the link bars LKB. As the second part PT2 and the flexible part FLP move in the first direction DR1, a portion of the second part PT2 and a portion of the flexible part FLP may be disposed flat.

In the extended mode, the exposed area of the display module DM exposed outside the first and second cases CST and CS2 may be increased. Furthermore, in the extended mode, a flat portion of the second part PT2 disposed flat together with the first part PT1 may be extended. In addition, in the extended mode, a flat portion of the flexible part FLP disposed flat together with the flat part PLT may be extended.

The sub-support part SSP may move relative to the first case CST in the first direction DR1. The sub-support part SSP may be disposed in the guide opening GOP and may move in the first direction DR1 along the guide opening GOP.

The sub-support part SSP moving in the first direction DR1 may continue to support the first part PT1 and the flat part PLT. The support bars SB extending in the second direction DR2 may support the display module DM on the second part PT2 disposed flat. In the extended mode, some of the support bars SB may be disposed to overlap the guide opening GOP.

In an embodiment of the disclosure, the first support plate SPT1 may have a flat upper surface and may be disposed on the second support plate SPT2 having the opening pattern defined by the openings OPN. The flat upper surface of the first support plate SPT1 may cover the opening pattern.

Accordingly, the opening pattern of the second support plate SPT2 may not be visible from the outside.

In an embodiment of the disclosure, the first support plate SPT1 and the second support plate SPT2 may support the display module DM together. Accordingly, in the extended mode, the display module DM may be easily supported by the first and second support plates SPT1 and SPT2.

In an embodiment of the disclosure, the impact resistance of the display module DM may be improved since the first and second support plates SPT1 and SPT2 are disposed double under the display module DM. Accordingly, damage to the display module DM due to an external impact may be prevented.

As the area of the display module DM exposed to the outside in the extended mode is extended, the area of the display surface DS exposed to the outside may be extended. When the display device DD is changed from the extended mode to the default mode, the first case CS1 may move toward the second case CS2 as illustrated in FIG. 25. That is, the front part FCV and the first case CS1 illustrated in FIG. 25 may move toward each other in the first direction DR1. Accordingly, the default mode illustrated in FIG. 24 may be performed. When the display device DD is changed from the extended mode to the default mode, the gear GIR may rotate about the rotational axis RX in the clockwise direction.

Figure 26:
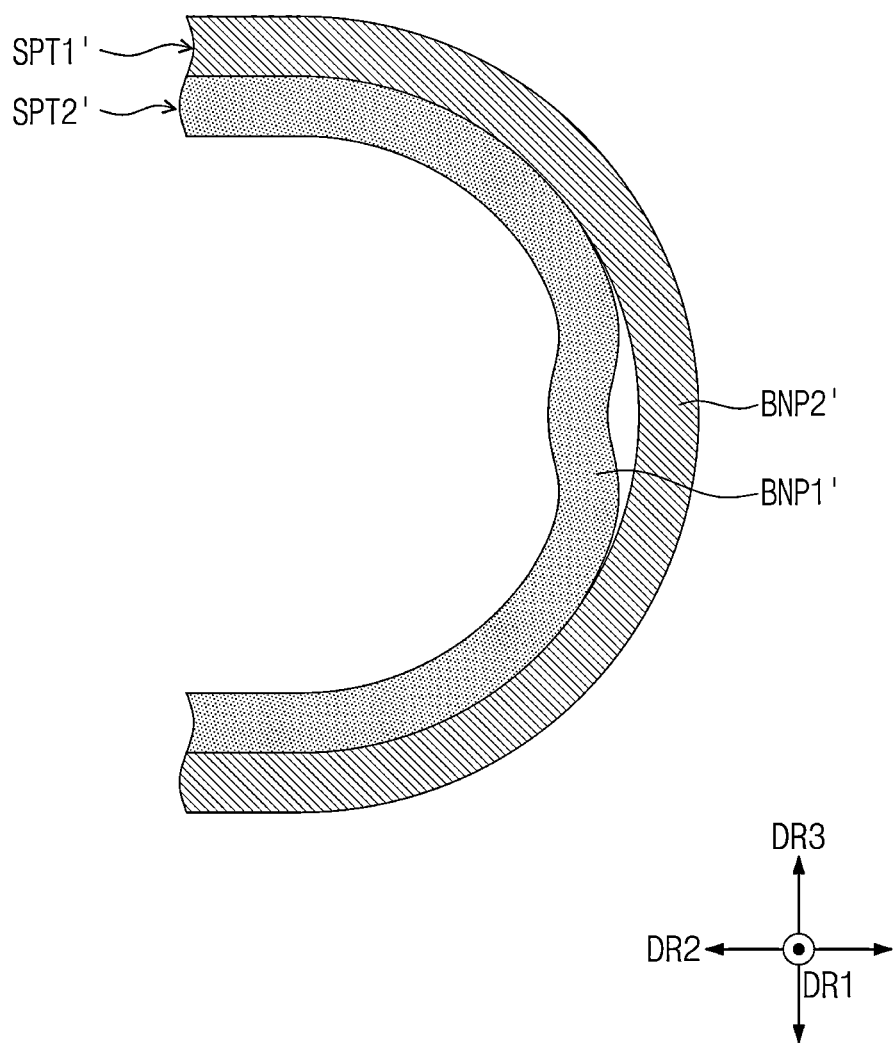
FIG. 26 is a view illustrating a bent state of first and second support plates according to a comparative example.
Figure 27:
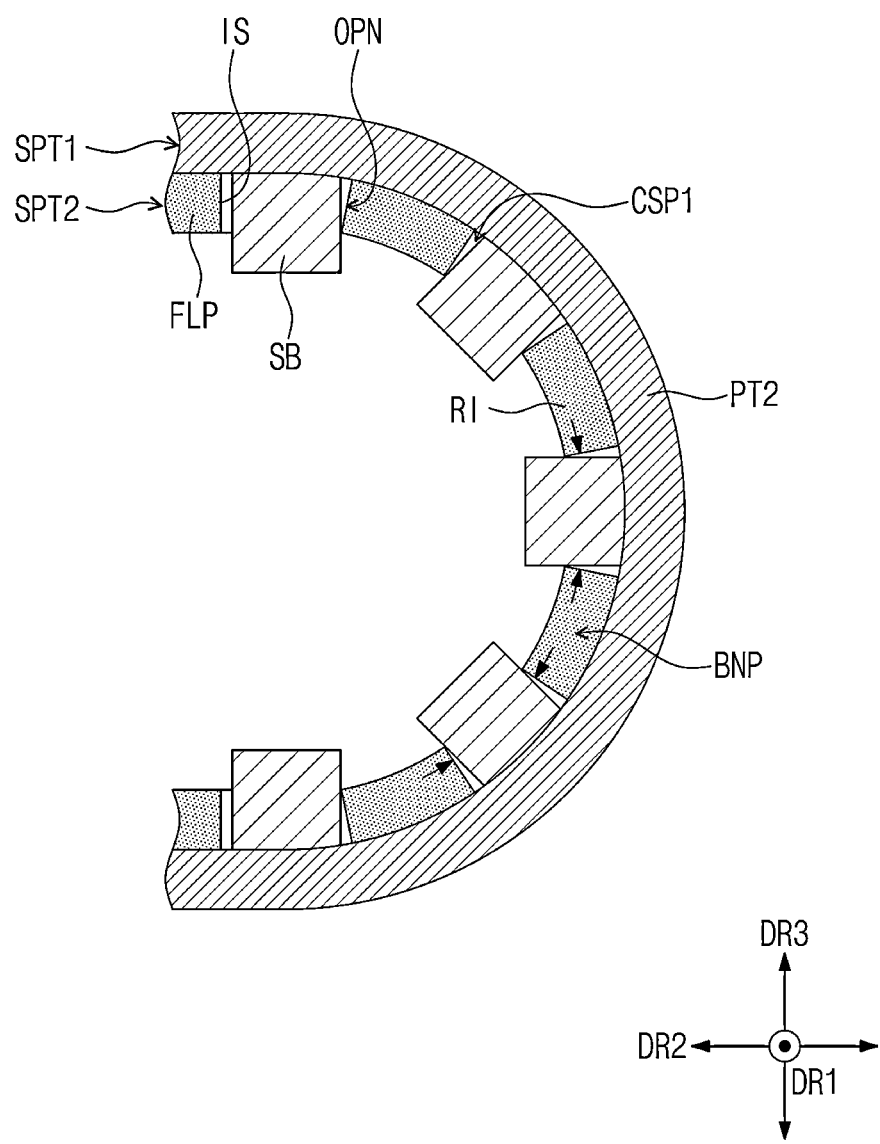
FIG. 27 is an enlarged view of a bending portion illustrated in FIG. 24 and support bars and a second part that are adjacent to the bending portion.

FIG. 26 is a view illustrating a bent state of first and second support plates according to a comparative example. FIG. 27 is an enlarged view of the bending portion illustrated in FIG. 24 and the support bars and the second part that are adjacent to the bending portion.

Referring to FIG. 26, when the first and second support plates SPT1' and SPT2' are bent, the radius of curvature of a second bending portion BNP2' of the second support plate SPT2' may be smaller than the radius of curvature of a first bending portion BNP1' of the first support plate SPT1'. In this case, a compressive force may be generated in the second bending portion BNP2', and therefore the second bending portion BNP2' may be lifted from the first bending portion BNP1'. This phenomenon may be defined as a buckling phenomenon.

Referring to FIGS. 16 and 27, in an embodiment of the disclosure, the first compression spaces CSP1 may be defined between the inner surfaces IS of the flexible part FLP and the opposite sides of the support bars SB. When the second part PT2 and the flexible part FLP are folded, a compressive force may be generated in the bending portion BNP. However, the compressive force generated in the bending portion BNP may act on the first compression spaces CSP1, and thus a buckling phenomenon in which the bending portion BNP is lifted may not occur.

Figure 28:
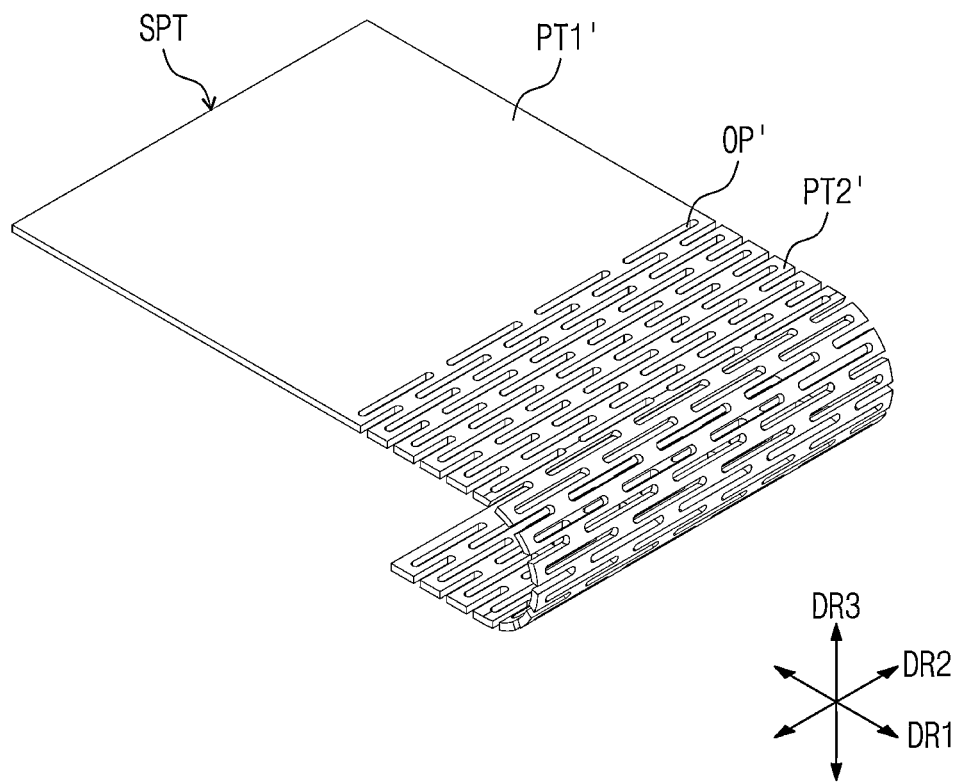
FIG. 28 is a perspective view of an embodiment of a support plate according to the disclosure.

FIG. 28 is a perspective view of an embodiment of a support plate according to the disclosure.

Referring to FIGS. 10 and 28, as a structure for supporting the display module DM, the support plate SPT corresponding to the first support plate SPT1 may be used without the use of the second support plate SPT2. That is, a single support plate rather than two support plates may be used.

The support plate SPT may include a first part PT1' that remains flat and a second part PT2' having a lower elastic modulus than that of the first part PT1'. Although not illustrated, the above-described support bars SB may be coupled to a lower surface of the second part PT2'.

Unlike the first support plate SPT1, the second part PT2' of the support plate SPT may have openings OP' defined therein. The openings OP' may be defined in a lattice form.

Due to the openings OP', the second part PT2' may have a lower elastic modulus than that of the first part PT1'.

Figure 29A:
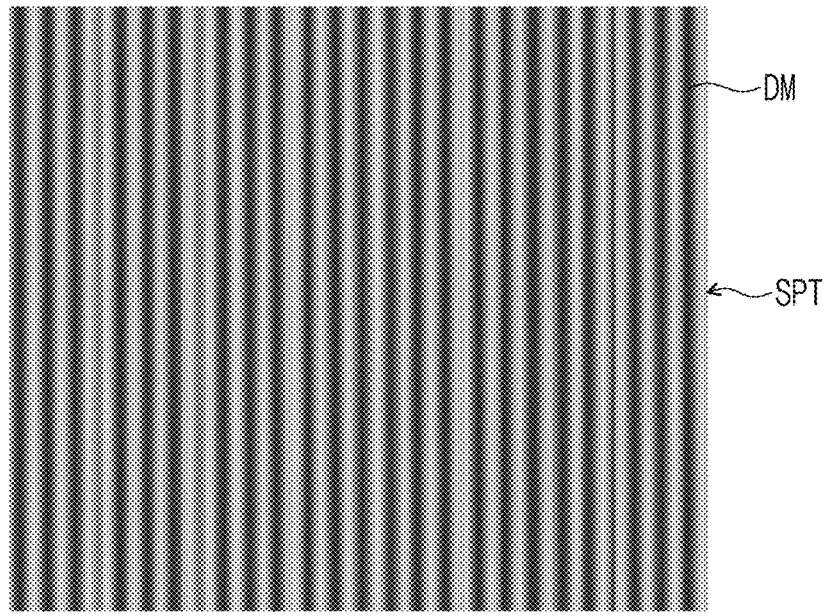
FIG. 29A illustrates an image of a front surface of the display module for which the support plate illustrated in FIG. 28 is used.
Figure 29B:
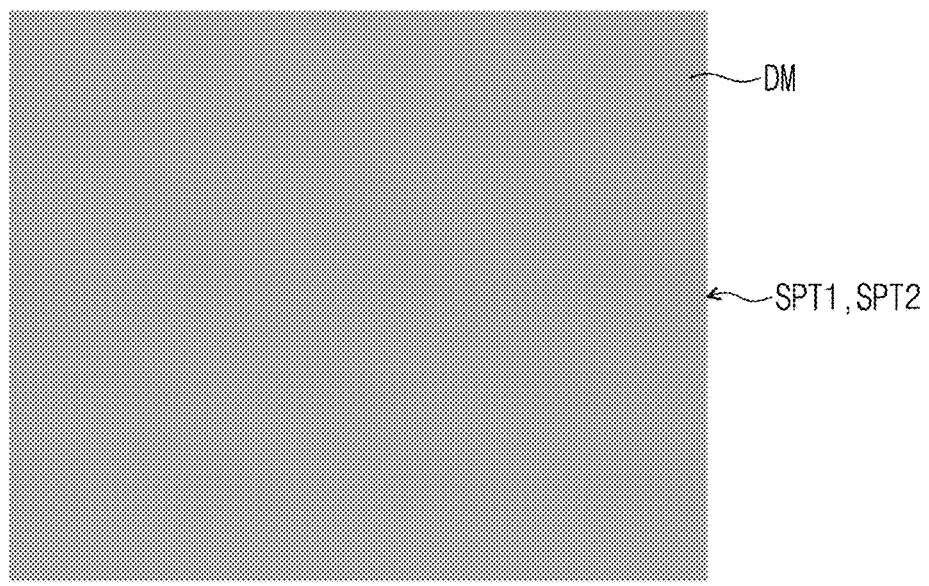
FIG. 29B illustrates an image of the front surface of the display module for which the first and second support plates illustrated in FIG. 10 are used.

FIG. 29A illustrates an image of a front surface of the display module for which the support plate illustrated in FIG. 28 is used. FIG. 29B illustrates an image of the front surface of the display module for which the first and second support plates illustrated in FIG. 10 are used.

FIGS. 29A and 29B are blowups of a portion of the display module DM and illustrate images of the display module DM taken from above the display module DM.

Referring to FIGS. 29A and 29B, it may be seen that the lattice pattern defined by the openings OP' is visible from the outside when the support plate SPT illustrated in FIG. 28 is disposed under the display module DM.

However, when the first support plate SPT1 and the second support plate SPT2 illustrated in FIG. 10 are disposed under the display module DM, the opening pattern of the second support plate SPT2 may not be visible from the outside since the flat upper surface of the first support plate SPT1 covers the opening pattern of the second support plate SPT2.

Figure 30A:
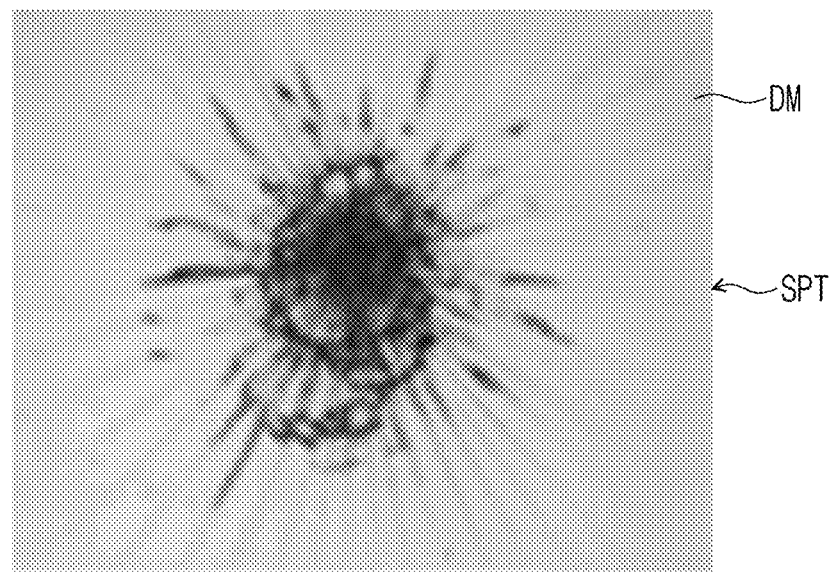
FIGS. 30A and 30B are views illustrating results of pen drop tests for the display module for which the support plate illustrated in FIG. 28 is used.
Figure 30B:
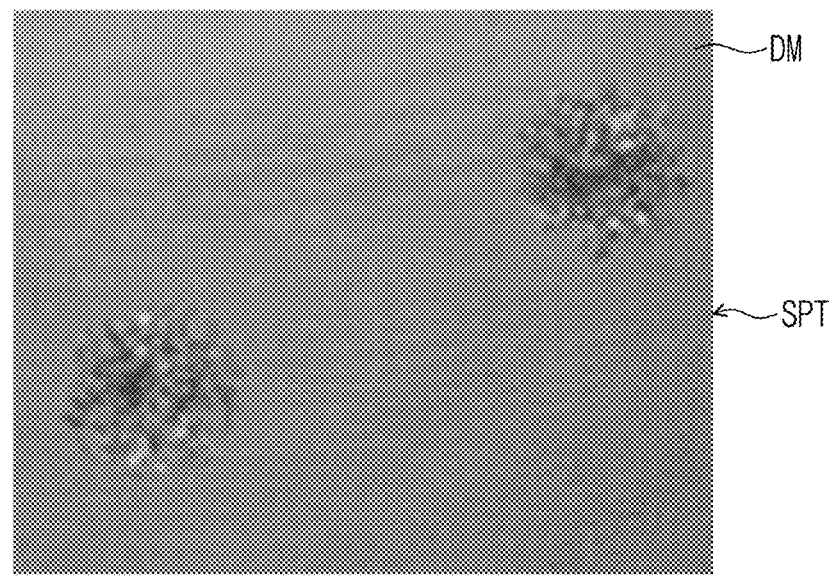
Figure 31A:
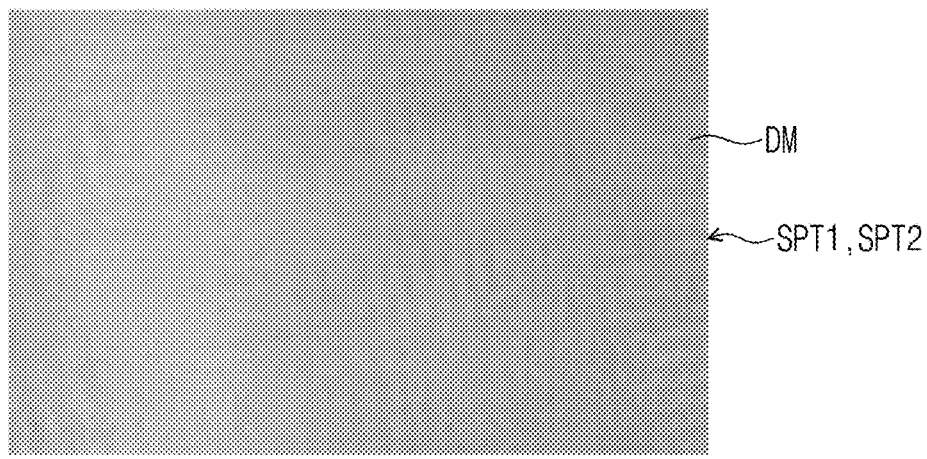
FIGS. 31A and 31B are views illustrating results of pen drop tests for the display module for which the first and second support plates illustrated in FIG. 10 are used.
Figure 31B:
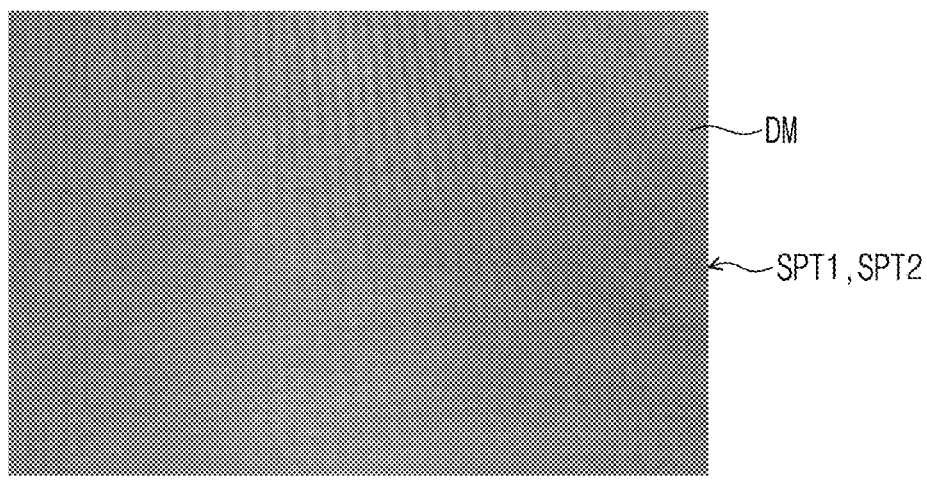

FIGS. 30A and 30B are views illustrating results of pen drop tests for the display module for which the support plate illustrated in FIG. 28 is used. FIGS. 31A and 31B are views illustrating results of pen drop tests for the display module for which the first and second support plates illustrated in FIG. 10 are used.

FIGS. 30A and 31A illustrate states of the display module DM when a first pen including a 0.3-mm-diameter tip and having a weight of 5.8 g is dropped on the display module DM. FIGS. 30B and 31B illustrate states of the display module DM when a second pen including a 6.5-mm-diameter tip and having a weight of 143.2 g is dropped on the display module DM.

When the display module DM was tested for impact resistance, the pens having the predetermined diameters were dropped toward the display module DM from above the display module DM. The impact resistance tests were performed by dropping the first and second pens on the display module DM while increasing the heights of the first and second pens above the display module DM. Impact resistance may be defined as a property of resisting an external impact.

Referring to FIGS. 30A and 30B, it may be seen that the impact resistance of the display module DM is relatively weak when the support plate SPT illustrated in FIG. 28 is disposed under the display module DM. Accordingly, the display module DM may be deformed by an external impact.

In an embodiment, when the first pen was dropped on the display module DM from a height of about 15 centimeters (cm) above the display module DM, the display module DM was damaged as illustrated in FIG. 30A, for example. When the second pen was dropped on the display module DM from a height of about 11 cm above the display module DM, the display module DM was damaged as illustrated in FIG. 30B.

Referring to FIGS. 31A and 31B, it may be seen that the impact resistance of the display module DM is enhanced when the first and second support plates SPT1 and SPT2 illustrated in FIG. 10 are disposed under the display module DM.

When the first pen was dropped on the display module DM from a height of about 15 cm above the display module DM, the display module DM was not damaged as illustrated in FIG. 31A. When the second pen was dropped on the display module DM from a height of about 11 cm above the display module DM, the display module DM was not damaged as illustrated in FIG. 31B. Accordingly, the impact resistance of the display module DM may be enhanced when the first and second support plates SPT1 and SPT2 are used.

Figure 32A:
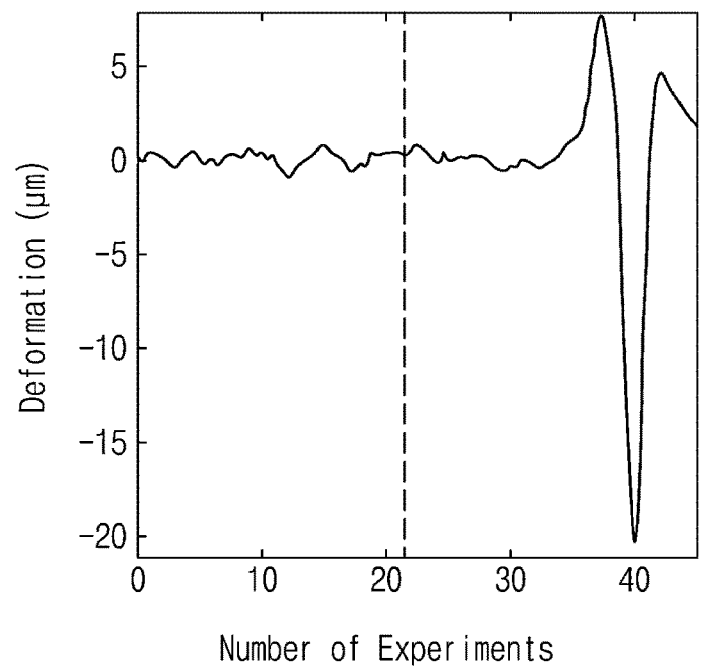
FIG. 32A illustrates a graph obtained by measuring a deformed state of the display module after the default mode and the extended mode are performed on the display module for which the support plate illustrated in FIG. 28 is used.
Figure 32B:
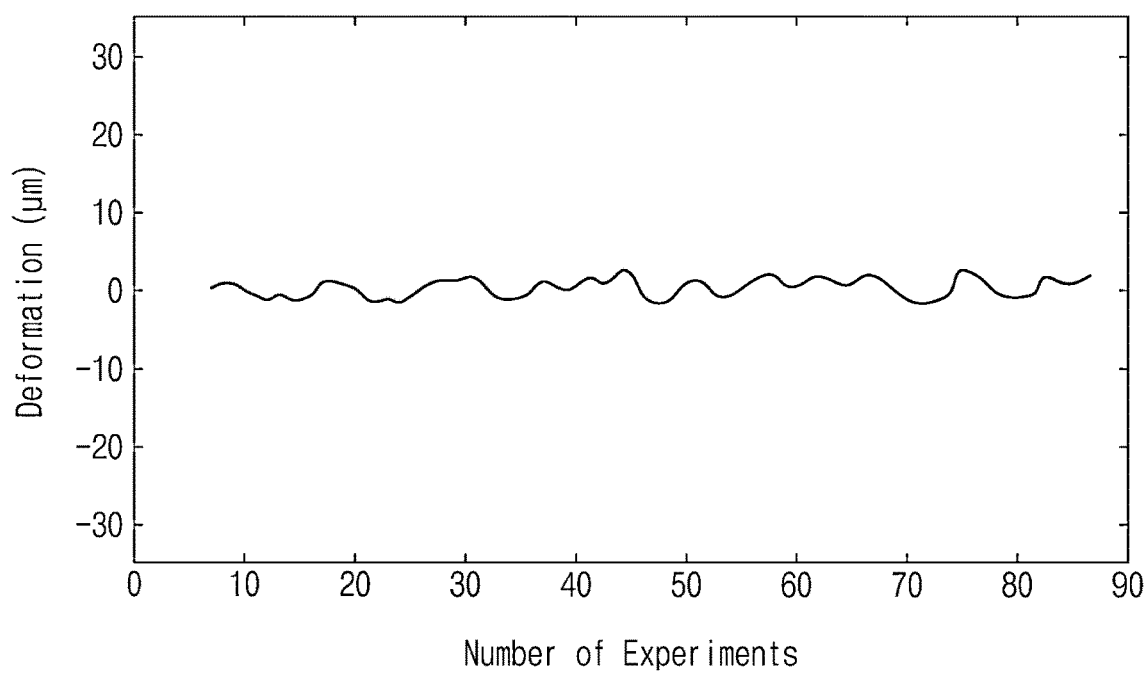
FIG. 32B illustrates a graph obtained by measuring a deformed state of the display module after the default mode and the extended mode are performed on the display module for which the first and second support plates illustrated in FIG. 10 are used.

FIG. 32A illustrates a graph obtained by measuring a deformed state of the display module after the default mode and the extended mode are performed on the display module for which the support plate illustrated in FIG. 28 is used. FIG. 32B illustrates a graph obtained by measuring a deformed state of the display module after the default mode and the extended mode are performed on the display module for which the first and second support plates illustrated in FIG. 10 are used.

In FIGS. 32A and 32B, the vertical axis represents the amount of deformation of the display module DM measured in micrometers. In a flat state, the amount of deformation equals zero. A value greater than 0 represents a state in which the display module DM is deformed upward, and a value less than 0 represents a state in which the display module DM is deformed downward.

In FIGS. 32A and 32B, the horizontal axis represents the number of experiments in which the default mode and the extended mode were repeatedly performed, and the unit is 10,000. That is, the numbers on the horizontal axis represent hundreds of thousands of times.

Referring to FIG. 32A, it may be seen that when the support plate SPT was used, the display module DM was rapidly deformed after about 300,000 cycles and was most significantly deformed at about 400,000 cycles.

The maximum amount of deformation indicates a state in which a portion of the display module DM is deformed upward to the maximum based on the flat state. The minimum amount of deformation indicates a state in which a portion of the display module DM is deformed downward to the maximum based on the flat state.

In the experimental result illustrated in FIG. 32A, the maximum amount of deformation of the display module DM was measured to be about 8 m, and the minimum amount of deformation of the display module DM was measured to be about 20 m. Accordingly, the difference between the maximum amount of deformation and the minimum amount of deformation of the display module DM is about 28 m.

Referring to FIG. 32B, it may be seen that when the first and second support plates SPT1 and SPT2 were used, the display module DM was not significantly deformed up to about 900,000 cycles. In the experimental result illustrated in FIG. 32B, the maximum amount of deformation of the display module DM was measured to be about 1 m, and the minimum amount of deformation of the display module DM was measured to be about 3 m. Accordingly, the difference between the maximum amount of deformation and the minimum amount of deformation of the display module DM is about 4 μm.

Figure 33A:
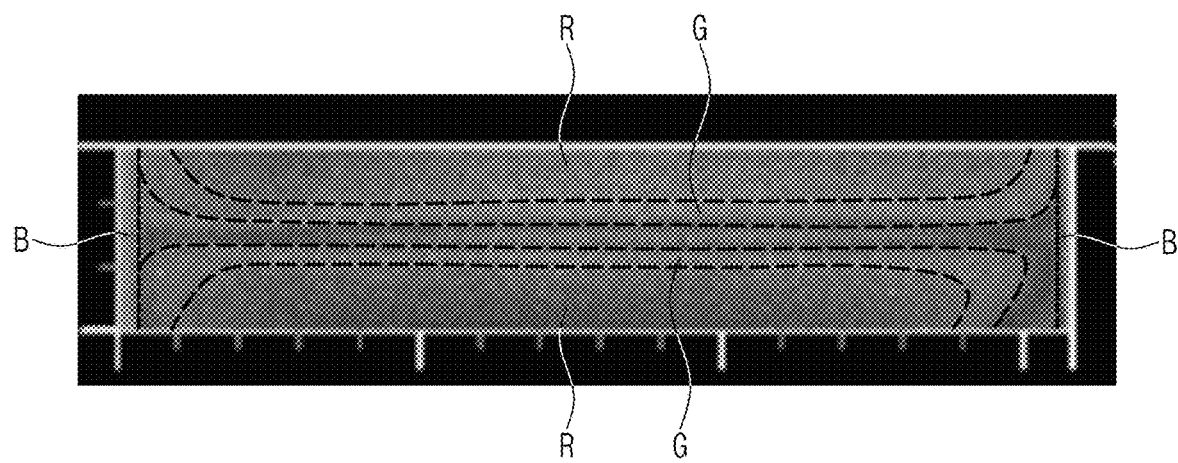
FIG. 33A is a view illustrating a deformed state of the display module for which the support plate illustrated in FIG. 28 is used.
Figure 33B:
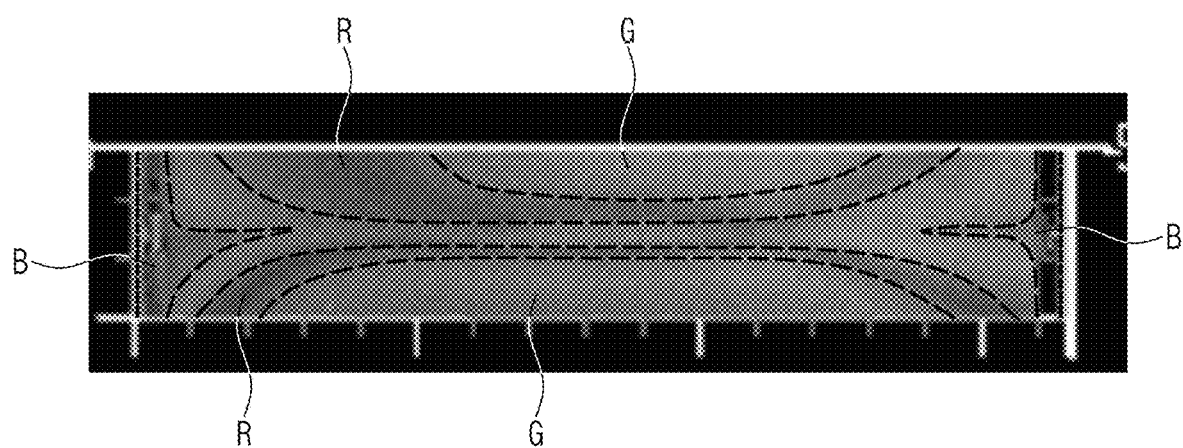
FIG. 33B is a view illustrating a deformed state of the display module for which the first and second support plates illustrated in FIG. 10 are used.

FIG. 33A is a view illustrating a deformed state of the display module for which the support plate illustrated in FIG. 28 is used. FIG. 33B is a view illustrating a deformed state of the display module for which the first and second support plates illustrated in FIG. 10 are used.

FIGS. 33A and 33B illustrate measurements taken under experimental conditions different from those in FIGS. 32A and 32B. In an embodiment, FIGS. 33A and 33B illustrate deformed states of the display modules DM measured after the display modules DM on which the support plate SPT and the first and second support plates SPT1 and SPT2 are disposed, respectively, are exposed to an environment of about −5 degrees Celsius (° C.) for about 250 hours, for example.

In FIGS. 33A and 33B, reference numerals R, G, and B represent colors. Red (R), blue (B), and green (G) represent the amount of deformation of the display module DM. The amount of deformation may be larger in the order of red (R)>blue (B)>green (G).

Referring to FIG. 33A, when the support plate SPT is disposed under the display module DM, the area of the red (R) portion is large, and the areas of the blue (B) portion and the green (G) portion are small.

Referring to FIG. 33B, when the first and second support plates SPT1 and SPT2 are disposed under the display module DM, the area of the red (R) portion is decreased, compared to that in FIG. 33A, and the areas of the blue (B) portion and the green (G) portion are increased, compared to those in FIG. 33A.

Accordingly, it may be seen that the amount of deformation of the display module DM is smaller when the first and second support plates SPT1 and SPT2 are disposed under the display module DM than when the support plate SPT is disposed under the display module DM.

Figure 34:
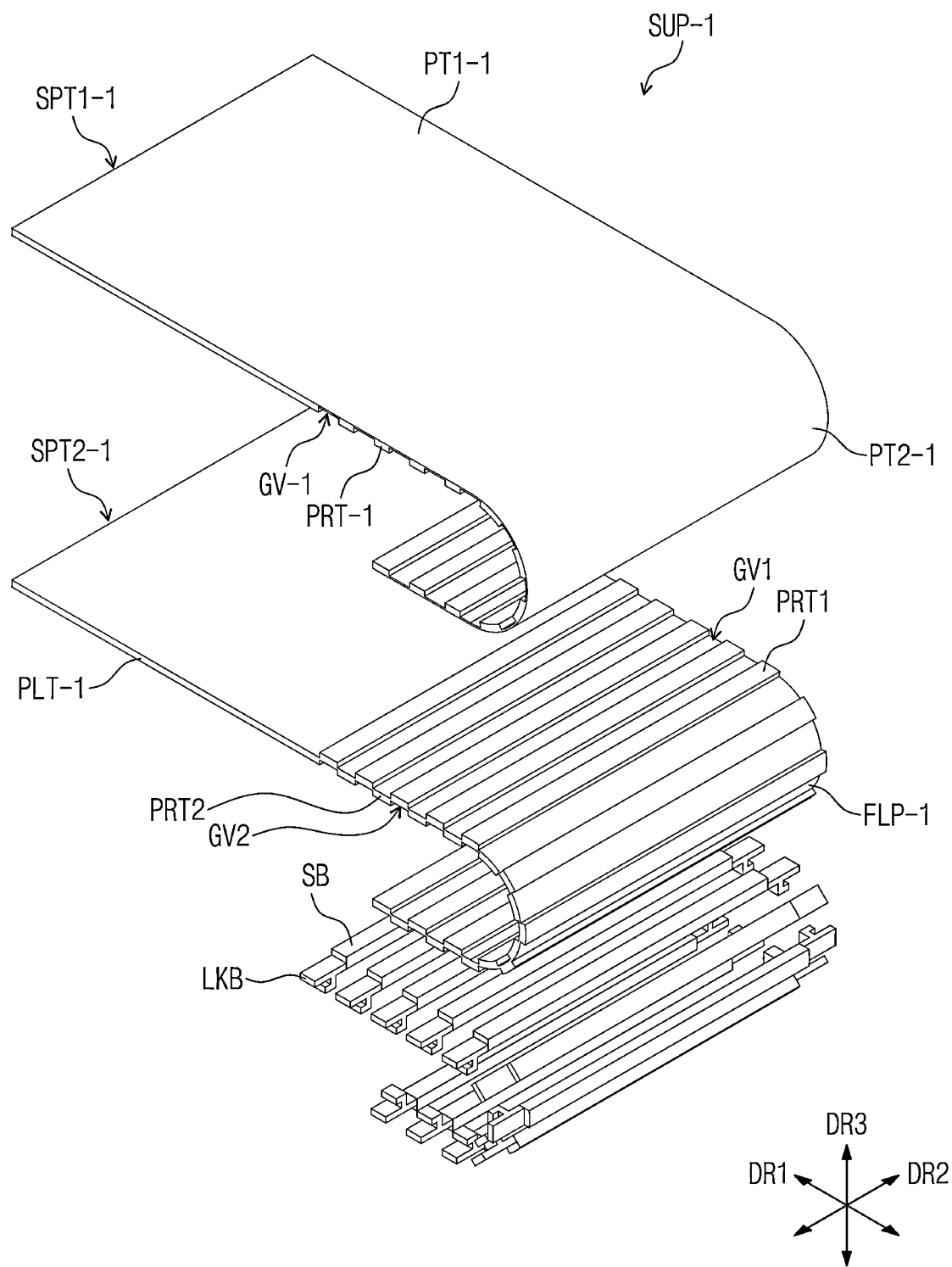
FIG. 34 is an exploded perspective view of an embodiment of a support part according to the disclosure.
Figure 35:
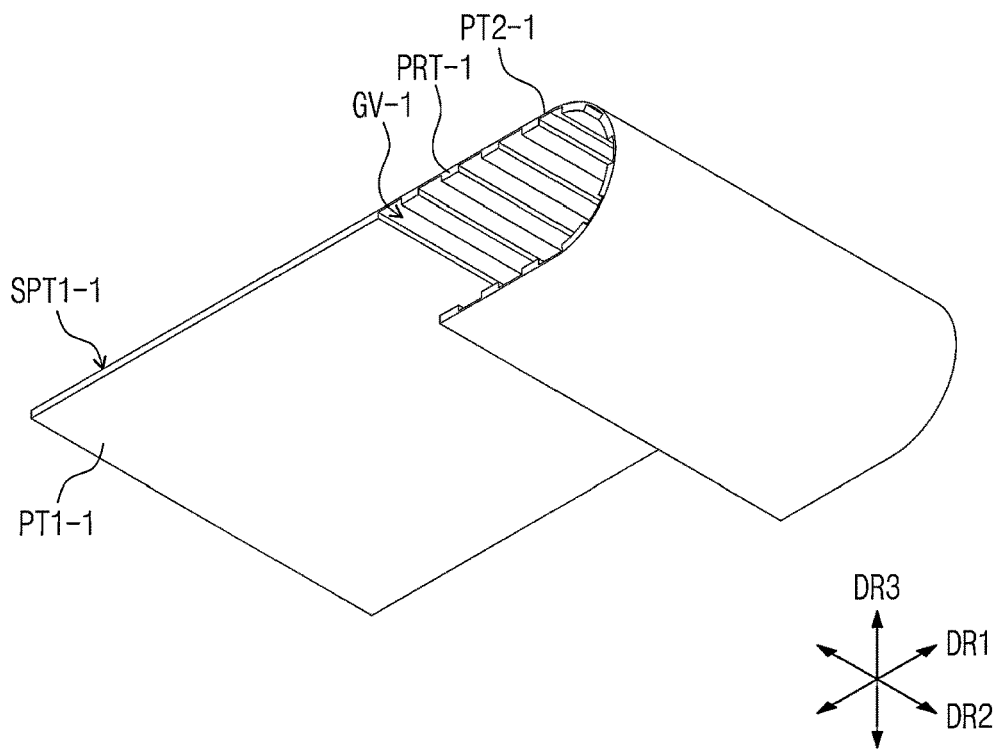
FIG. 35 is a perspective view illustrating a lower surface of a first support plate illustrated in FIG. 34.
Figure 36:
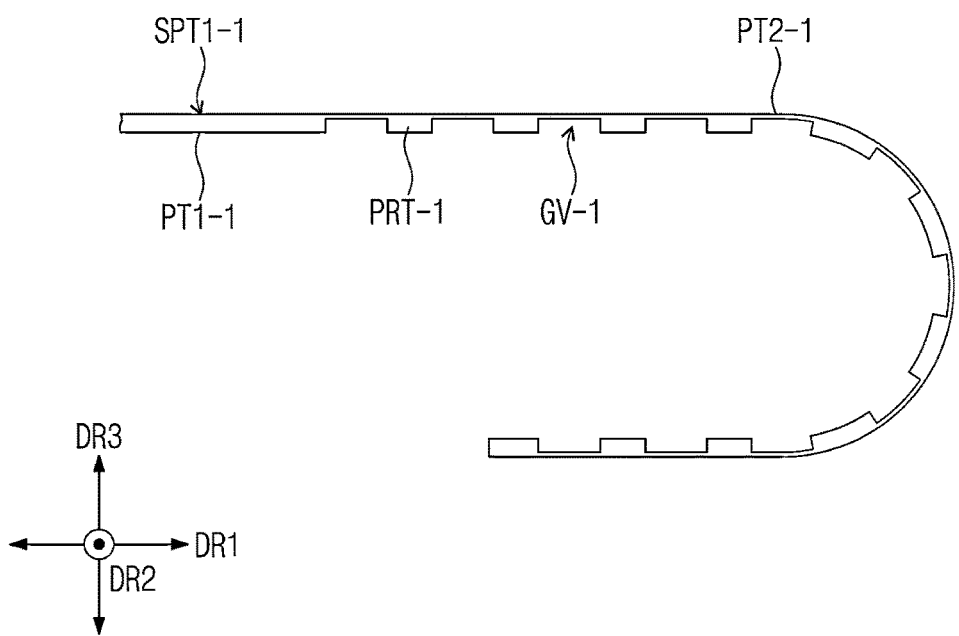
FIG. 36 is a side view of the first support plate illustrated in FIG. 35.
Figure 37:
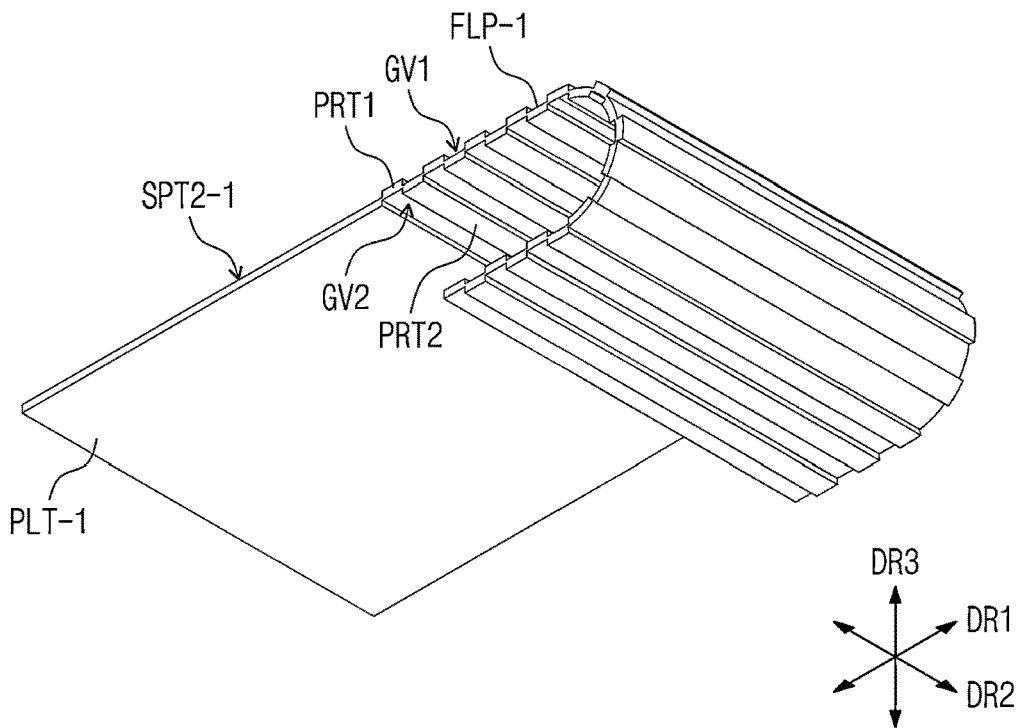
FIG. 37 is a perspective view illustrating a lower surface of a second support plate illustrated in FIG. 34.
Figure 38:
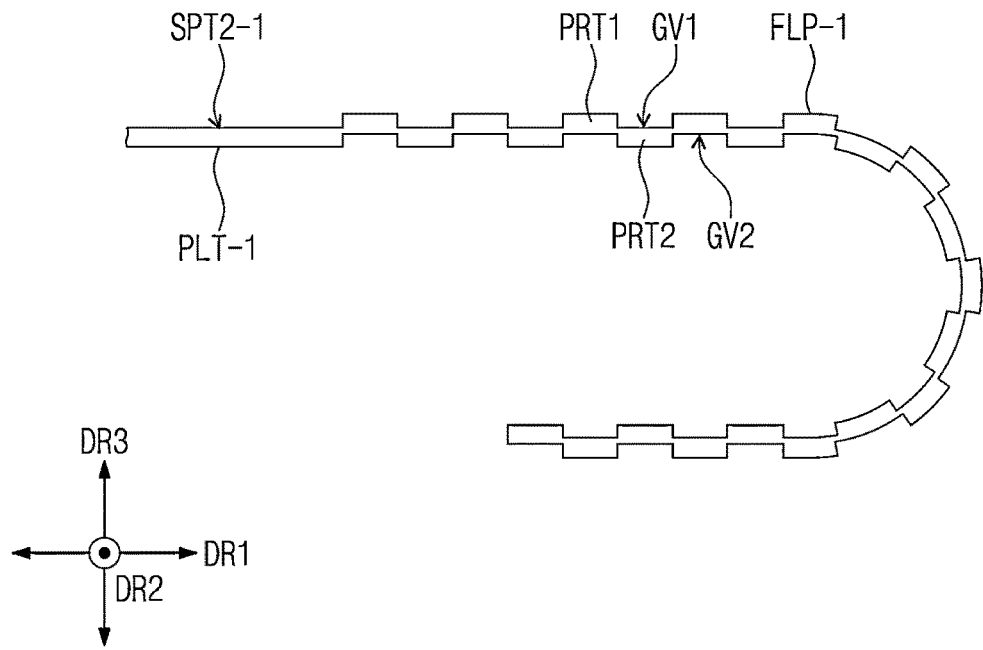
FIG. 38 is a side view of the second support plate illustrated in FIG. 37.

FIG. 34 is an exploded perspective view of an embodiment of a support part according to the disclosure. FIG. 35 is a perspective view illustrating a lower surface of a first support plate illustrated in FIG. 34. FIG. 36 is a side view of the first support plate illustrated in FIG. 35. FIG. 37 is a perspective view illustrating a lower surface of a second support plate illustrated in FIG. 34. FIG. 38 is a side view of the second support plate illustrated in FIG. 37.

The following description will be focused on a difference between the first and second support plates SPT1 and SPT2 illustrated in FIGS. 9 to 12 and the first and second support plates SPT1-1 and SPT2-1 illustrated in FIGS. 34 to 38.

Referring to FIG. 34, the support part SUP-1 may include the first support plate SPT1-1, the second support plate SPT2-1 disposed under the first support plate SPT1-1, a plurality of support bars SB disposed under the second support plate SPT2-1, and a plurality of link bars LKB coupled to opposite sides of the support bars SB.

The first support plate SPT1-1 and the second support plate SPT2-1 may include a metallic material such as a titanium alloy and stainless steel. The support bars SB and the link bars LKB have substantially the same configuration as the support bars SB and the link bars LKB illustrated in FIGS. 9, 11, and 12, and therefore descriptions thereof will be omitted.

The first support plate SPT1-1 may include a first part PT1-1 and a second part PT2-1 that extends from the first part PT1-1 and that is folded. The second part PT2-1 may be folded such that a portion of the second part PT2-1 is disposed under the first part PT1-1.

The second support plate SPT2-1 may include a flat part PLT-1 and a flexible part FLP-1 that extends from the flat part PLT-1 and that is folded. The flexible part FLP-1 may be folded such that a portion of the flexible part FLP-1 is disposed under the flat part PLT-1.

The flat part PLT-1 may be disposed under the first part PT1-1, and the flexible part FLP-1 may be disposed under the second part PT2-1. When viewed from above an even surface, the flat part PLT-1 may overlap the first part PT1-1, and the flexible part FLP-1 may overlap the second part PT2-1.

The support bars SB may be disposed under the flexible part FLP-1. When viewed from above the even surface, the support bars SB may overlap the flexible part FLP-1.

Referring to FIGS. 34, 35, and 36, an upper surface of the first support plate SPT1-1 may have an even surface. However, a predetermined pattern may be formed on a lower surface of the second part PT2-1 of the first support plate SPT1-1.

Specifically, the support part SUP-1 may include a plurality of protrusions PRT-1 protruding from the lower surface of the second part PT2-1. Spaces between the protrusions PRT-1 may be defined as a plurality of grooves GV-1. The protrusions PRT-1 may extend in the second direction DR2 and may be arranged in the first direction DR1. The protrusions PRT-1 may extend to opposite sides of the second part PT2-1 that face away from each other in the second direction DR2.

The protrusions PRT-1 may be unitary with the second part PT2-1 and may protrude from the second part PT2-1. The protrusions PRT-1 may have the same thickness as the first part PT1-1. The portions of the second part PT2-1 that have the grooves GV-1 defined therein may have a smaller thickness than that of the first part PT1-1. According to this structure, the second part PT2-1 may have a lower elastic modulus than that of the first part PT1-1.

Referring to FIGS. 34, 37, and 38, predetermined patterns may be formed on upper and lower surfaces of the flexible part FLP-1 of the second support plate SPT2-1. In an embodiment, the support part SUP-1 may include a plurality of first protrusions PRT1 protruding from the upper surface of the flexible part FLP-1, for example. Spaces between the first protrusions PRT1 may be defined as a plurality of first grooves GV1.

The first protrusions PRT1 may extend in the second direction DR2 and may be arranged in the first direction DR1. The first protrusions PRT1 may extend to opposite sides of the flexible part FLP-1 that face away from each other in the second direction DR2.

The support part SUP-1 may include a plurality of second protrusions PRT2 protruding from the lower surface of the flexible part FLP-1. Spaces between the second protrusions PRT2 may be defined as a plurality of second grooves GV2. In a plan view, the first protrusions PRT1 may overlap the second grooves GV2, and the second protrusions PRT2 may overlap the first grooves GV1.

The second protrusions PRT2 may extend in the second direction DR2 and may be arranged in the first direction DR1. The second protrusions PRT2 may extend to the opposite sides of the flexible part FLP-1 that face away from each other in the second direction DR2.

When viewed in the second direction DR2, the flexible part FLP-1 may have a corrugated shape due to the first and second protrusions PRT1 and PRT2. According to this structure, the flexible part FLP-1 may have a lower elastic modulus than that of the flat part PLT-1.

Figure 39:
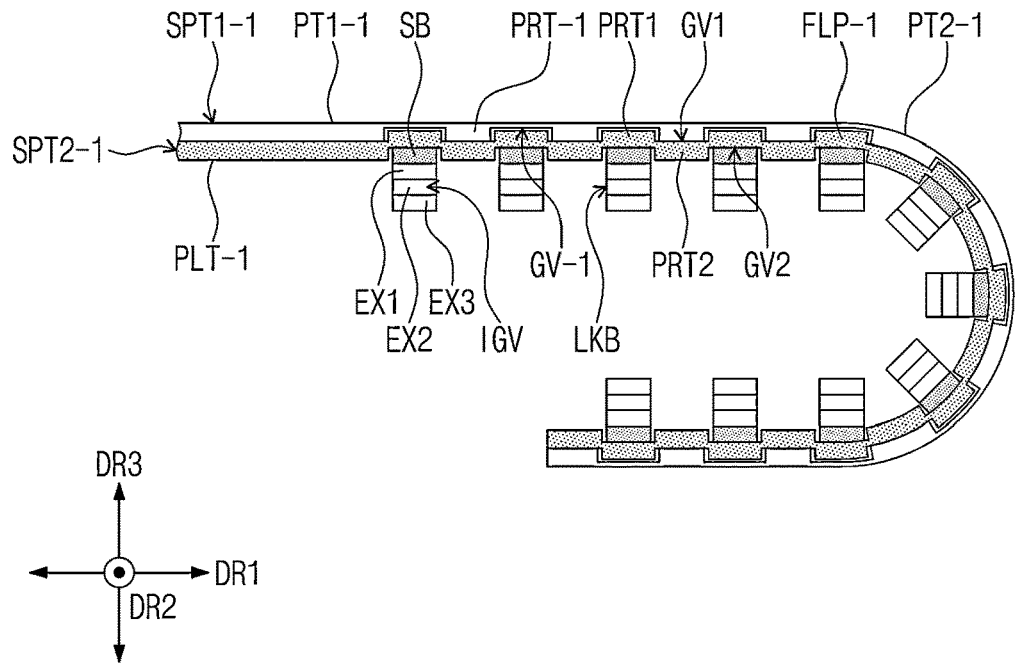
FIG. 39 is a view illustrating a coupled state of the first support plate, the second support plate, and support bars illustrated in FIG. 34.

FIG. 39 is a view illustrating a coupled state of the first support plate, the second support plate, and the support bars illustrated in FIG. 34.

FIG. 39 is a side view as viewed in the second direction DR2.

Referring to FIGS. 34 and 39, the second support plate SPT2-1 may be coupled to the first support plate SPT1-1. In an embodiment, the second support plate SPT2-1 may be bonded to the first support plate SPT1-1 by the above-described pressure sensitive adhesive, for example.

When the second support plate SPT2-1 is bonded to the first support plate SPT1-1, the flexible part FLP-1 may be inserted into the grooves GV-1 defined between the protrusions PRT-1. Specifically, the first protrusions PRT1 may be inserted into the grooves GV-1, and the protrusions PRT-1 may be inserted into the first grooves GV1. Since the first protrusions PRT1 are inserted into the grooves GV-1 and the protrusions PRT-1 are inserted into the first grooves GV1, the flexible part FLP-1 may be more firmly coupled to the second part PT2-1.

The support bars SB may be coupled to the second support plate SPT2-1. In an embodiment, the support bars SB may be bonded to the second support plate SPT2-1 by an adhesive including the above-described acrylate-based resin. The support bars SB may be inserted into the second grooves GV2, for example. Since the support bars SB are inserted into the second grooves GV2, the support bars SB may be more firmly coupled to the flexible part FLP-1. The support bars SB may protrude downward from the flexible part FLP-1.

Although not illustrated, the first and second support plates SPT1-1 and SPT2-1, the support bars SB, and the link bars LKB may be accommodated in the above-described first and second cases CS1 and CS2. In addition, the link bars LKB may be coupled to the guide rails GRA as described above.

Figure 40:
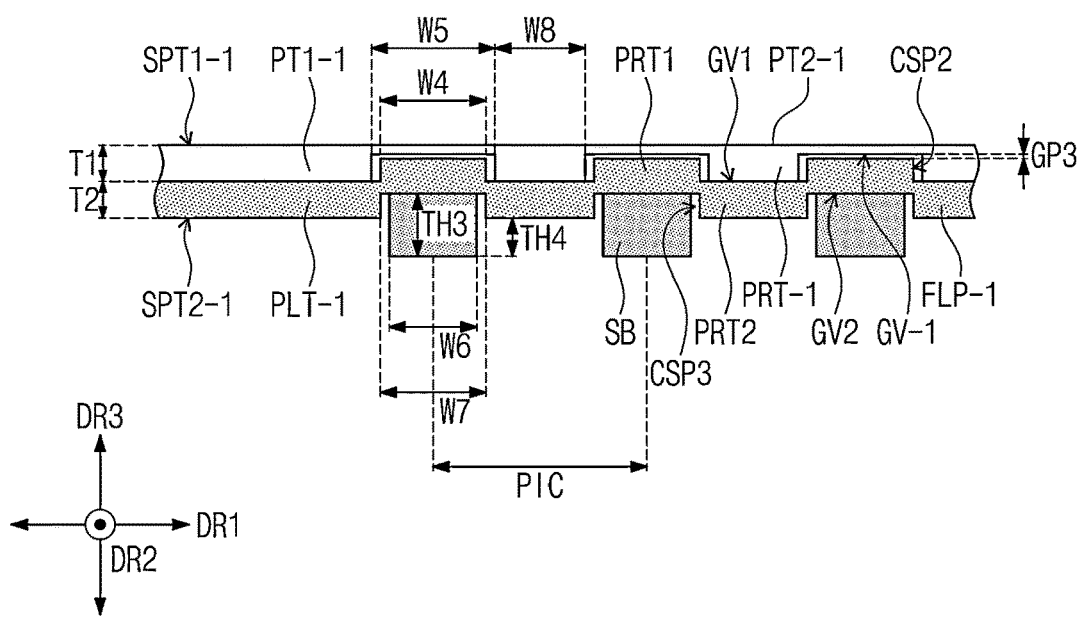
FIG. 40 is an enlarged view of some of the support bars illustrated in FIG. 39.

FIG. 40 is an enlarged view of some of the support bars illustrated in FIG. 39.

In FIG. 40, support bars SB adjacent to the flat part PLT-1 and portions of the first and second support plates SPT1-1 and SPT2-1 adjacent to the support bars SB are enlarged and illustrated, and the link bars LKB are omitted.

Referring to FIG. 40, in the first direction DR1, the first protrusions PRT1 may have a fourth width W4, and the grooves GV-1 may have a fifth width W5. The first direction DR1 may be defined as a direction crossing the extension direction of the support bars SB. The fourth width W4 may be smaller than the fifth width W5.

In an embodiment, under the condition that the fourth width W4 is smaller than the fifth width W5, the fourth width W4 may have a value in the range of about 1.0 mm to about 1.4 mm, and the fifth width W5 may have a value in the range of about 1.1 mm to about 1.5 mm, for example.

In the first direction DR1, the support bars SB may have a sixth width W6, and the second grooves GV2 may have a seventh width W7. The sixth width W6 may be smaller than the seventh width W7. In an embodiment, under the condition that the sixth width W6 is smaller than the seventh width W7, the sixth width W6 may have a value in the range of about 0.8 mm to about 1.2 mm, and the seventh width W7 may have a value in the range of about 0.9 mm to about 1.3 mm, for example.

In the first direction DR1, the protrusions PRT-1 may have an eighth width W8. The eighth width W8 may be smaller than the seventh width W7. In an embodiment, under the condition that the eighth width W8 is smaller than the seventh width W7, the eighth width W8 may have a value in the range of about 0.8 mm to about 1.2 mm, for example.

The second protrusions PRT2 may have the same width as that of the first protrusions PRT1. In addition, the first grooves GV1 may have the same width as that of the second grooves GV2.

A second gap GP2 between two support bars SB adjacent to each other in the first direction DR1 may be greater than the fourth width W4. In an embodiment, under the condition that the second gap GP2 is greater than the fourth width W4, the second gap GP2 may have a value in the range of about 1.1 mm to about 1.5 mm, for example.

In an embodiment, a pitch PIC may range from about 1.9 mm to about 2.7 mm, for example. In an embodiment, the first support plate SPT1-1 may have a first thickness T1 of about 30 m to about 40 m in the third direction DR3, and the second support plate SPT2-1 may have a second thickness T2 of about 30 m to about m in the third direction DR3, for example.

The support bars SB may have a third thickness TH3 of about 0.8 mm to about 1.2 mm in the third direction DR3.

Portions of the support bars SB that protrude downward from the flexible part FLP-1 may have a fourth thickness TH4 of about 0.7 mm to about 0.9 mm.

Since the fourth width W4 of the first protrusions PRT1 is smaller than the fifth width W5 of the grooves GV-1, the first protrusions PRT1 may be sufficiently disposed in the spaces of the grooves GV-1. Extra spaces of the grooves GV-1 remaining after the first protrusions PRT1 are disposed may be defined as second compression spaces CSP2.

Since the sixth width W6 of the support bars SB is smaller than the seventh width W7 of the second grooves GV2, the support bars SB may be sufficiently disposed in the spaces of the second grooves GV2. Extra spaces of the second grooves GV2 remaining after the support bars SB are disposed may be defined as third compression spaces CSP3.

In the grooves GV-1, the first protrusions PRT1 may be spaced apart from the second part PT2-1 by a third gap GP3. In an embodiment, the third gap GP3 may range from about 0.1 mm to about 0.2 mm, for example.

Figure 41:
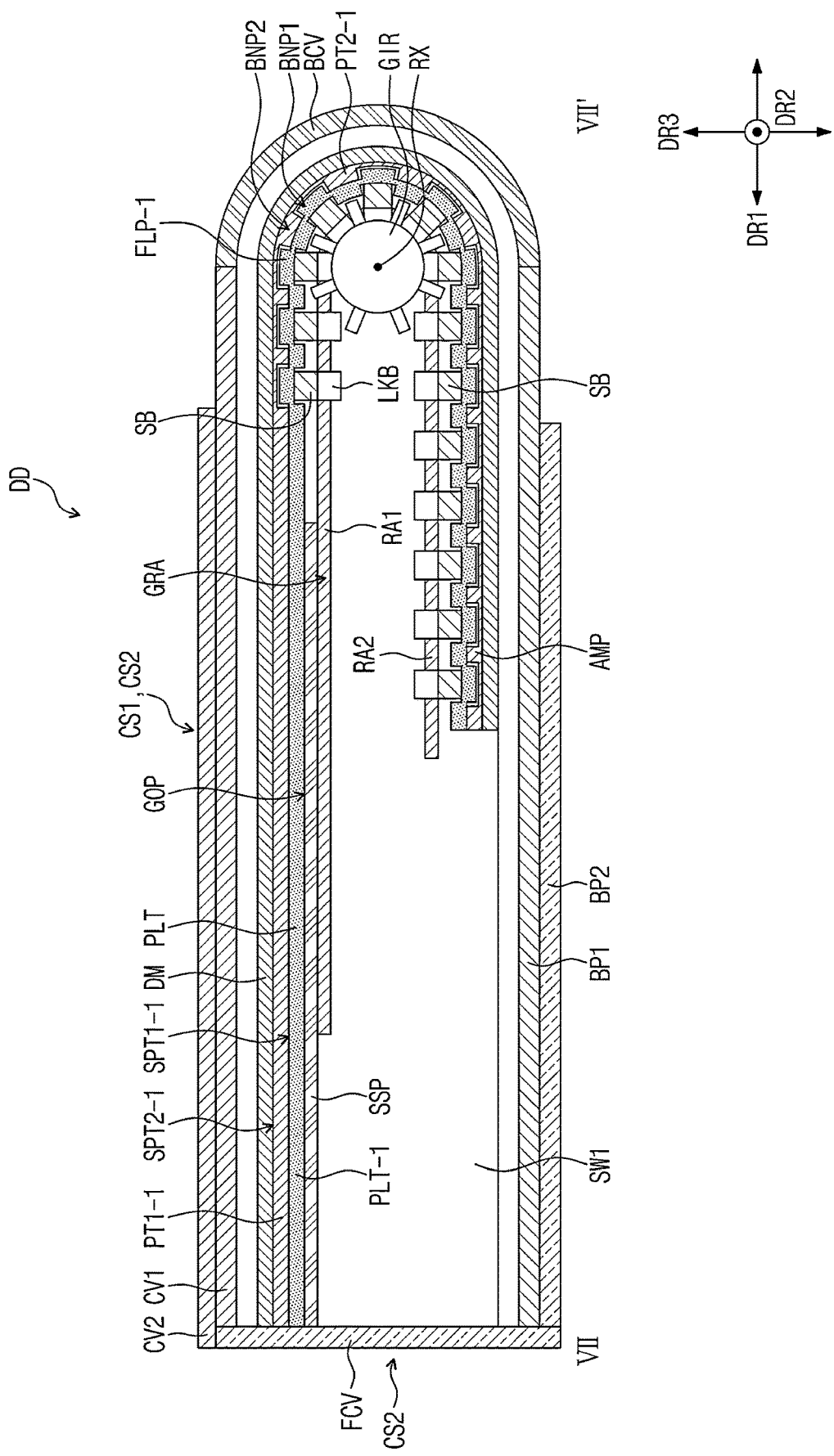
FIG. 41 is a view illustrating a default mode of first and second cases in which the first and second support plates, the support bars, and link bars illustrated in FIG. 39 are disposed.
Figure 42:
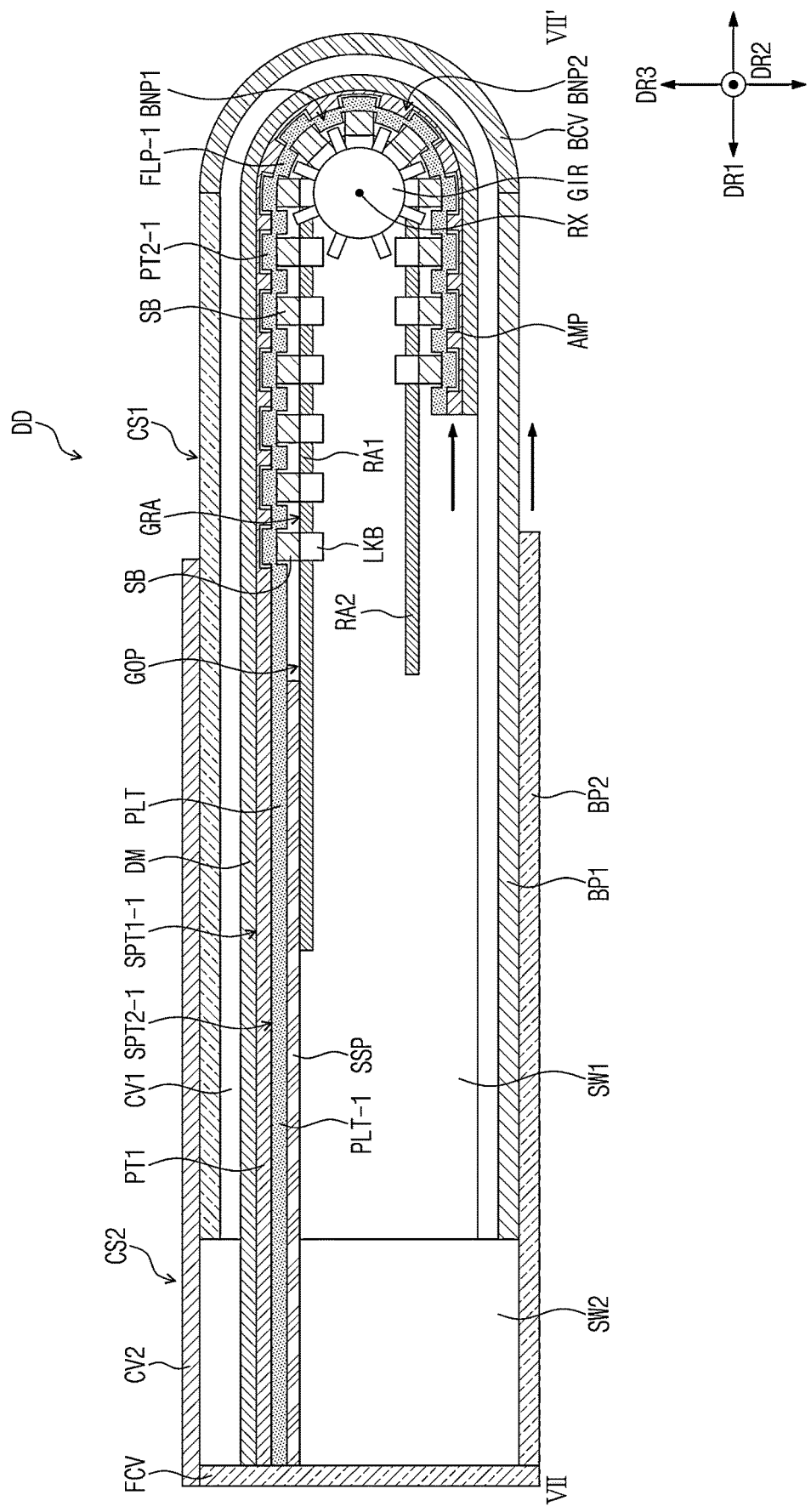
FIG. 42 is a view illustrating an extended mode of the first and second cases in which the first and second support plates, the support bars, and the link bars illustrated in FIG. 39 are disposed.

FIG. 41 is a view illustrating the default mode of the first and second cases in which the first and second support plates, the support bars, and the link bars illustrated in FIG. 39 are disposed. FIG. 42 is a view illustrating the extended mode of the first and second cases in which the first and second support plates, the support bars, and the link bars illustrated in FIG. 39 are disposed.

FIG. 41 is a cross-sectional view corresponding to FIG. 24, and FIG. 42 is a cross-sectional view corresponding to FIG. 25.

Referring to FIGS. 41 and 42, the first and second support plates SPT1-1 and SPT2-1, the support bars SB, and the link bars LKB may be accommodated in the first and second cases CS1 and CS2. The structure in which the link bars LKB are coupled to the guide rail GRA may be substantially the same as the structure illustrated in FIGS. 18 and 19.

The display module DM may be disposed on the first support plate SPT1-1, and the display module DM and the first and second support plates SPT1-1 and SPT2-1 may be folded and accommodated in the case CS. The second part PT2-1 and the flexible part FLP-1 having a relatively low elastic modulus may be easily bent together with the display module DM.

As described above, the link bars LKB may be coupled to the guide rail GRA and may move along the guide rail GRA. The second part PT2-1 and the flexible part FLP-1 may move along the guide rail GRA depending on the movement of the link bars LKB.

When the display device DD is changed from the extended mode to the default mode, the gear GIR may rotate about the rotational axis RX in the clockwise direction. When the display device DD is changed from the default mode to the extended mode, the gear GIR may rotate about the rotational axis RX in the counterclockwise direction. The default mode and the extended mode may be performed by the movement of the second part PT2-1 and the flexible part FLP-1 along the guide rail GRA.

In an embodiment of the disclosure, the first support plate SPT1-1 may have the flat upper surface, and the protrusions PRT-1 and the grooves GV-1 may be defined on the lower surface of the first support plate SPT1-1. Due to the flat upper surface of the first support plate SPT1-1, the pattern of the protrusions PRT-1 and the grooves GV-1 may not be visible from the outside.

The second support plate SPT2-1 including the first and second protrusions PRT1 and PRT2 and the first and second grooves GV1 and GV2 may be disposed under the first support plate SPT1-1. Accordingly, due to the flat upper surface of the first support plate SPT1-1, the patterns of the first and second protrusions PRT1 and PRT2 and the first and second grooves GV1 and GV2 may not be visible from the outside.

In an embodiment of the disclosure, the display module DM may be easily supported since the display module DM is supported double by the first and second support plates SPT1-1 and SPT2-1. In addition, in an embodiment of the disclosure, the impact resistance of the display module DM may be improved since the first and second support plates SPT1-1 and SPT2-1 are disposed double under the display module DM.

Figure 43:
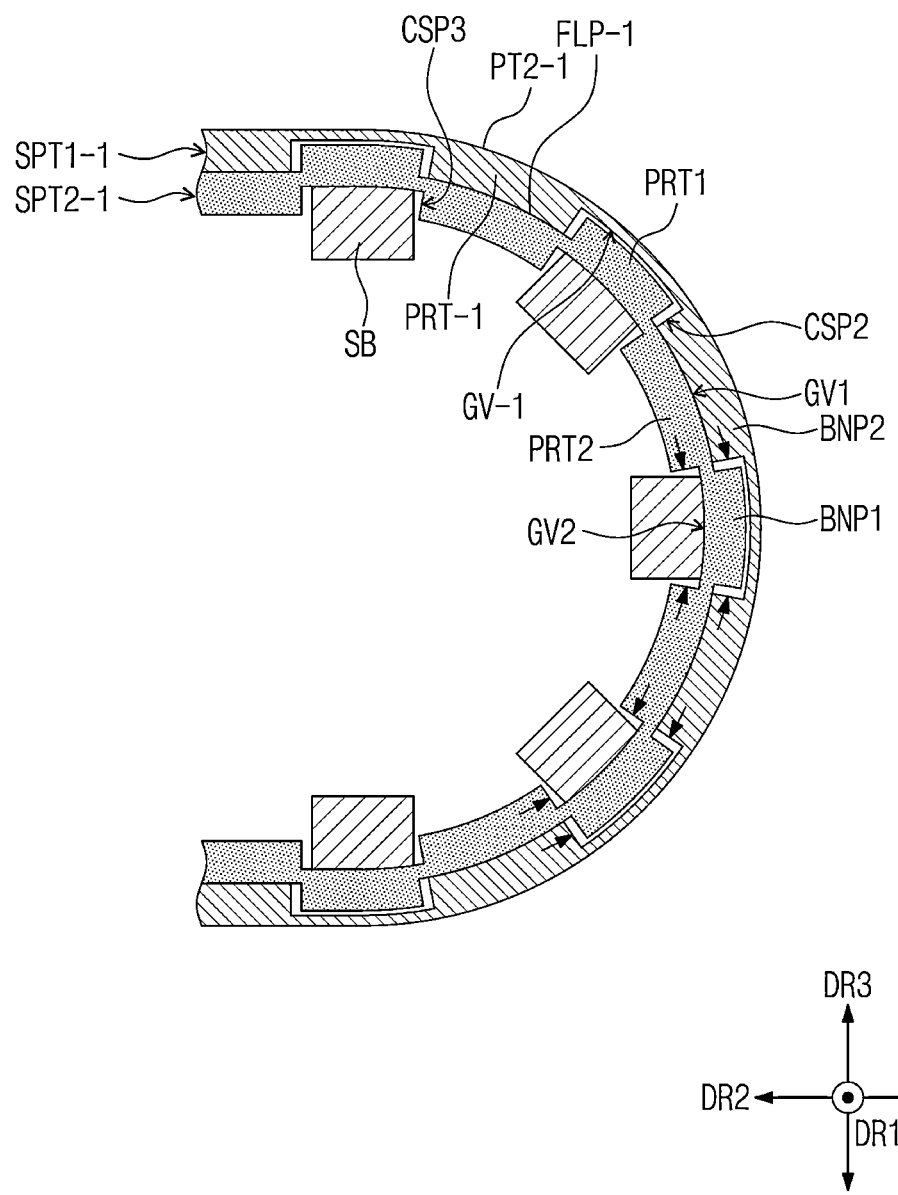
FIG. 43 is an enlarged view of first and second bending portions illustrated in FIG. 42 and support bars adjacent to the first and second bending portions.

FIG. 43 is an enlarged view of first and second bending portions illustrated in FIG. 42 and support bars adjacent to the first and second bending portions.

FIG. 43 is a cross-sectional view corresponding to FIG. 27.

Referring to FIGS. 42 and 43, the folded portion of the flexible part FLP-1 may be defined as the first bending portion BNP1, and the folded portion of the second part PT2-1 may be defined as the second bending portion BNP2. Similarly to the above-described first compression spaces CSP1, the second compression spaces CSP2 may be defined in the flexible part FLP-1, and the third compression spaces CSP3 may be defined in the second part PT2-1.

A compressive force may be generated in an inner surface of the first bending portion BNP1 adjacent to the gear GIR and an inner surface of the second bending portion BNP2 adjacent to the first bending portion BNP1. The compressive force generated in the first bending portion BNP1 may act on the second compression spaces CSP2. The compressive force generated in the second bending portion BNP2 may act on the third compression spaces CSP3. Accordingly, the above-described buckling phenomenon may not occur.

Figure 44:
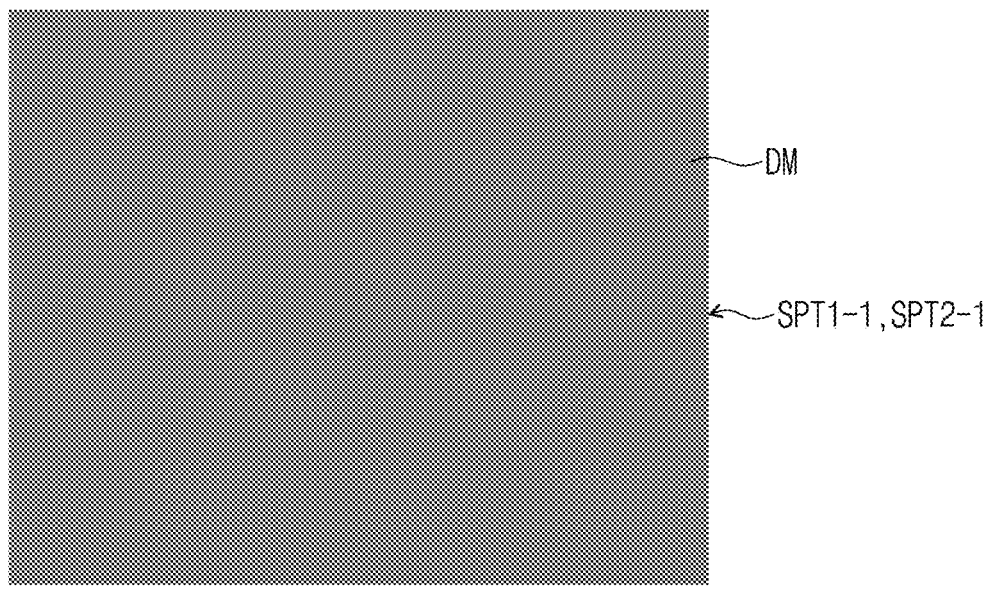
FIG. 44 illustrates an image of the front surface of the display module for which the first and second support plates illustrated in FIG. 39 are used.

FIG. 44 illustrates an image of the front surface of the display module for which the first and second support plates illustrated in FIG. 39 are used.

When the first support plate SPT1-1 and the second support plate SPT2-1 illustrated in FIG. 39 are disposed under the display module DM, the flat upper surface of the first support plate SPT1-1 may cover the pattern on the lower surface of the first support plate SPT1-1 and the patterns on the upper and lower surfaces of the second support plate SPT2-1. Accordingly, the pattern on the lower surface of the first support plate SPT1-1 and the patterns on the upper and lower surfaces of the second support plate SPT2-1 may not be visible from the outside as in the image illustrated in FIG. 44.

Figure 45A:
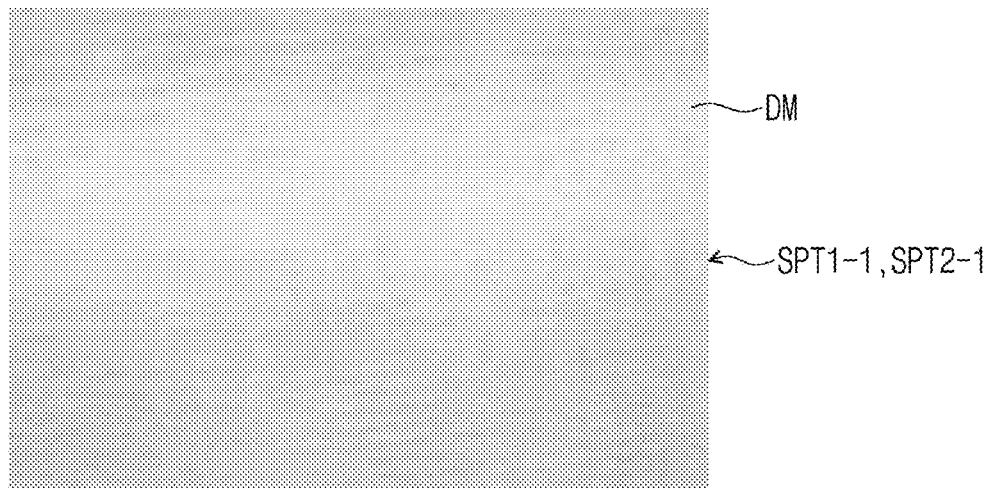
FIGS. 45A and 45B are views illustrating results of pen drop tests for the display module for which the first and second support plates illustrated in FIG. 39 are used.
Figure 45B:
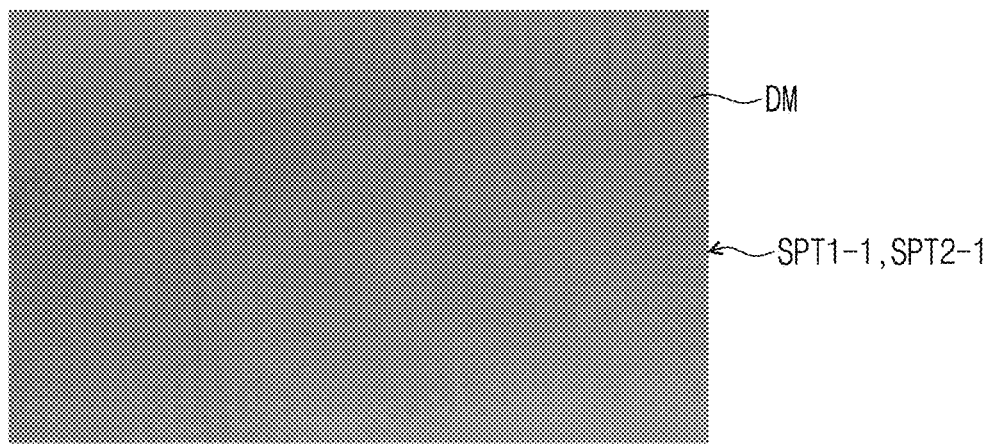

FIGS. 45A and 45B are views illustrating results of pen drop tests for the display module for which the first and second support plates illustrated in FIG. 39 are used.

As described above with reference to FIGS. 30A and 30B, the display module DM may be deformed by an external impact when the support plate SPT is disposed under the display module DM.

Referring to FIGS. 45A and 45B, it may be seen that when the first and second support plates SPT1-1 and SPT2-1 are disposed under the display module DM, the impact resistance of the display module DM is enhanced, compared to that in FIGS. 30A and 30B.

As illustrated in FIG. 45A, the display module DM was not damaged when the first pen was dropped on the display module DM from a height of about 15 cm above the display module DM. As illustrated in FIG. 45B, the display module DM was not damaged when the second pen was dropped on the display module DM from a height of about 11 cm above the display module DM.

Figure 46:
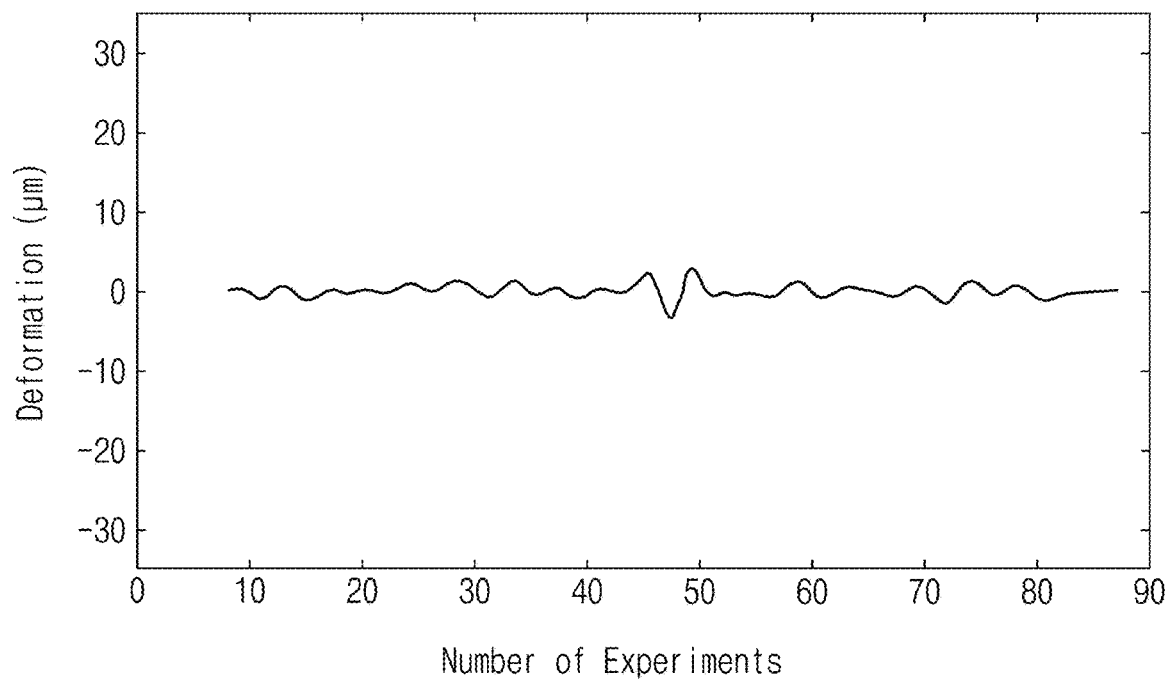
FIG. 46 illustrates a graph obtained by measuring a deformed state of the display module after the default mode and the extended mode are performed on the display module for which the first and second support plates illustrated in FIG. 39 are used.

FIG. 46 illustrates a graph obtained by measuring a deformed state of the display module after the default mode and the extended mode are performed on the display module for which the first and second support plates illustrated in FIG. 39 are used.

In FIG. 46, the units of the vertical axis and the horizontal axis of the graph are as described in FIGS. 32A and 32B.

Referring to FIG. 46, it may be seen that when the first and second support plates SPT1-1 and SPT2-1 were used, the display module DM was not significantly deformed up to about 900,000 cycles, compared to that in FIG. 32A. In the experimental result illustrated in FIG. 46, the maximum amount of deformation of the display module DM was measured to be about 1 μm, and the minimum amount of deformation of the display module DM was measured to be about 3 m. Accordingly, the difference between the maximum amount of deformation and the minimum amount of deformation of the display module DM is about 4 μm.

Figure 47:
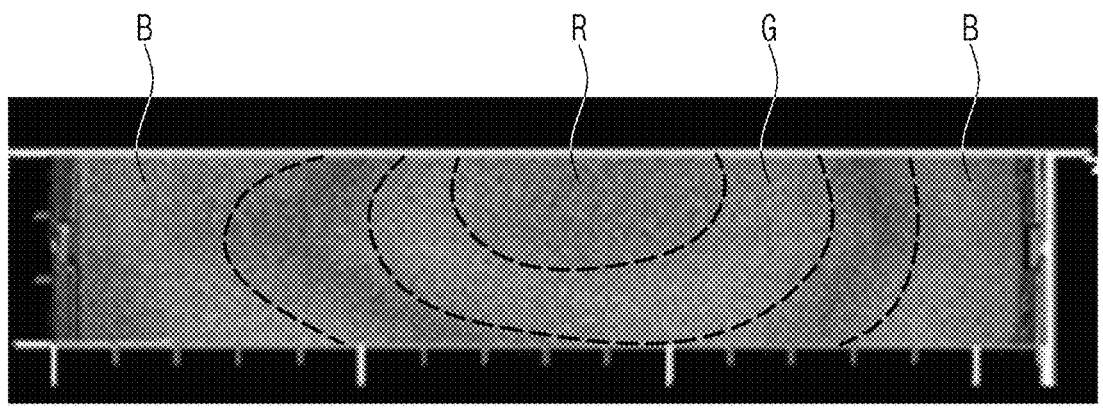
FIG. 47 is a view illustrating a deformed state of the display module for which the first and second support plates illustrated in FIG. 39 are used.

FIG. 47 is a view illustrating a deformed state of the display module for which the first and second support plates illustrated in FIG. 39 are used.

Experimental conditions of FIG. 47 are as described in FIGS. 33A and 33B.

Referring to FIG. 47, when the first and second support plates SPT1-1 and SPT2-1 are disposed under the display module DM, the area of the red (R) portion is decreased, compared to that in FIG. 33A, and the areas of the blue (B) portion and the green (G) portion are increased, compared to those in FIG. 33A. Accordingly, it may be seen that the amount of deformation of the display module DM is smaller when the first and second support plates SPT1-1 and SPT2-1 are disposed under the display module DM than when the support plate SPT is disposed under the display module DM.

Figure 48:
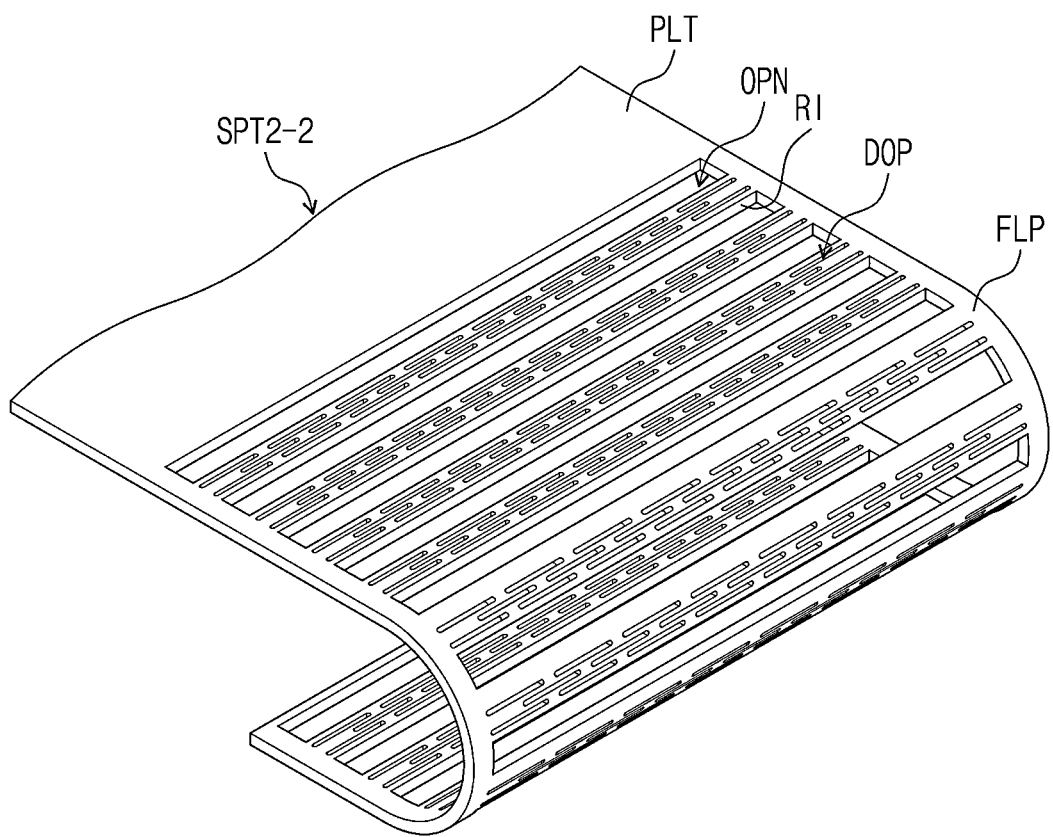
FIG. 48 is a view illustrating an embodiment of a configuration of a second support plate according to the disclosure.

FIG. 48 is a view illustrating an embodiment of a configuration of a second support plate according to the disclosure.

The second support plate SPT2-2 illustrated in FIG. 48 is a modified embodiment of the second support plate SPT2 illustrated in FIG. 10. Although not illustrated, the first support plate SPT1 illustrated in FIG. 10 may be disposed on the second support plate SPT2-2.

Referring to FIG. 48, a plurality of dummy openings DOP may be additionally defined in ribs RI between openings OPN. Since the dummy openings DOP are additionally defined in a flexible part FLP, the elastic modulus of the flexible part FLP may be further decreased.

FIGS. 49 to 52 are views illustrating an embodiment of configurations of first and second support plates according to the disclosure.

FIGS. 49 to 52 are cross-sectional views corresponding to FIG. 40. The following description will be focused on differences between the first and second support plates SPT1-1 and SPT2-1 illustrated in FIG. 40 and the first and second support plates illustrated in FIGS. 49 to 52.

Figure 49:
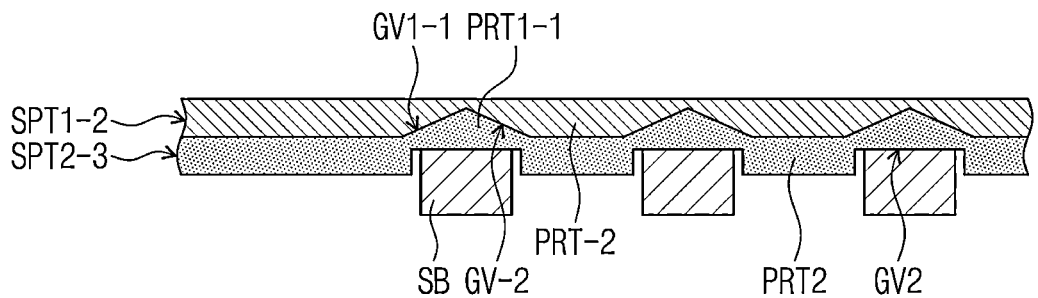
FIGS. 49 to 52 are views illustrating embodiments of configurations of first and second support plates according to the disclosure.
Figure 49:
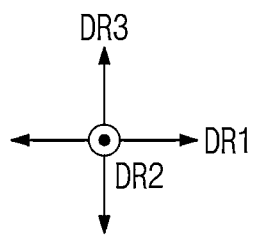

Referring to FIG. 49, grooves GV-2 between a plurality of protrusions PRT-2 of a first support plate SPT1-2 and first protrusions PRT1-1 of a second support plate SPT2-3 may have a ridge shape corresponding to two sides of a triangle. In an embodiment, spaces between the first protrusions PRT1-1 may be defined as a plurality of first grooves GV1-1.

Figure 50:
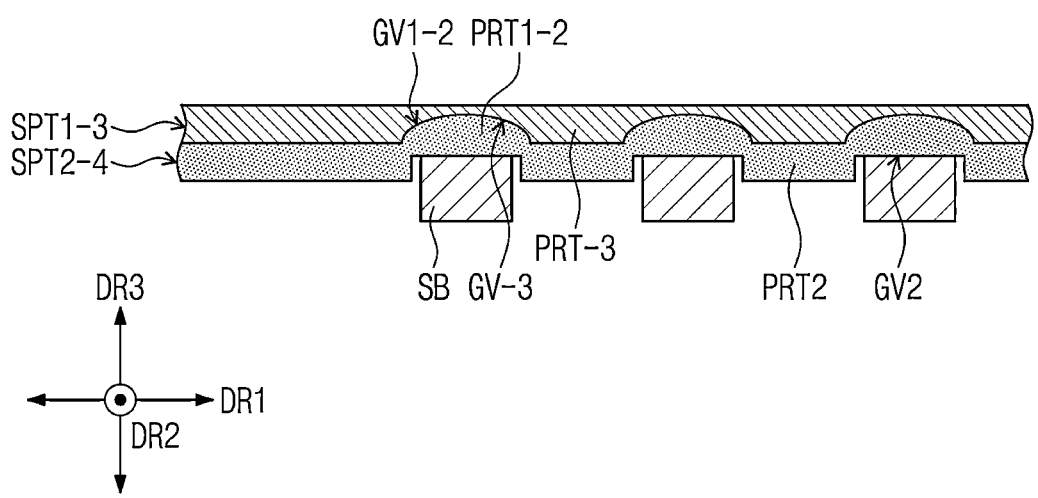
Figure 50:
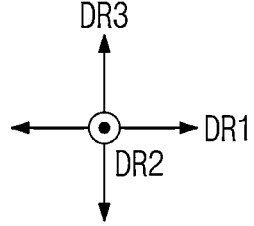

Referring to FIG. 50, grooves GV-3 between a plurality of protrusions PRT-3 of a first support plate SPT1-3 and first protrusions PRT1-2 of a second support plate SPT2-4 may have a curved surface. In an embodiment, spaces between the first protrusions PRT1-2 may be defined as a plurality of first grooves GV1-2.

Figure 51:
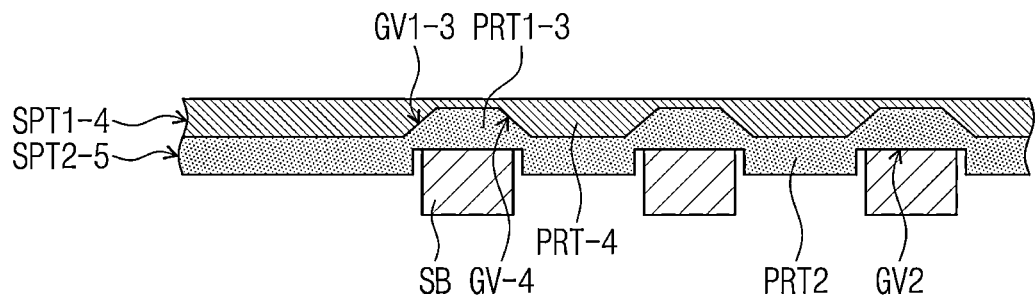
Figure 51:
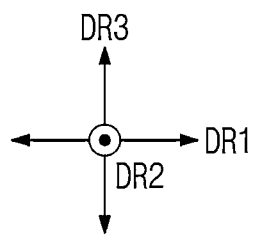

Referring to FIG. 51, grooves GV-4 between a plurality of protrusions PRT-4 of a first support plate SPT1-4 and first protrusions PRT1-3 of a second support plate SPT2-5 may have a trapezoidal shape. In an embodiment, spaces between the first protrusions PRT1-3 may be defined as a plurality of first grooves GV1-3.

Figure 52:
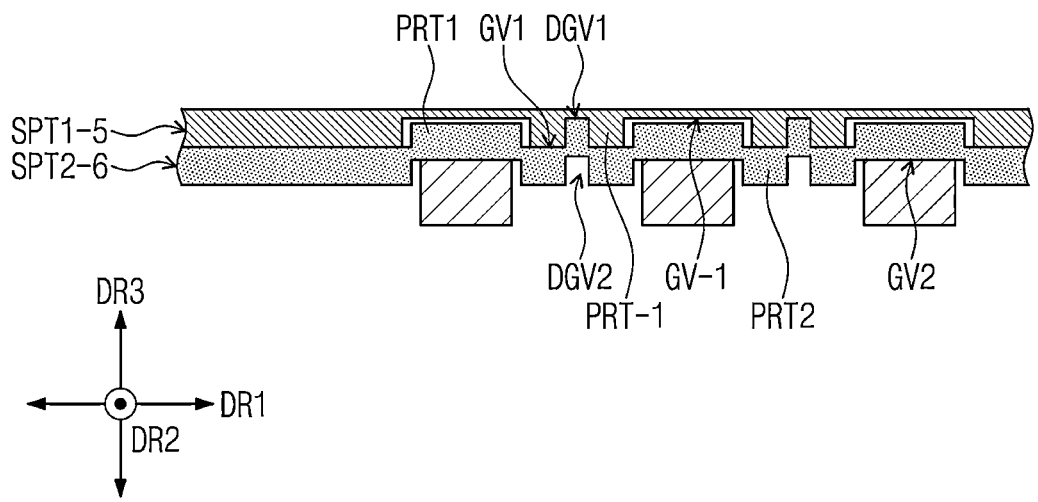
Figure 52:
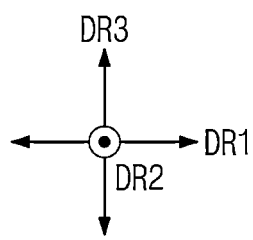

Referring to FIG. 52, a plurality of first dummy grooves DGV1 may be defined on lower surfaces of protrusions PRT-1 of a first support plate SPT1-5. Second dummy grooves DGV2 may be defined on lower surfaces of second protrusions PRT2 of a second support plate SPT2-6. A second part PT2-1 (refer to FIGS. 41 and 42) and a flexible part FLP-1 (refer to FIGS. 41 and 42) may be more flexible due to the additionally defined first and second dummy grooves DGV1 and DGV2.

By the embodiments of the disclosure, the second support plate having the predetermined pattern is disposed under the first support plate having the flat upper surface. Thus, the pattern of the second support plate may not be visible from the outside due to the first support plate having the flat upper surface.

Furthermore, the first and second support plates may easily support the display module together.

In addition, the first and second support plates are disposed under the display module. Accordingly, the impact resistance of the display module may be improved, and thus damage to the display module due to an external impact may be prevented.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:
    a display module;
    a first support plate disposed under the display module, the first support plate including a first part and a second part extending from the first part;
    a plurality of protrusions protruding from a lower surface of the second part; and
    a second support plate disposed under the first support plate, the second support plate including a flat part and a flexible part extending from the flat part,
    wherein the flexible part is inserted into a plurality of grooves defined between the plurality of protrusions.

2. The display device of claim 1, wherein the flexible part has a lower elastic modulus than a modulus of the flat part.

3. The display device of claim 1, wherein the flexible part extends from the flat part in a first direction and thereafter is folded about an axis extending in a second direction crossing the first direction.

4. The display device of claim 3, wherein the first part overlaps the flat part, and the second part overlaps the flexible part and is folded about the axis together with the flexible part.

5. The display device of claim 1, wherein the plurality of protrusions includes a plurality of support bars coupled to the lower surface of the second part and arranged in a first direction, the plurality of support bars extending in a second direction crossing the first direction.

6. The display device of claim 5, wherein a plurality of openings is defined in the flexible part, and the plurality of support bars is disposed in the plurality of openings and protrudes downward from the flexible part.

7. The display device of claim 6, wherein in the first direction, a first width of an opening among the plurality of openings is greater than a second width of a support bar disposed in the opening among the plurality of support bars.

8. The display device of claim 7, wherein in the first direction, a third width of ribs of the flexible part between the plurality of openings is smaller than the first width.

9. The display device of claim 8, wherein a gap between support bars adjacent to each other in the first direction among the plurality of support bars is greater than the third width.

10. The display device of claim 5, further comprising:
    a plurality of link bars coupled to opposite sides of the plurality of support bars in the second direction.

11. The display device of claim 10, further comprising:
    a first case which accommodates the display module and the first and second support plates;
    guide rails disposed on inner surfaces of the first case facing each other in the second direction; and
    a second case connected to at least one of the display module, the first support plate, and the second support plate and coupled to the first case,
    wherein the first case is movable away from or toward the second case in the first direction, and the plurality of link bars is coupled to the guide rails and movable along the guide rails.

12. The display device of claim 11, wherein each of the guide rails includes:
    a first rail extending in the first direction;
    a second rail extending in the first direction and disposed under the first rail; and
    a curved rail extending from a side of the first rail to a side of the second rail.

13. The display device of claim 5, wherein the first support plate and the second support plate have a same thickness in a third direction perpendicular to a plane defined by the first and second directions.

14. The display device of claim 1, wherein the second part has a lower elastic modulus than a modulus of the first part.

15. The display device of claim 1, wherein the plurality of protrusions is unitary with the second part and protrude from the second part.

16. The display device of claim 1, further comprising:
    a plurality of first protrusions protruding from an upper surface of the flexible part,
    wherein a plurality of first grooves is defined between the plurality of first protrusions, and
    wherein the plurality of first protrusions is inserted into the plurality of grooves, and the plurality of protrusions is inserted into the plurality of first grooves.

17. The display device of claim 16, further comprising:
    a plurality of second protrusions protruding from a lower surface of the flexible part,
    wherein a plurality of second grooves is defined between the plurality of second protrusions, and
    wherein the plurality of first protrusions overlaps the plurality of second grooves, and the plurality of second protrusions overlaps the plurality of first grooves.

18. The display device of claim 17, further comprising:
    a plurality of support bars disposed in the plurality of second grooves.

19. The display device of claim 18, wherein in a direction crossing an extension direction of the plurality of support bars, widths of the plurality of first protrusions are smaller than widths of the plurality of grooves, and widths of the plurality of support bars are smaller than widths of the plurality of second grooves.

20. A display device comprising:
    a display module;

a first support plate disposed on a lower surface of the display module, the first support plate including a first part and a second part extending from the first part and folded;

a plurality of protrusions protruding from a lower surface of the second part;

a second support plate including a flat part disposed on a lower surface of the first part and a flexible part inserted into a plurality of grooves defined between the plurality of protrusions, the flexible part being folded together with the second part; and a first case and a second case which are coupled with each other and accommodate the display module and the first and second support plates, the first case and the second case being movable away from or toward each other, wherein in a case that the first case and the second case move away from each other, an exposed area of the display module exposed outside the first and second cases is increased, and a flat portion of the flexible part disposed flat together with the flat part is extended.

21. An electronic device, comprising:

a display device comprising:

a display module;

a first support plate disposed under the display module, the first support plate including a first part and a second part extending from the first part;

a plurality of protrusions protruding from a lower surface of the second part; and a second support plate disposed under the first support plate, the second support plate including a flat part and a flexible part extending from the flat part, wherein the flexible part is inserted into a plurality of grooves defined between the plurality of protrusions.

* * * * *